(12) United States Patent
Markki et al.

(10) Patent No.: US 7,660,864 B2
(45) Date of Patent: Feb. 9, 2010

(54) SYSTEM AND METHOD FOR USER NOTIFICATION

(75) Inventors: Outi Markki, Espoo (FI); Timo Vesalainen, Helsinki (FI); Antti Aaltonen, Tampere (FI)

(73) Assignee: Nokia Corporation, Espoo (FI)

( * ) Notice: Subject to any disclaimer, the term of this patent is extended or adjusted under 35 U.S.C. 154(b) by 63 days.

(21) Appl. No.: 10/607,618

(22) Filed: Jun. 27, 2003

(65) Prior Publication Data

US 2004/0243682 A1 Dec. 2, 2004

Related U.S. Application Data

(63) Continuation-in-part of application No. 10/446,574, filed on May 27, 2003, and a continuation-in-part of application No. 10/447,115, filed on May 27, 2003, and a continuation-in-part of application No. 10/446,576, filed on May 27, 2003, now abandoned.

(51) Int. Cl.
*G06F 13/00* (2006.01)
(52) U.S. Cl. ...................................... 709/207
(58) Field of Classification Search ................ 709/206, 709/207; 715/867
See application file for complete search history.

(56) References Cited

U.S. PATENT DOCUMENTS

| | | | | |
|---|---|---|---|---|
| 4,926,326 A * | 5/1990 | McKinley | ................... | 345/2.2 |
| 5,542,115 A * | 7/1996 | Wong et al. | ................. | 340/7.21 |
| 5,631,847 A * | 5/1997 | Kikinis | ....................... | 709/207 |
| 5,740,549 A * | 4/1998 | Reilly et al. | .................. | 705/14 |
| 5,852,436 A * | 12/1998 | Franklin et al. | ............. | 715/867 |
| 5,862,325 A * | 1/1999 | Reed et al. | .................. | 709/201 |
| 5,933,478 A * | 8/1999 | Ozaki et al. | ............... | 379/93.24 |
| 6,065,044 A * | 5/2000 | Ogasawara | ................. | 709/207 |
| 6,067,561 A * | 5/2000 | Dillon | ........................ | 709/206 |
| 6,094,681 A * | 7/2000 | Shaffer et al. | ............... | 709/224 |
| 6,278,448 B1 | 8/2001 | Brown et al. | | |
| 6,288,715 B1 * | 9/2001 | Bain et al. | ................... | 345/211 |
| 6,396,513 B1 * | 5/2002 | Helfman et al. | ............. | 345/752 |
| 6,400,810 B1 * | 6/2002 | Skladman et al. | ......... | 379/93.24 |
| 6,438,632 B1 * | 8/2002 | Kikugawa | .................... | 710/100 |
| 6,507,866 B1 * | 1/2003 | Barchi | ......................... | 709/207 |
| 6,549,916 B1 * | 4/2003 | Sedlar | ......................... | 707/200 |
| 6,591,310 B1 * | 7/2003 | Johnson | ......................... | 710/3 |
| 7,030,837 B1 * | 4/2006 | Vong et al. | .................... | 345/1.3 |
| 7,068,309 B2 * | 6/2006 | Toyama et al. | ............. | 348/231.5 |
| 7,107,316 B2 * | 9/2006 | Brown et al. | ................. | 709/207 |
| 7,139,594 B2 * | 11/2006 | Nagatomo | ................... | 455/566 |
| 7,305,082 B2 * | 12/2007 | Elazar et al. | ............ | 379/265.07 |
| 7,430,616 B2 * | 9/2008 | Husain et al. | ............... | 709/246 |
| 7,496,630 B2 * | 2/2009 | Arellano et al. | ............. | 709/206 |
| 7,509,377 B2 * | 3/2009 | Harvey et al. | ................ | 709/206 |
| 2002/0007401 A1 * | 1/2002 | Suzuki | ......................... | 709/207 |

(Continued)

*Primary Examiner*—Robert B Harrell
(74) *Attorney, Agent, or Firm*—Locke Lord Bissell & Liddell LLP

(57) ABSTRACT

Systems and methods applicable, for example, in having a node inform its user of one or more events while the user interface of the node is in an idle state. The user might, for instance, be able to select one or more of the events of which she is informed for corresponding operations. The events of which the user is informed might include, for example, events corresponding to software operations and/or events corresponding to a network environment (e.g., a peer-to-peer environment).

58 Claims, 17 Drawing Sheets

U.S. PATENT DOCUMENTS

| | | | |
|---|---|---|---|
| 2002/0059384 A1* | 5/2002 | Kaars | 709/206 |
| 2002/0145561 A1* | 10/2002 | Sandhu et al. | 342/357.09 |
| 2002/0178087 A1* | 11/2002 | Henderson et al. | 705/26 |
| 2003/0041265 A1* | 2/2003 | Lagimonier et al. | 713/201 |
| 2003/0050834 A1* | 3/2003 | Caplan | 705/14 |
| 2003/0191816 A1* | 10/2003 | Landress et al. | 709/219 |
| 2004/0039781 A1* | 2/2004 | LaVallee et al. | 709/205 |
| 2004/0041849 A1* | 3/2004 | Mock et al. | 345/867 |
| 2004/0068429 A1* | 4/2004 | MacDonald | 705/10 |
| 2006/0168006 A1* | 7/2006 | Shannon et al. | 709/206 |

\* cited by examiner

SYSTEM AND METHOD FOR USER NOTIFICATION

This application is a continuation-in-part of U.S. application Ser. No. 10/446,574, filed May 27, 2003 entitled "System and Method for Services Provision in a Peer-To-Peer Environment", U.S. application Ser. No. 10/447,115, filed May 27, 2003 entitled "System and Method for Message Handling in a Peer-To-Peer Environment", and U.S. application Ser. No. 10/446,576, entitled "System and Method for User Interaction in a Peer-To-Peer Environment", each of which was filed May 27, 2003 now abandoned and is incorporated herein by reference.

FIELD OF INVENTION

This invention relates to systems and methods for user notification.

BACKGROUND INFORMATION

In recent years, the amount of data produced and received by computers, such as mobile nodes, has increased greatly. For example, many individuals have come to rely upon chat and messaging services in preference to conventional mail for textually-related communications. Similarly, many individuals have come to prefer file sharing to conventional venues for receiving content such as record stores, software stores, radio, television, and movie theaters. Moreover, the computers, such as mobile nodes, offer capabilities to individuals to create and edit digital content items (e.g., images, video clips, audio recordings and the like) by themselves. In many cases, individuals would like to share these digital items with other individuals with file sharing technologies.

Accordingly, there may be interest in technologies that aid users in keeping up with the increase in data.

SUMMARY OF THE INVENTION

According to various embodiments of the present invention, there are provided systems and methods applicable, for example, in having a node inform its user of one or more events while the user interface of the node is in an idle state. In various such embodiments, the user may choose to select one or more of the events of which she is informed for corresponding operations.

The events of which the user is informed might include, for example, events corresponding to software operations and/or events corresponding to a network environment (e.g., a peer-to-peer environment).

DETAILED DESCRIPTION OF THE INVENTION

General Operation

According to various embodiments of the present invention, there are provided systems and methods applicable, for example, in having a node inform its user of one or more events while the user interface of the node is in an idle state. In various embodiments, the node could, for example, so inform its user by way of a screensaver or the like.

Such events can include, for example, events corresponding to software operation, events corresponding to a network environment, and/or the like. Such a network environment might be, for instance, a peer-to-peer environment, perhaps one employing authenticated connections as is discussed in greater detail below.

In various embodiments, the events for which the node so informs its user can be in accordance with one or more specifications. Such specifications might, for example, indicate the types of events for which the node should inform its user, metadata and/or other parameters relating to events for which the node should inform its user, and/or the like. The specifications might, for instance, be provided by the user, a system administrator, and/or the like.

Further, in various embodiments, the node's user is able to employ her node to select for corresponding operations one or more of the events of which she is informed. Such selection of an event could, for example, result in the activation of appropriate software, result in the presentation of various corresponding information to the user, allow for the user to perform various corresponding operations, and/or the like.

Various aspects of the present invention will now be discussed in greater detail.

Activation and Event Specification

Figure 1:
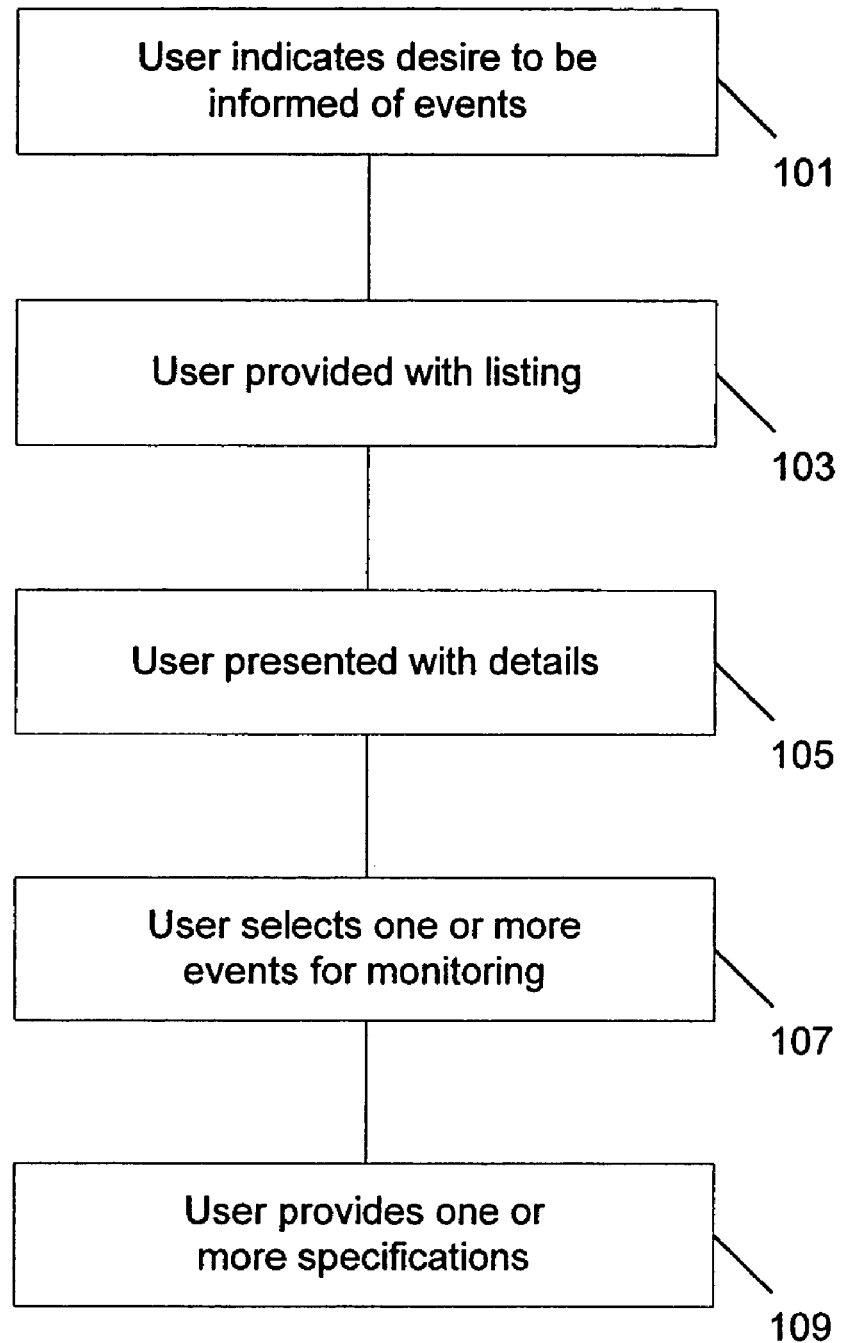
FIG. 1 is a diagram depicting exemplary steps involved in activation and event specification according to various embodiments of the present invention.

As shown in FIG. 1, according to various embodiments of the present invention, a user wishing to be informed of events by her node while the user interface of her node is in an idle state might indicate a desire to do so (step 101). Such indication might, for instance, be via the user interface of her node.

As alluded to above, in various embodiments the events for which the user is informed can be in accordance with one or more specifications. In embodiments where such specifications are to be provided by the user, the node can act to query its user for such specifications. Such query might, for instance, be via the node's user interface As a first step in querying for such specifications the node could, for example, provide its user with a listing including, for instance, entries corresponding to software, entries corresponding to network environments (e.g., a peer-to-peer environments), and/or the like with respect to which she could be informed of events (step 103).

As a specific example, the user might be presented with entries corresponding to software running on her node with respect to the operation of which she could be informed of events as discussed above. As another specific example, where the user is a member of one or more peer-to-peer groups in a peer-to-peer environment, the user might be presented with a listing of groups, of which she is a member, for which she could be informed of events as discussed above.

In various embodiments, the node might list software, available for running on the node or elsewhere (e.g., as a web service), with which interprocess communications can be established. Such software might, for example, be software with which communications can be established via Simple Object Access Protocol (SOAP), Remote Method Invocation (RMI), Java Messaging Service (JMS), Common Object Request Broker Architecture (CORBA), Applescript/Apple Events, Visual Basic for Applications (VBA), and/or the like. As is discussed in greater detail below, via such interprocess communications the node can, for example, communicate with software running on the node and/or elsewhere with regard to events occurring, for instance, with relation to that software. It is noted that, in various embodiments, where such software runs elsewhere than on the node, peer-to-peer messaging or the like might be employed in communicating with the software.

In certain such embodiments, the node could be provided with indications of software for which such communications could be established, and the node could examine the list in light of software available for running in order to determine which of the software should be presented to the user in the listing. Such indications might, for instance, be provided by a system administrator or the like.

As another example, in various embodiments the node might not employ and/or receive such indications. Instead, the node might access software available for running in order to determine if interprocess communications were available. For example, the node could attempt to query the available software using one or more interprocess communications protocols, and see if appropriate responses were received.

In embodiments where the user is presented with entries corresponding to one or more network environments, the node might list groups (e.g., peer-to-peer groups), connections, and/or the like with respect to which the node knew it possible for entities, messages, and/or the like to be, as is discussed in greater detail below, received, bypassed, and/or the like. The node might know of such in a number of ways. For instance, as discussed in greater detail below, the node might know of such via received group information.

In various embodiments, the user could select from a list of the sort noted above an entry (e.g., software or a group). In response, the node could present the user with details regarding the corresponding events for which she could be informed (step 105).

The node might know of the events in a number of ways. For example, the node might know of such via information included with the above-discussed received indications of software for which such communications could be established. As another example, the node might know of such via received group information. As yet another example, the node might know of such via performed queries. For instance, the node might act to query software with which interprocess communications could be established for information regarding commands that could be sent, queries that could be made, and or the like. As a specific example, the node might dispatch to software a request to receive a dictionary of commands, messages, and/or the like understood by the software.

To illustrate by way of example, in the case where the user selects a software item from a presented list, the node could present the user with information regarding various events for which monitoring could be performed, and could allow the user to select one or more of the events for monitoring (step 107). In various embodiments, the node could allow the user to provide one or more specifications regarding the circumstances under which an event should be brought to her attention (step 109). Such specifications could include, for instance, metadata, values, ranges, and/or the like.

As a specific example, where software corresponding to a selected event operated to be aware of when a node corresponding to a user held in a maintained address book came to be nearby, and the selected event was such a held user's node coming nearby, it could be specified by the user that the event only be brought to her attention in the case where the held user was one of one or more specified held users, where the time of day fell within a certain range, where the location was one of one or more specified locations or fell into a location range (e.g., within a specified circle having its center at a specified geographic coordinate), and/or the like.

As another example, in the case where the user selected from a presented list a peer-to-peer group, the node could, perhaps in a manner analogous to that discussed above, present the user with information regarding various events for which monitoring could be performed, allow the user to select one or more of the events for monitoring, and/or allow the user to provide one or more specifications regarding the circumstances under which an event should be brought to her attention.

As a specific example, where the user selected a particular peer-to-peer group, the user could be presented with monitorable events including, for instance, receipt of a message or entity directed towards the node, receipt of a message or entity for bypassing, and/or the like. In various embodiments, the user could be presented with more specific monitorable events such as, for instance, receipt of announcement of availability of an entity (e.g., a content entity), receipt of an invitation (e.g., a group invitation), receipt of a chat or instant messaging message, receipt of a requested entity, receipt of indication of successful completion of entity upload, and/or the like.

In, for example, the case where the user indicated that she wished to be notified of the receipt of a message or entity for bypassing, the user could specify that she wished to be notified in the case where received by her node was a content item entity associated with one or more of metadata specified by her.

As a specific example, suppose the user indicated that she wished to be notified of the receipt of a message directed towards her node and/or of the receipt of a message for bypassing with respect to a particular peer-to-peer group for fans of hockey of which she was a member. If the user was interested in knowing about happenings in a particular in-progress game via postings, placed by group members monitoring the game, in one or more chat boards associated with the group, the user could specify corresponding metadata and/or other information.

It is noted that, in various embodiments, where the user selected a particular peer-to-peer group, the user could be provided with the option to be presented with generic activity levels with respect to the group and/or with summaries of recent activities with respect to the group. In various embodiments, generic activity levels could include, for instance, amount of new content made available in a particular time period, activity of members, chat activity levels, and/or the like. In various embodiments, a user that has chosen to be presented with such generic activity levels and/or summaries could receive notification of such levels and/or summaries via a screensaver or the like, perhaps in a manner analogous to that discussed below. It is noted that, in various embodiments, such levels and/or summaries could be made available periodically.

Generic activity levels and summaries of recent activities could be prepared in a number of ways. For example, in various embodiments the node could act to collect information regarding various events occurring within the appropriate peer-to-peer group, and to enumerate the data to create activity levels and/or to summarize the data to create summaries of recent activities. Such collection could, for example, be performed in a manner analogous to that discussed herein. Enumeration and summarization of collected events could, for example, be performed according to various techniques known in the art. In various embodiments, where an activity level or a summary is to relate to a particular time period, the node might, in preparation of the activity level or summary, act to filter out events not pertaining to that time period. As a specific example, the node might act to filer out events older than a particular number of days.

As discussed above, in various embodiments the node could act to create activity levels and/or summaries. Alternately or additionally, in various embodiments activity levels and/or summaries could be created by a super peer or the like. The super peer could, for example, be the node of a group manager of an appropriate peer-to-peer group. As another example, the super peer could be a server. Such a super peer could, in various embodiments, act in a manner analogous to that discussed above. In various embodiments, the super peer could make created activity levels and/or summaries available to nodes, perhaps via push. The super peer could, as alluded to above, in various embodiments make such activity levels and/or summaries available periodically.

It is further noted that, in various embodiments, the functionality by which metadata could be specified as discussed above could, for instance, be implemented in a manner analogous to that discussed below with respect to searching. It is further noted that, as alluded to above, in various embodiments the events for which the user is informed could, alternately or additionally, be in accordance with one or more specifications not provided by the user. Accordingly the node might, in various embodiments, receive such specifications from a system administrator or the like. Such specifications might, for instance, be received via network (e.g., via one or more peer-to-peer connections and/or membership in one or more peer-to-peer groups), be placed on the node at a customer service kiosk or the like, and/or the like.

Event Monitoring and Display

Figure 2:
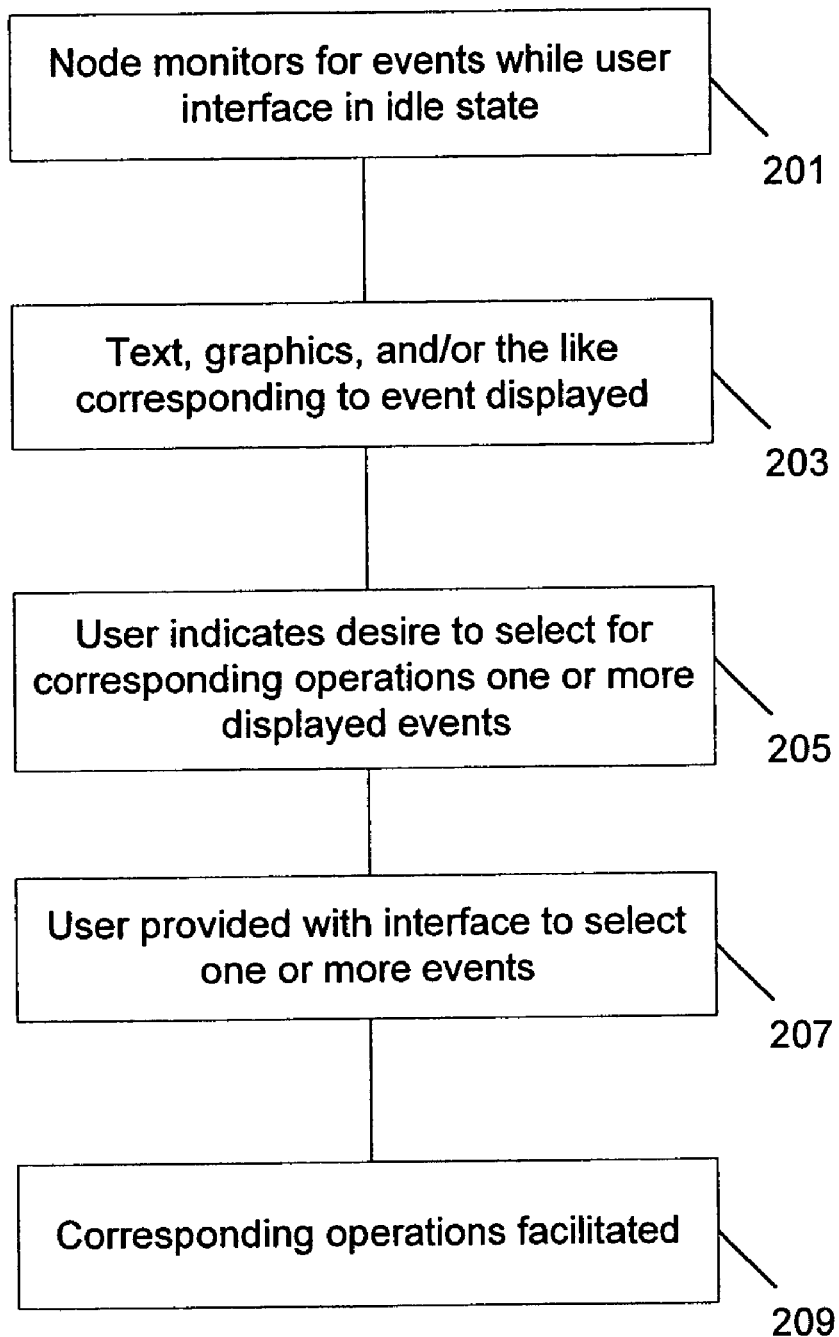
FIG. 2 is a diagram depicting exemplary steps involved in event monitoring, display, and selection of presented events according to various embodiments of the present invention.

With reference to FIG. 2 it is noted that, as alluded to above, according to various embodiments of the present invention the user's node could act, during the time that its user interface is in an inactive state, to monitor for events and to inform its user of occurrences of those events in accordance with one or more specifications. As noted above, such informing could, in various embodiments, be by way of a screensaver or the like. The functionality whereby the node could monitor for events while its user interface is in an inactive state (step 201) could be implemented in a number of ways.

For example, in various embodiments of the present invention, the node could periodically query software corresponding to events being monitored, perhaps via interprocess communication as discussed above. Such querying could be performed in a number of ways. For example, in various embodiments the node could act to include in such a query data relating to one or more of provided specifications regarding a monitored event. The extent to which data relating to provided specifications could be included in the query could depend upon the sorts of queries the software was capable of answering.

In the case where the node includes in the query data relating to all provided specifications regarding the corresponding event, the node, receiving a response to the query, might not need to perform further processing to know if its user should be informed. For example, the node might receive a "yes" or "no" response to its query, and inform its user in the case where a "yes" was received. In various embodiments, included with such a query response could be additional information.

As a specific example, suppose the node's user indicated that she wished to be informed in the case where specified software came to complete rendering of a specified image. When the node's user interface came to be in an idle state, the node might act to periodically query the specified software, the query including indication of the specified image and querying as to whether rendering had been completed with respect to that image. In response, the node could receive a "yes" or "no" answer.

In the case where the node includes in a query data relating to none or only some of the provided specifications regarding an event, the node might need to perform further processing to know if its user should be informed. For example, the node might receive in response to its query one or more details regarding the occurrence of an event, and the node could act to examine those details in order to determine if the event should be reported to its user.

As a specific example relating to the above-described situation where the user indicated that she wished to be informed of completion of rendering, the node might query the specified software as to whether any renderings had been completed, but not include in the query indication of any of the specified image. In response, the node could receive an indication of those images for which rendering had been completed. The node could then consider the query response in light of the specified image to determine if rendering had been completed with respect to the specified image, and could act to appropriately inform its user in the case where such was found to be the case.

In the above described examples, the node queried appropriate software in determining if it should inform its user of occurrence of an event. It is noted that, in various embodiments, the node might instead receive notifications from appropriate software when events occurred.

In such embodiments, the node might take action to inform appropriate software of its desire to receive notifications regarding event occurrences, the node perhaps indicating one or more corresponding details, one or more of the details perhaps corresponding to provided specifications of the sort noted above. The extent to which details could be indicated could depend upon the capabilities of the appropriate software.

In various embodiments the amount of processing the node would need to perform to know if its user should be informed upon its receipt of a notification from appropriate software could, perhaps in a manner analogous to that discussed above, depend upon the amount of details the node provided to the software. The actions performed by the node upon receiving a notification could, in various embodiments, be analogous to those performed upon receiving a response to a query as discussed above.

As noted above, events for which the node is to inform its user could, in various embodiments, relate to events in a network environment (e.g., a peer-to-peer environment). For instance, as alluded to above, such an event might correspond to receipt of a message or entity directed towards the node, receipt of a message or entity for bypassing, receipt of an announcement, receipt of an invitation, receipt of a chat or instant messaging message, receipt of a requested entity, and/or the like with respect to a group, in a peer-to-peer environment, of which the node's user is a member. It is noted that, in various embodiments, as discussed in greater detail below, receipt of such in a peer-to-peer environment could be with respect to one or more peer-to-peer groups of which the node's user is a member, and connections to other nodes with respect to such peer-to-peer groups could be authenticated connections.

Next, the node could examine that which is received in order to determine if its user should be notified. Such functionality could be implemented in a number of ways. For example, in the case where metadata had been specified, the node could act to examine metadata associated with that which was received in order to determine if the user should be notified. Such examination could, for example, be performed in a manner analogous to that discussed below. As another example, the node could perform tasks such as textual searching, image analysis, sound analysis, other data analysis, and/or the like with respect to that which was received in order to determine if its user should be informed.

After determining that it should inform its user of the occurrence of an event, the node could take action to so inform its user while its user interface is in an idle state. The functionality whereby the node could inform its user could be implemented in a number of ways. For example, as alluded to above, the node could act to inform its user by way of a screensaver or the like. In various embodiments, the node might activate a vibrator, illuminate a light, make a sound, and/or the like to inform the user upon a new event was being presented.

According to various embodiments, text, graphics, and/or the like corresponding to the event could be displayed via the screensaver or the like (step 203). Display could, for instance, be such that the text, graphics, and/or the like scrolled. Scrolling could, for example, be two-dimensional such that that scrolling would appear to be within the plane of the display. Alternately, scrolling might be three-dimensional such that scrolling would, for instance, appear to move, at least to some degree, with respect to the axis perpendicular to the plane of the display. Accordingly such scrolling could, for example, appear to move, at least to some degree, toward or away from the plane of the screen.

Varying amounts of information corresponding to the event could, according to various embodiments of the present invention, be conveyed via the text, graphics, and/or the like. For example, conveyed could be the type of event, and/or one or more details regarding the event.

As one specific example, where the event corresponded to receipt of a media item, conveyed could be the title of the media item, the genre of the media item, an image corresponding to the media item (e.g., an album cover, movie poster, or film frame) and/or the like. As another specific example, where the event corresponded to receipt of a message (e.g., a message corresponding to a chat group of which the user was a member), conveyed could be the title of the message, a summary of the message, and/or the like. As still another specific example, where the event corresponded to a node of a user held in a maintained address book coming to be nearby, conveyed could be various address book information corresponding to that user (e.g., name, phone number, and/or address), an image of that user, and/or the like. It is noted that, in various such embodiments, such an image might be held in the address book, and/or received from the node of that user, perhaps when that user's node came to be nearby.

It is noted that, in various embodiments, a user being informed of the occurrence of events could be informed of the occurrence of multiple events simultaneously. For instance, the text, graphics, and/or the like corresponding to each of the multiple events could simultaneously scroll in the screensaver or the like. As a specific example, there might be six scroll lines. Alternately or additionally, text, graphics, and/or the like might be presented which corresponded to more than one event. As a specific example, text indicating that two new chat messages had been received could be displayed.

It is noted that the visual display described herein could be implemented in a number of ways. As specific examples, OpenGL, NokiaGL, and/or the like could be employed. It is further noted that, in various embodiments, the user could be able to set various preferences and/or the like regarding the visual display. For instance, the user could be able to select scrolling speed, number of scroll lines, colors, whether two-dimensional scrolling or three-dimensional scrolling should be employed, and/or the like.

Selection of Displayed Events for Corresponding Operations

As noted above, in various embodiments of the present invention the user can employ her node to select for corresponding operations one or more of the events of which she is informed. Such functionality can be implemented in a number of ways.

With further reference to FIG. 2 it is noted that in embodiments of the present invention where the node informs its user of events via a screensaver or the like as discussed above, the user could, for example, be able to indicate to her node a desire to select for corresponding operations one or more of the events of which she is being informed (step 205). The functionality by which the user could express such a desire could be implemented in a number of ways. For example, in various embodiments the user could express such a desire by pressing one or more of particular keys on a keypad, keyboard, and/or the like associated with her node.

In response the node could, in various embodiments, provide an interface whereby the user could select for corresponding operations one or more of the events of which she is being informed (step 207). Such functionality could be implemented in a number of ways. For example, in various embodiments the node could act to capture the current visual state of the screensaver or the like providing event information, and to display the captured visual state in a manner that allows the user to select the portions of the visual state corresponding to one or more events in order to select those events for corresponding operations. As another example, in various embodiments the node could act to provide a listing having an entry for each of the events of which the user is being informed by way of the screensaver or the like, and could allow the user to select one or more of the events for corresponding operations.

In response to the user's selection of an event, the node could act in a number of ways to allow for corresponding operations (step 209). For example, where the selected event related to software, the node could, in various embodiments, act to allow the user to interact with the software and/or other related software. For instance, the node could present the user with an appropriate user interface.

The appropriate user interface could, in various embodiments, be one related to the event. For example, where the selected event related to software completing a rendering, the node could provide the user with an interface of software for viewing renderings. As a another example, where the selected event related to a node of a user held by address book software coming to be nearby, the user being informed of events could be provided with an appropriate user interface of the address book software. Such an appropriate interface might, for instance, be one allowing the user to view and/or edit the address book entry corresponding to the user of the node that came to be nearby.

As noted above an event may, in various embodiments, be an event corresponding to a network environment. Where such a presented event is selected by the user, her node could, in various embodiments, act to allow for operations corresponding to the event. For example, where the selected event relates to receipt of a media entity or the like in a network environment (e.g., via an authenticated peer-to-peer connection as discussed below), the node could activate appropriate software to allow the user to consume the media entity. For instance, in the case where the media entity is video, the node could activate video viewing software.

As yet another example, where the selected event relates to receipt of a chat message or the like in a network environment (e.g., via an authenticated peer-to-peer connection as discussed below), the node could activate appropriate software to allow the user to interact with a corresponding chat board.

As a further example, where the selected event relates to receipt of an invitation or the like in a network environment (e.g., via an authenticated peer-to-peer connection as discussed below), the node could activate appropriate software to allow the user to interact with the invitation.

It is noted that in various embodiments, in response to the user's selection of an event of which she is notified, additional information relating to the event could be displayed to the user. Such additional information could include, for example, details of the event not presented via the above-noted text, graphics, and/or the like.

It is further noted that various aspects of peer-to-peer, authenticated connections, entities, instant messaging, chat, invitations, and the like applicable in various embodiments of the present invention are discussed in greater detail below. It is further noted that, as discussed above, a received entity or message might, in various embodiments, be received for purposes of passsthrough as is discussed in greater detail below.

General Peer-to-Peer Operation

As alluded to above, according to various embodiments of the present invention there are provided systems and methods applicable, for example, in the provision of various services such as sharing, messaging, and chat in a peer-to-peer environment. The services are applicable, for example, among users forming groups in the peer-to-peer environment. The peer-to-peer environment can, for example, be a network in which each participant node has equivalent capabilities and/or responsibilities. Such differs from general client/server architectures, in which some computers are dedicated to serving the others.

In various embodiments, communication between nodes in a peer-to-peer environment can take place via one or more intermediate nodes belonging to the same peer-to-peer environment. The peer-to-peer environment might, for instance, consist of users' nodes and service providers' nodes. It is noted that, in various embodiments, messaging can be implemented via application layer routing between nodes.

In various embodiments, connections between nodes can be maintained, for example, at the application layer (Open System Interconnect layer 7). It is noted that, where there is a direct, single hop link between two nodes belonging to one or more common groups, such may be employed in various embodiments. It is further noted that different physical media and different lower layer networking technologies can be used to form connections between nodes in various embodiments. Moreover, it is noted that various embodiments of the present invention provide a peer-to-peer environment employing middleware and/or communications applications enabling, for instance, group collaboration and/or communication.

As noted above, embodiments of the present invention provide various services. Such services could, for example, be made available to users having nodes such as wired or wireless terminals. Such terminals could have one or more network interfaces. The interfaces could be, for instance, Bluetooth, 802.11b, 802.11g, GPRS (General Packet Radio Service), EDGE (Enhanced Data rate for Global System for Mobile communications Evolution), UMTS (Universal Mobile Telecommunications Service), DVB-T (Terrestrial Digital Video Broadcast), DVB-X, and/or Ethernet interfaces.

In various embodiments of the present invention, messages can be passed between nodes, for example, for the provision of the above-mentioned services. Further, various embodiments of the present invention provide user interfaces applicable, for example, to the provision of such services.

Various aspects of the present invention will now be discussed in greater detail.

Message Handling

According to various embodiments of the present invention, messages of various types may be passed between nodes. For example, instant messages targeted to selected nodes or a whole group of nodes, search query messages, search reply messages, item request messages, and/or dispatch messages may be passed. For various embodiments of the present invention, such message passing occurs at the application layer (i.e., Open Systems Interconnect (OSI) layer 7). It is further noted that, according to various embodiments of the present invention, a node may maintain one or more entity reference tables relating to how various network-reachable entities may be reached. Such an entity might be, for instance, a node, a group, or a downloadable item (e.g., a media item or a program file). An entity reference table can, in various embodiments of the present invention, be populated based on information received via analyzing messages passed by the node and/or targeted to the node. For instance, there could be a hierarchical set of entity reference tables, and/or updating of the entity reference tables could happen in a hierarchical way to avoid extra processing load. The lowest level entity reference tables could, in various embodiments, be updated by the lowest level routing part of peer-to-peer software modules that analyze all peer-to-peer system messages. The message analyzing could, for instance, be done when the software modules are making routing decisions for a peer node regarding internal routing and/or routing to external nodes via one or more connections.

The entity reference table updates could, for example, contain information of connections with accessibility information of peer nodes and peer groups. In another exemplary hierarchy level there could be specific entity reference tables for a group that are that are updated by analyzing group-specific information regarding messages (e.g., access to nodes of group members). In various embodiments, messages and/or the like related to the group-specific operations (e.g., file sharing) could be analyzed. Such messages and/or the like could, for instance, include content queries and replies. In various embodiments, appropriate updates could be made to entity reference tables regarding, for example, the accessibility of content items and/or peer nodes, even though the physical connections between nodes might not be known and/or might not be maintained in the group specific hierarchy level.

With respect to a particular entity, an entity reference table could list metadata and/or other parameters relating to that entity. Alternately or additionally the table could, with respect to the particular entity, include an indication as to how the entity could likely be reached and/or accessed. For example, where the entity is a content item or the like, and the content or the like is stored on the node corresponding to the table, the table could indicate where on the node the item is stored. As another example where the entity is a content item or the like, the table could indicate a remote node, directly accessible node, and/or link to be used that could likely provide the item in response to a request. It is noted that, in various embodiments, such a remote node could either hold the item in an associated store and/or could act to receive the item via the action of one or more nodes and provide it in response to a request. As a specific example, a first remote node might act, in response to a request, to provide the entity after receiving it from a second remote node that had received it from a third remote node that held the item in an associated store.

In various embodiments where an entity reference table indicates a remote node that can provide an item in response to a request, the table could provide an indication of how many hops (e.g., node-to-node hops) would likely be required to receive the item. Accordingly, with respect to the specific example above, it is noted that an entity reference table listing the first node with respect to the content item could indicate that three hops would be required for the item to be received. In various embodiments, such an indication of number of hops could provide additional information with respect to the hops. For instance, it could be indicated that receipt of a certain content item via a specific node would require two Bluetooth hops, two wired Internet hops, and one UMTS (Universal Mobile Telecommunications Service) hop. It might be further indicated that execution of the UMTS hop would involve incurring a network use fee.

With respect to a node entity, operation could be similar to that discussed above with respect to a content item entity. For example, a node could include in an entity reference table a unique identifier with associated metadata corresponding to a particular node along with information regarding how the particular node could be reached. Where, for instance, the particular node was directly reachable by the node corresponding to the table, the table could list a network address, unique identifier, and/or the like corresponding to the particular node. Where, for instance, the particular node was not directly reachable by the node corresponding to the table, the table could, in a manner analogous to that discussed above with respect to a content item or the like, indicate a remote node that could act to provide access to (e.g., pass a message to) the particular node. In a manner analogous to that discussed above, such a message might, in various embodiments, be passed from the indicated remote node to the particular node via one or more additional remote nodes having sufficient information regarding the particular node (e.g., an appropriate unique identifier). In a manner further analogous to that discussed above, the table might list along with the indicated remote node a specification of how many hops would be involved in passing a message to the particular node via the indicated remote node, and perhaps additional information with respect to the hops.

Figure 3:
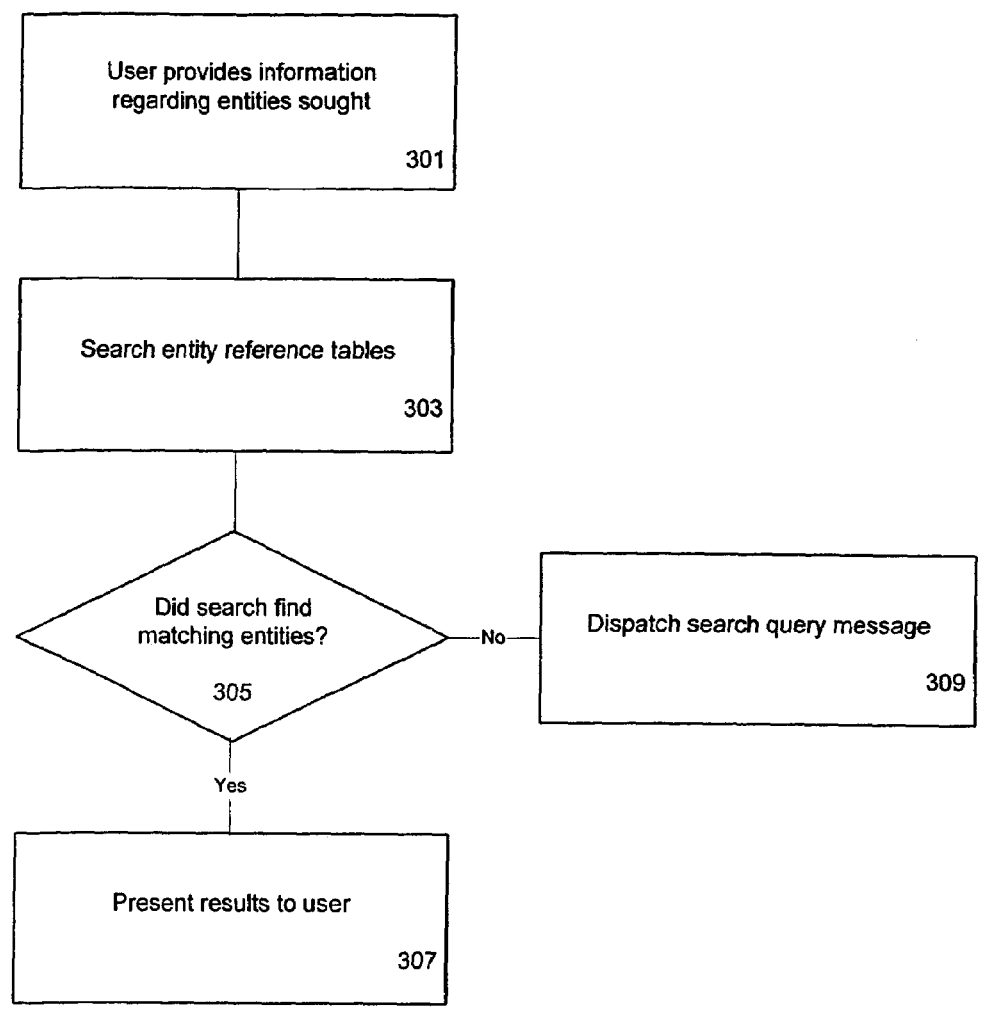
FIG. 3 is a diagram depicting exemplary steps involved in sending of a search query message according to various embodiments of the present invention.

As noted above, one type of message that may be passed between nodes is a search query message. Such a message could be employed to find entities such as, for example, items (e.g., media items), group descriptions, information regarding group member users, metadata relating to chat, and/or the like. In various embodiments, such a message could be employed to find entities corresponding to specified metadata. As shown in FIG. 3, a user wishing to find entities might enter appropriate data and/or make appropriate selections via a GUI (Graphical User Interface) or other interface of her node so as to indicate the type and/or types of entities sought, and corresponding metadata and/or other parameters (step 301).

In response, the user's node could, in accordance with the user's indication, act to search maintained entity reference tables with respect to each entity for which the tables indicated one or more nodes and/or links capable of providing and/or providing access to the entity. Further in response, the user's node could, in accordance with the user's indication, act to search maintained entity referenced tables with respect to each entity for which the tables indicated that the user's node had cached the entity and/or had direct access to the entity (step 303).

In various embodiments, a node might cache an entity or a portion of an entity, for example, in the case where the entity is a media item or the like and the node acts to cache the entity during the process of receiving it from one node and passing it to another node. The node could, in various embodiments, act to cache metadata describing a content entity, a group member, or the like as a separate entity item. A particular node might have direct access to an entity, for instance, where the entity is held by a node that is directly accessible by the particular node via the network without the aid of a third node (e.g., accessible via a single transmission layer link), or where the entity is held by the particular node. As another example, an entity (e.g., a node) could be thought of as being directly accessible where it is accessible via a network layer connection without intermediate nodes doing any specific peer-to-peer application layer processing and/or analysis to bypass messages.

A node could act to include in maintained reference tables such information regarding directly accessible nodes in a number of ways. For instance, the node could employ device discovery (e.g., Bluetooth device discovery), broadcast on established and/or well-known ports listen on established and/or well-known ports, and/or the like in order to discover directly accessible nodes. Alternately or additionally the node could, in various embodiments, try to establish connection using, for instance, the network addresses of already-known nodes, and/or by querying a dedicated peer register for, for instance, the current network addresses of the nodes. Upon finding such a node, that node could be queried for corresponding metadata and/or other parameters. A reference table entry could then, in various embodiments, be established with respect to the found node, the entry including the received unique identifier with metadata and/or other parameters, and perhaps a network address or the like corresponding to the found node.

In the case where the user's node, via searching its reference tables as just noted, found entities matching the user's indication, the node could present its user, perhaps via a GUI or other interface, with data corresponding to the found entities (step 305, 307). For example, the user could be presented with the metadata, or a portion thereof, corresponding to each found entity. Also presented to the user could be information relating to the number and/or type of hops required to reach a found entity. Where a found entity is cached, indication of such might be provided to the user. The user might be additionally presented with an option to have further searching performed. For instance, the user could be queried as to whether or not the search yielded what she was looking for.

In the case where the node, searching its reference tables as just noted, found no entities matching the user's indication, and/or where the user provided indication that further searching should be performed, the node could act to create and dispatch a search query message (step 305, 309). Such a search query message could contain one or more of a number of entries.

A first such entry could indicate one or more recipients for the message. The recipients could be indicated, for instance, by network address, unique identifier of a group, unique identifier of a node, and/or the like. In various embodiments, the indication of recipient could specify a multicast address or the like. Such an entry might, for example, be labeled "to".

A second such entry could indicate the node that created the message. Indication of node could be, for example, via network address, unique identifier, and/or metadata. Such an entry might, for example, be labeled "originator". A third such entry could indicate the number of hops the message had traveled from the node that created it. The entity might act to list number of hops with respect to hop type (e.g., Bluetooth or UMTS hop). Such an entry might, for example, be labeled "hops".

A fourth such entry could indicate the last node to dispatch the message. Such an entry might, for example, be labeled "immediate node". Indication could be, for example, as described with respect to the originator entry. A fifth such entry could indicate the type and/or types of entities sought, and corresponding metadata and/or other search parameters. Such an entry might, for example, be labeled "search data". A sixth such entry could specify metadata and/or other parameters associated with the node that created the query. Such an entry might, for example, be labeled "originator data".

In creating such a query message, the user's node could, for example, act to set the second entry to indicate itself, to set the third entry to list zero hops, to set the fourth entity to indicate itself, to set the fifth entity to list the data provided by its user, and to set the sixth entry to list its own metadata. The first entity could, for example, be set by the user's node so as to specify delivery to one or more directly-accessible nodes. The one or more directly-accessible nodes could be, for instance, ones found by the user's node via device discovery, port monitoring, and/or port broadcast operations of the sort noted above. Alternately or additionally, the nodes could be ones found by establishing connections to network addresses of already known peers, or to network addresses queried from a peer register. A peer register could, for instance, be a distributed or centralized register where currently active peers can perform registration with their current network addresses. In various embodiments, as alluded to above, the first entry could be set so as to implement multicast delivery. After creating the search query message, the user's node could act to have it delivered to its recipient nodes.

The operations performed by a node upon receiving a search query message will now be described. Such a node could receive a search query message from either the node that originated it, or from another node that had previously received it. As a specific example, a first node could receive a search query message from a second node, wherein the second node had received the message from a third node, and the third node had received the message from the node that created the message.

Figure 4:
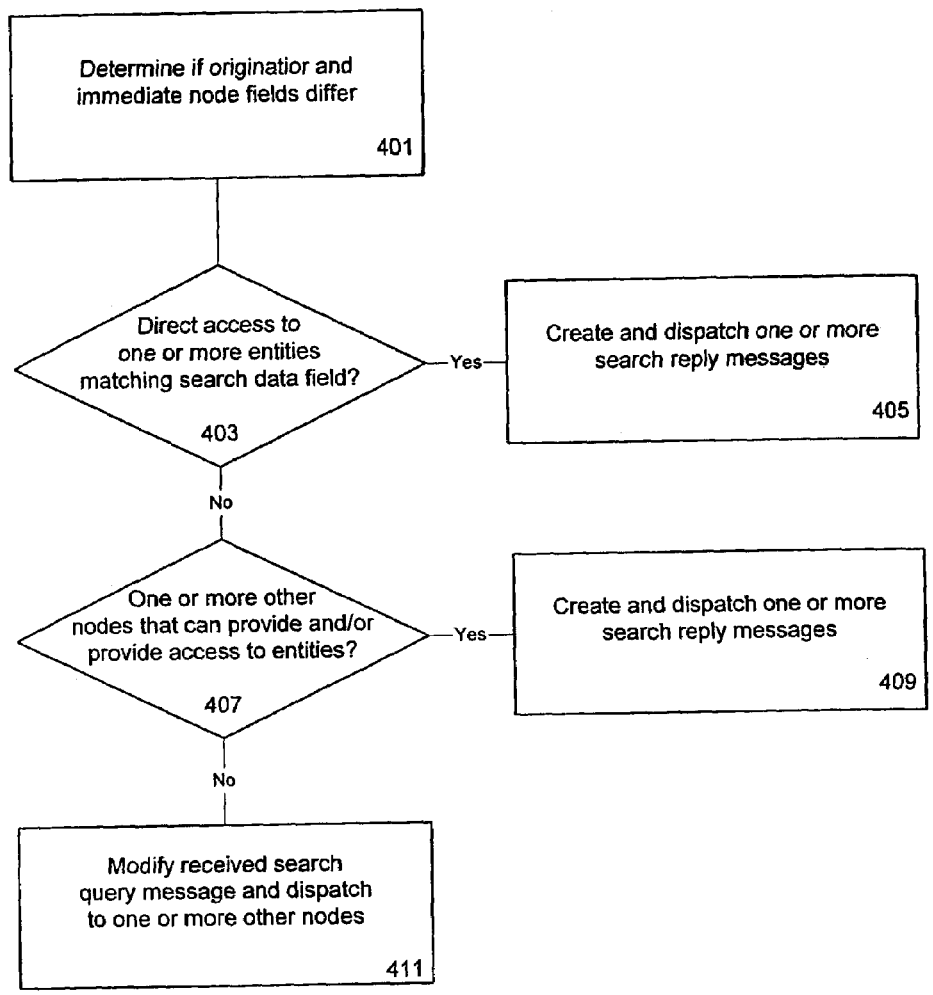
FIG. 4 is a diagram depicting exemplary steps involved in search query message receipt according to various embodiments of the present invention.

With respect to FIG. 4 it is noted that, after receipt of a search query message at a recipient node, the recipient could first examine the originator and immediate node fields to see if the two differed (step 401). If the two differed, the recipient node could, perhaps in light of the data listed in an originator field of the message, determine if its entity reference table included an entry corresponding to the originator node. If such an entry existed, the recipient node could add to the entry an indication that the node specified in the immediate node field could act to provide access to the originator node. Included with the indication could be data listed in a hops field of the message. The recipient node could next act to compare metadata and/or other parameters listed in the table corresponding to the originator node to the metadata and/or other parameters indicated in the originator field, and to update the metadata and/or other parameters of the table as necessary.

It is noted that, in various embodiments, upon receiving a message or the like, a node could act to prevent loop-back formation. Accordingly, for example, in various embodiments a message could contain source routing information such as, for instance, a list of nodes to which the message was passed. Such a list of nodes could, for instance, contain unique identifiers corresponding to the nodes. A node could, in various embodiments, check such a list before passing a received message to a next recipient node in order to determine if the next recipient node already existed in the source route list. If the node noticed that it was going to pass the message to a node that already existed in the source list, the node could, in various embodiments act to reconsider the routing decision and not send the message to the listed node in order to prevent formation of a loop-back. In the case where the node passed the message on to other nodes, it could add itself to the list.

In the case where such an entry did not exist, the recipient node could act to create in its entity reference table an entry corresponding to the originator node, and, in a manner analogous to that above, to include therein an indication that the node specified in the immediate node field could act to provide access to the originator node and perhaps data listed in a hops field of the message. Further included in the created entry could be data included in an originator field of the message.

As a next step, the recipient node could consult its table to determine if it had direct access to one or more entities matching what was specified in the search data field of the message (step 403). Accordingly, the recipient node could, for example, search its table for entity entries that corresponded to the entity type sought, listed metadata and/or additional parameters matching those specified in the message, and indicated direct access to the corresponding entity. Where, for example, the entities being searched for were nodes, direct access could, for instance, mean that connectivity of the sort noted above requiring no intermediate nodes could be established. Where, for example, the entities being searched were content items, direct access could, for instance, mean that the item was listed by the table to be stored on the node and available for sharing. In the case where the recipient node determined that it had such direct access it could act to create and dispatch one or more search reply messages corresponding to the found entities (step 405).

In various embodiments, unique identifiers could be associated with entity access. Accordingly, such a node having direct access could act to see if a unique identifier was already associated with the direct access. For example, such a unique identifier could exist in a table entry that indicated the direct access. If such a unique identifier did not exist, the node could create own and associate it with the direct access, perhaps placing the unique identifier in an appropriate table entry. Unique identifier creation could be performed in a number of ways. For example, random number generation and/or one or more equations could be employed in the creation. The newly-created or already existing unique identifier could be included with each of the above-noted one or more search reply messages.

In the case where the recipient node determined that it did not have such direct access, the node could consult its table to determine if it knew of one or more other nodes that could provide and/or provide access to entities matching what was specified in the search data field of the message (step 407). Accordingly, the recipient node could, for example, search its table for entity entries that corresponded to the entity type sought, listed metadata and/or additional parameters matching those specified in the message, and indicating one or more nodes that could provide and/or provide access to the corresponding entity. In the case where the recipient node discovered such table entries, it could act to create and dispatch one or more search reply messages corresponding to the found entities (step 409). As alluded to above, in various embodiments, the discovered table entries could hold a unique identifier associated with the access. Where the discovered table entries included such an identifier, the identifier could be included with each of the one or more search reply message.

In the case where the recipient node did not discover such table entries, it could act to modify the received search query message and dispatch it to one or more other nodes (step 411). As a first step in modifying the received search query message, the recipient node could act to update an included hops field of the received message, perhaps in light of the link by which the recipient node had the message. For example, in the case where the field indicated hop types, the recipient node could update the field of the message so as to increment by one the count corresponding to the interface by which the node received the message. As a specific example, where the message was received via a Bluetooth link, the hops count corresponding to Bluetooth hops could be incremented by one. In embodiments where the hops field of a message did not specify hop types and instead maintained a single counter, the recipient node could act to increment the single counter by one.

As a next step in modifying the received search query message, the recipient node could change the intermediate node field to indicate itself. In various embodiments, the node might alternately or additionally add itself to a list of nodes corresponding to loop-back determination of the sort noted above. As a further step in modifying the message the recipient node could, in a manner analogous to that described above, set the "to" field so as to specify delivery to one or more directly-accessible nodes. Next, the recipient node could have the modified search query message delivered to its recipient nodes. Upon receipt of the modified query message, each recipient node could act in a manner analogous to that just discussed with respect to operations performed by a node upon receipt of a search query message.

As discussed above a node, in response to receipt of a search query message, may act to create and dispatch a search reply message. Such operations will now be discussed in greater detail. A created search reply message could contain one or more of a number of entries.

A first such entry could, perhaps in a manner analogous to that discussed above with respect to search query messages, indicate one or more recipients for the message. Such an entry might, for example, be labeled "to". A second such entry could, perhaps in a manner analogous to that discussed above with respect to search query messages, indicate the node that created the message. Such an entry might, for example, be labeled "originator". A third such entry could, perhaps in a manner analogous to that discussed above with respect to search query messages, indicate the number of hops the message had traveled from the node that created it. Such an entry might, for example, be labeled "hops".

A fourth such entry could, perhaps in a manner analogous to that discussed above with respect to search query messages, indicate the last node to dispatch the message. Such an entry might, for example, be labeled "immediate node". A fifth such entry could specify metadata and/or other parameters associated with one or more found entities. Such an entry might, for example, be labeled "found entity data". It is noted that, as alluded to above, in some embodiments a search reply message could be created and dispatched with respect to each found entity, while in other embodiments a single search reply message corresponding to more than one found entity could be created and dispatched.

A sixth such entry could, perhaps in a manner analogous to that discussed above with respect to search query messages, specify metadata and/or other parameters associated with the node that created the message. Such an entry might, for example, be labeled "originator data". A seventh such entry could indicate the node that originally dispatched the search query message in response to which the search reply message was created, Such an entry might, for example, be labeled "query initiator".

In creating such a search reply message, a node could, for example, act to set the second entry to indicate itself, to set the third entry to list zero hops, to set the fourth entity to indicate itself, to set the fifth entity to list metadata and/or other parameters retrieved from its table that correspond to the one or more entities with respect to which the message is being created, to set the sixth entry to list its own metadata, and to set the seventh entry to list the content of the originator field of the search query message in response to which the search reply message was being created.

The first entry could, for example, be set by the node so as to specify delivery to the node from which it received the search query message in response to which the search reply message is being created. Accordingly, the first entry could be set to contain the data held in the immediate node field of the search query message.

As noted above, in various embodiments a search reply message could include a unique identifier corresponding to entity access. Such a unique identifier could, for example, be included as another entry of the sort noted above. For instance, there could, in various embodiments, exist a further such entry including a unique identifier corresponding to the appropriate access, the entry perhaps being labeled "access identifier". After creating the search reply message, the node could act to have it delivered to the appropriate recipient node or nodes.

The operations performed by a node upon receiving a search reply message will now be described. Such a node could, perhaps in a manner analogous to that discussed above with respect to search query messages, receive a search query message from either the node that originated it, or from another node that had previously received it.

Figure 5:
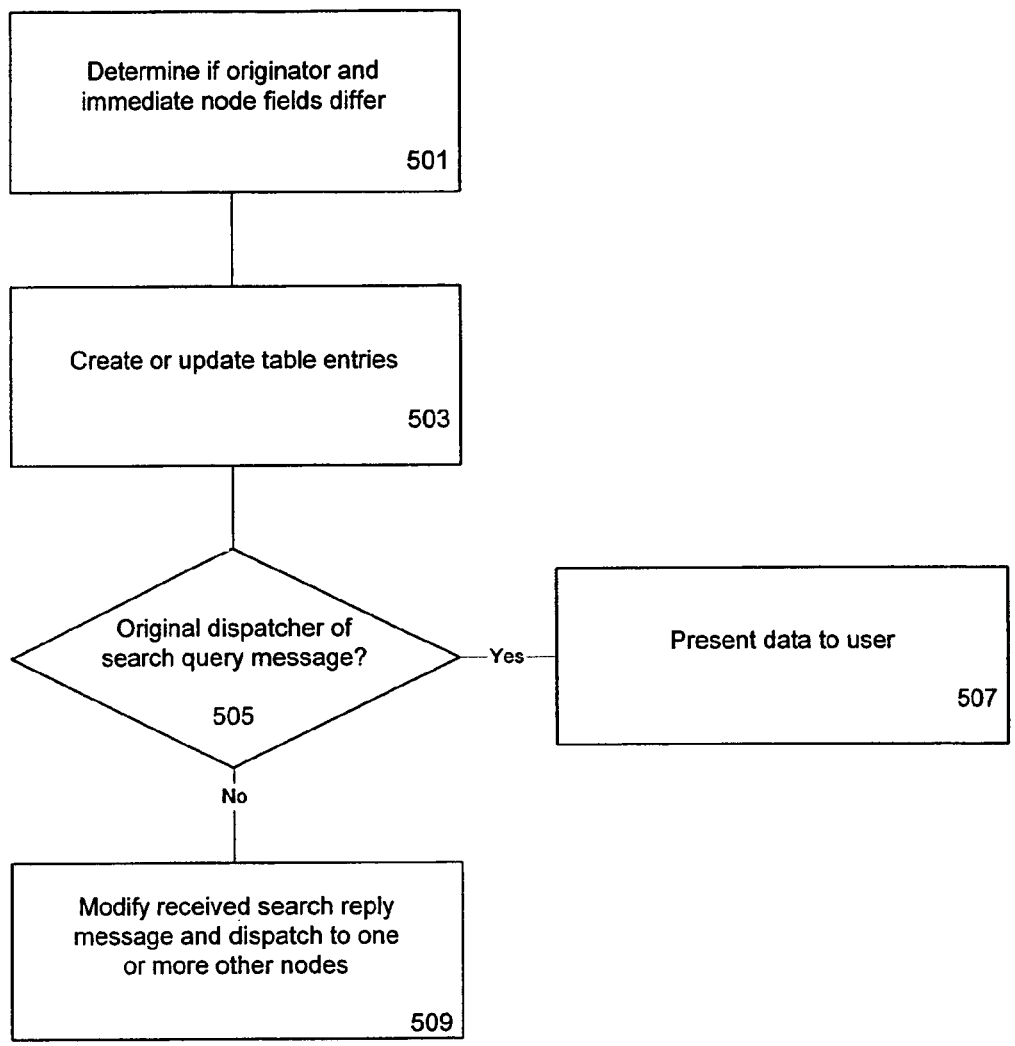
FIG. 5 is a diagram depicting exemplary steps involved in search reply message receipt according to various embodiments of the present invention.

With respect to FIG. 5 it is noted that, after receipt of a search reply message at a recipient node, the recipient could first examine the originator and immediate node fields to see if the two differed (step 501). If the two differed, the recipient node could, perhaps in a manner analogous to that described above with respect to receipt of a search query message, act to create or update a table entry corresponding to the originator node. Next, the recipient node could act to increment the hops field of the received message in a manner analogous to that discussed above.

As a next step, the recipient node could, perhaps in a manner analogous to that discussed above with respect to table entries corresponding to nodes, act to create or update table entries corresponding to the found entities with respect to which the query reply message was dispatched and created (step 503). Accordingly, a created and or updated table entry might indicate that the node specified in the immediate node field was capable of acting to provide and/or provide access to an entity with respect to which the query reply message was dispatched and created. In various embodiments, further listed could be data listed in an updated hops field of the message. In embodiments where a unique identifier corresponding to entity access was included with the received search reply message, the identifier could be included with the appropriate created or updated table entry. Additionally, the created and/or updated table entry could include data from the found entity data field.

As a next step, the recipient node could, perhaps by examining the query initiator field, act to determine if it was the node that originally dispatched the search query message in response to which the search reply message was created (step 505). Accordingly the recipient node could, for instance, compare an identifier (e.g., network address or unique identifier) listed in the query initiator field with its own corresponding identifier.

In the case where the recipient node found itself to be the node that originally dispatched the search query message, the node might act, perhaps in a manner analogous to that discussed above, present its user with data corresponding to the found entities (step 507). In the case where the recipient node found itself to not be the node that originally dispatched the search query message, the node might act to modify the received search reply message and dispatch it to one or more other nodes (step 509). It is noted that, in embodiments where the hops field was updated as discussed above, the dispatched message would contain the updated version of that field.

As a first step in modifying the received search query message, the recipient node could act to set the intermediate node field to indicate itself. In various embodiments, the node might alternately or additionally add itself to a list of nodes corresponding to loop-back determination of the sort noted above. As a further step in modifying the message, the recipient node could set the to field so as to specify delivery to the node from which it received the search query message in response to which the search reply message was created. Accordingly, the to field could be set to contain the data held in the immediate node field of the search query message.

Next, the node could act to have the updated search reply message delivered to the indicated recipient node or nodes.

Upon receipt of the modified message, each recipient node could act in a manner analogous to that just discussed with respect to operations performed by a node upon receipt of a search reply message.

As noted above, a user might specify to his node a desire to, for example, find entities of a certain type that are associated with certain specified metadata and/or other parameters. As also noted above, such a user could then be presented with data corresponding to entities matching his criteria. In various embodiments, where the user has been presented with downloadable entities (e.g., media items, data files, and/or programs), the user might be able to request receipt of one of the presented entities. The user might be able to make such a request, for instance, via a GUI or the like.

It is noted that, in various embodiments, a user being presented with data corresponding to entities matching his criteria might receive indication that a particular entity is available from more than one source. In such a case, the user could, in various embodiments, be given the option of requesting receipt of a particular entity from a particular node, and/or of indicating that the source could be chosen for her, perhaps in accordance with certain specified criteria containing, for example, conditions for certain cost and/or bandwidth requirements.

If the user requested receipt from a particular node, the user's node could act to create an item request message and dispatch it to the indicated node. If the user did not request receipt from a particular node, the user's node might, where any specified criteria allowed for provision via the node's cache, first check its tables with regard to the selected entity to determine if the entity existed in the cache. As alluded above, such a cache could, for example, act to store an entity that was received by the user's node for delivery to another node.

Accordingly, the user's node could locate in its table the entry corresponding the requested entity and see if it contains an indication that the entity is available via the node's cache. In the case where such an indication was found, the node could act to make the entity available to the user. For instance, the node could copy the entity from the cache to the user's data storage area. In the case where the user's node determined that the requested entity was not available via the cache, and/or where specified criteria did not allow for provision via the cache, the node could act to consult its table in order to select a node capable of, in response to a request, providing the entity. In it noted that, in various embodiments, such selection could be compliant with specified criteria provided by the user. It is noted that, due to the above-described operation, where a search reply message had been received with respect to an entity, the tables could generally be expected to indicate at least one node capable of providing that entity.

Upon selecting a node capable of providing the entity, the user's node could act to create an item request message and dispatch it to the selected node. A created item request message could contain one or more of a number of entries. A first such entry could, perhaps in a manner analogous to that discussed above, indicate one or more recipients for the message. Such an entry might, for example, be labeled "to". A second such entry could, perhaps in a manner analogous to that discussed above, indicate the node that created the message. Such an entry might, for example, be labeled "originator". A third such entry could, perhaps in a manner analogous to that discussed above, indicate the number of hops the message had traveled from the node that created it. Such an entry might, for example, be labeled "hops".

A fourth such entry could, perhaps in a manner analogous to that discussed above, indicate the last node to dispatch the message. Such an entry might, for example, be labeled "immediate node". A fifth such entry could specify metadata and/or other parameters corresponding to the requested entity. Such an entry might, for example, be labeled "requested entity data". It is noted that, in various embodiments, the metadata and/or other parameters so provided could be the full set of such corresponding to the entity being requested, and/or could be otherwise sufficient for the node receiving the item request message to know the desired entity. It is further noted that, in various embodiments, included in the metadata and/or other parameters could be a unique identifier that, alone, could be sufficient for the node receiving the item request message to know the desired entity.

A sixth such entry could, perhaps in a manner analogous to that discussed above with respect to search query messages, specify metadata and/or other parameters associated with the node that created the message. Such an entry might, for example, be labeled "originator data".

In creating such an item request message, a node could, for example, act to set the second entry to indicate itself, to set the third entry to list zero hops, to set the fourth entry to indicate itself, to set the fifth entry to list metadata and/or other parameters retrieved from its table that correspond to the entity being requested, and to set the sixth entry to list its own metadata. The first entry could, for example, be set by the node so as to specify delivery to the selected or indicated node capable of providing the requested entity. Accordingly, the first entry could be set to contain the data retrieved from the appropriate table entry. It is noted that, in view of the above-described functionality, the selected or indicated node could be expected to be directly-accessible.

As noted above, in various embodiments of the present invention unique identifiers corresponding to entity access could be employed. For such embodiments, included in the item request message could be the appropriate identifier. Such an appropriate identifier could be, for instance, the identifier corresponding to the entity access indicated by a particular search result chosen by the user. The appropriate identifier might, for instance, be retrieved from the appropriate table entry. Accordingly, there could, in various embodiments, exist a further message entry to hold the appropriate unique identifier corresponding to entity access, the entry perhaps being labeled "access identifier".

It is further noted that, in various embodiments, a user and/or her node might be able to indicate via an item request message that only a portion of an entity was desired. Such could be specified in a number of ways. For example, in certain embodiments, portion could be specifiable as an absolute amount of data such as a specified number of bytes. As another example, in certain embodiments, portion could be specifiable as a portion of total entity size, such as a certain fraction or percentage of the total size of an entity. In various embodiments, further on a user and/or her node might be able to indicate that only a specific component of the content item is wanted (e.g., a surrogate, a thumbnail picture, and/or the like).

As specific example, it might be indicated that the first specified number of bytes of a media file were desired. Accordingly, it might be indicted that only the first 500 bytes of the media file were desired. As another specific example, it might be indicated that the second specified number of bytes of a media file were desired. Accordingly, it might be indicted that only the second 500 bytes of the media file were desired.

As another example, it is noted that such functionality could, in various embodiments, be employed to allow a partially-failed or interrupted reception of an entity to be resumed without the correctly-received and/or already received portions being resent. Accordingly, in the case of such a partially-failed reception of an entity, an item request message might be dispatched that indicated as the desired portion of the entity that portion which was not correctly received. For instance, where only the first megabyte of a four megabyte file was correctly received, an item request message could be dispatched that indicated that only the last three megabytes of the entity were desired. It is noted that, in various embodiments, metadata could include an indication of entity size.

As yet another example, it is noted that such functionality could, in various embodiments, be employed to allow a node to split receipt of a particular entity among one or more nodes providing access to it. For instance, where three nodes provided access to a particular entity, a first item request message might be dispatched with respect to the first node providing access that indicated that the first third of the node was desired, a second item request message might be dispatched with respect to the third node providing access that indicated that the second third of the node was desired, and a third item request message might be dispatched with respect to the second node providing access that indicated that the last third of the node was desired. Accordingly, in various embodiments, there could exist a further message entry to hold such an indication, the entry perhaps being labeled "portion indication".

The operations performed by a node upon receiving an item request message will now be described. Such a node could, perhaps in a manner analogous to that discussed above, receive an item request message from either the node that originated it, or from another node that had previously received it.

Figure 6:
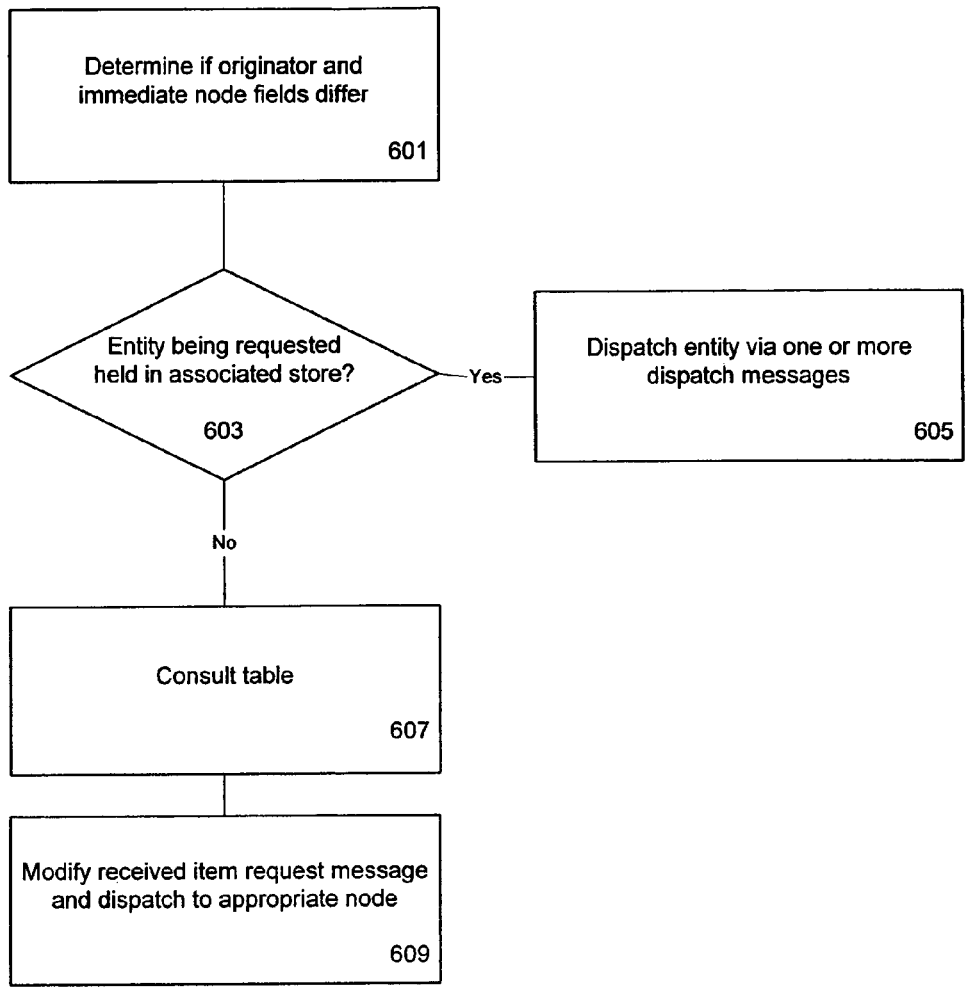
FIG. 6 is a diagram depicting exemplary steps involved in item request message receipt according to various embodiments of the present invention.

With respect to FIG. 6 it is noted that, after receipt of an item request message at a recipient node, the node could first examine the originator and immediate node fields to see if the two differed (step 601). If the two differed, the recipient node could, perhaps in a manner analogous to that described above, act to create or update a table entry corresponding to the originator node. Next, the recipient node could act to increment the hops field of the received message in a manner analogous to that discussed above. As a next step, the recipient node could consult its table to determine if it held in an associated store the entity being requested (step 603).

In the case where the recipient node found that it did hold the entity being requested, it could act to dispatch the entity via one or more dispatch messages having to fields indicating the node that originally dispatched the item request message (step 605). Accordingly, one or more fields might be set to hold the data indicated by the originator field of the received item request message. In the case where the recipient node found that it did not hold the entity being requested, it could act to consult its table to learn nodes that could provide access to the entity (step 607).

In the case where the table indicated that there existed more than one node that could provide the entity being requested, the recipient node could act to choose one of those nodes. For example, where the received item request message included a unique identifier corresponding to entity access, the identifier could be employed in node selection. Accordingly, for instance, the node corresponding to the table entry indicating the unique identifier could be chosen.

As another example, the recipient node might act to choose one of the nodes in accordance with a specification set by a system administrator or the like. Such a specification might, for instance, indicate that selection should be performed so as to choose the node for which the corresponding table entry listing the smallest number of hops, whose listed hops would cost the least amount of money to traverse, and/or having the highest overall available throughput bandwidth. As yet another example, the recipient node might act to choose one of the nodes in accordance with the above-noted specified criteria indicated by the user requesting the entity. In various embodiments, such specified criteria might be included in the item request message.

As a next step, the recipient node could act to modify the received item request message and dispatch it to the appropriate node capable of providing access to the entity (step 609). It is noted that, in embodiments where the hops field was updated as discussed above, the dispatched message would contain the updated version of that field. As above, it is noted that, in view of the above-described functionality, the appropriate node could be expected to be directly-accessible.

As a first step in modifying the received item request message, the recipient node could act to set the intermediate node field to indicate itself. In various embodiments, the node might alternately or additionally add itself to a list of nodes corresponding to loop-back determination of the sort noted above. As a further step in modifying the message, the recipient node could set the to field so as to specify delivery to the appropriate node capable of providing access to the entity. Accordingly, the to field could be set to contain appropriate data from the recipient node's table.

Next, the recipient node could act to have the updated item request message delivered to the appropriate node capable of providing access to the entity. Upon receipt of the modified message, the appropriate node capable of providing access to the entity could act in a manner analogous to that just discussed with respect to operations performed by a node upon receipt of an item request message.

As alluded to above, in various embodiments of the present invention, an entity could be dispatched to a recipient via one or more dispatch messages. Such a dispatch message, could also be employed for other purposes such as, for example, dispatching instant messages, chat-related messages, and/or the like. A user wishing to send a dispatch message might, in various embodiments, indicate her desire to do so via a GUI or other interface associated with her node. With the indication, the user could specify one or more recipients. It is noted that, in various embodiments, a node might act to send such a message without receiving an explicit request from its user. Such operation might take place, for instance, where the node's user is participating in chat and/or message board operations using her node. It is noted that, in various embodiments, where a dispatch message is intended to for more than one recipient, the node might act as if there were a separate dispatch message for each of those recipients. However, in various embodiments, if there is a possibility that a single dispatch message could serve several remote and/or directly accessible recipients, appropriate actions could be taken so that such could take place. Accordingly, for example, a single copy of a dispatch message might be delivered to an intermediate node that could further copy and modify the message to several dispatch messages going to different recipients via different branches of connections and/or transmission links. It is noted that, in various embodiments, no copying might occur in the case where all the recipients are reachable, for instance, via a single broadcast channel or the like.

Figure 7:
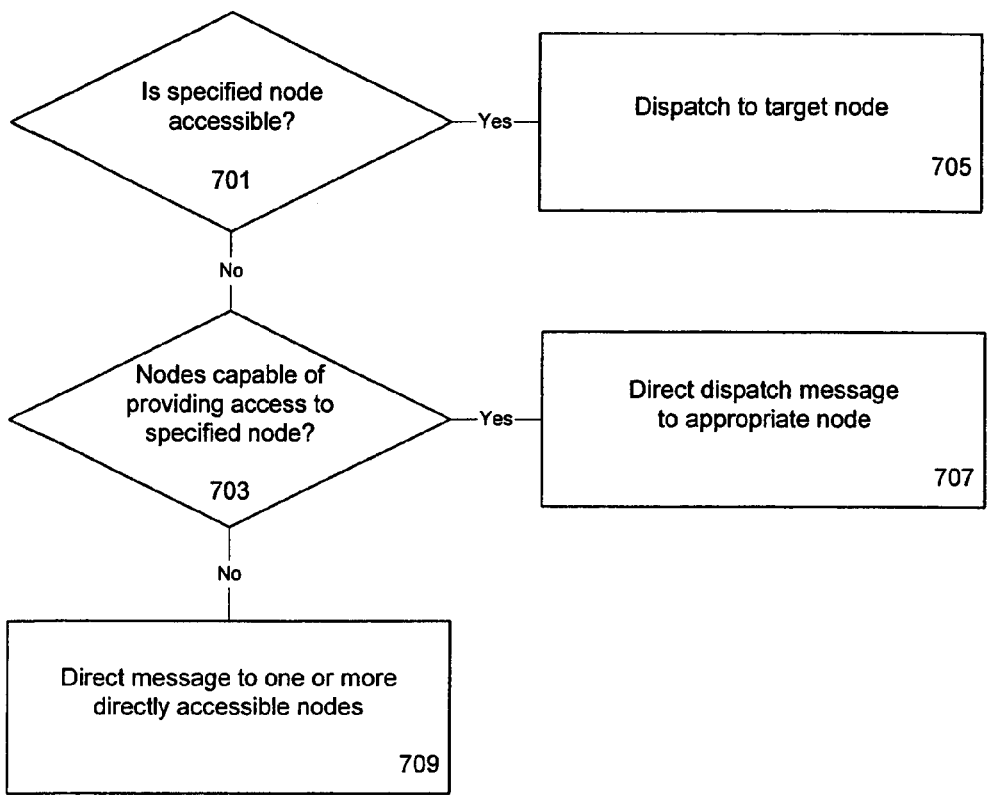
FIG. 7 is a diagram depicting exemplary steps involved in sending of a dispatch message according to various embodiments of the present invention.

With respect to FIG. 7 it is noted that, where a user's node is to send a dispatch message to a specified node, the user's node might, in various embodiments, first act to see if the specified node is accessible (step 701). Accordingly, the user's node might, for example, perform device discovery, port monitoring, and/or port broadcast operations of the sort noted above. Alternately or additionally, the user's node could try to connect to a known or likely network address of the specified node, and/or the current network address of the specified node could be queried from a peer node register before trying to connect to the specified node. As another example, the user's node might first check its entry tables regarding the access situation. In the case where a specified node was found not to be directly accessible, the user's node could consult its table to determine if it knew of a node capable of providing access to the specified node (step 703). In the case where multiple such nodes were found, the user's node could, in various embodiments, act in a manner analogous to that described above to chose one of those nodes in accordance with specifications. Such specifications might, for example, be indicated by a system administrator and/or the node's user. Where the target node was found to be directly accessible, the user's node could dispatch the specified contents of the dispatch message to the target node (step 705).

In the case where a specified node was found not to be directly accessible, the user's node could consult its table to determine if it knew of a node capable of providing access to the specified node (step 705). In the case where multiple such nodes were found, the user's node could, in various embodiments, act in a manner analogous to that described above to chose one of those nodes in accordance with specifications. Such specifications might, for example, be indicated by a system administrator and/or the node's user.

Next, the user's node could act to create a dispatch message. In the case where the user's node found that it knew of one or more nodes that could provide access to the specified node, the user's node could direct the dispatch message to the appropriate such node (step 507). In the case where the user's node found that it do not know of any nodes that could provide access to the specified node, the user's node could act, perhaps in a manner analogous to that discussed above, to send the dispatch message to one or more directly-accessible nodes (step 709). Such dispatch might, for example, employ broadcast.

A created dispatch message could contain one or more of a number of entries. A first such entry could, perhaps in a manner analogous to that discussed above, indicate one or more recipients for the message. Such an entry might, for example, be labeled "to". With reference to the 5th field described below, It is noted that a recipient listed in the to field might not be the ultimate target of the message.

A second such entry could, perhaps in a manner analogous to that discussed above, indicate the node that created the message. Such an entry might, for example, be labeled "originator". A third such entry could, perhaps in a manner analogous to that discussed above, indicate the number of hops the message had traveled from the node that created it. Such an entry might, for example, be labeled "hops". A fourth such entry could, perhaps in a manner analogous to that discussed above, indicate the last node to dispatch the message. Such an entry might, for example, be labeled "immediate node".

A fifth such entry could specify metadata and/or other parameters corresponding to the intended ultimate recipient of the message. Such an entry might, for example, be labeled "target". It is noted that, in various embodiments, the metadata and/or other parameters so provided could be the full set of such corresponding to the intended ultimate recipient, and/or could be sufficient for the node receiving the item request message to know the desired intended ultimate recipient. It is further noted that, in various embodiments, included in the metadata and/or other parameters could be a unique identifier that, alone, could be sufficient for the node receiving the item request message to know the desired entity.

A sixth such entry could, perhaps in a manner analogous to that discussed above with respect to search query messages, specify metadata and/or other parameters associated with the node that created the message. Such an entry might, for example, be labeled "originator data". A seventh such entry could hold the payload of the dispatch message. For example, where the dispatch message is used to delivery an instant messaging message, the payload could hold the corresponding text and/or other data.

As noted above, in various embodiments an item request message could include an indication of a desired portion of an entity, perhaps specified via a portion indication field or the like. For such embodiments, the data selected for inclusion in the payload of the dispatch message could be in compliance with the indication.

In creating such an dispatch message, a node could, for example, act to set the second entry to indicate itself, to set the third entry to list zero hops, to set the fourth entity to indicate itself, and to set the fifth entry to list metadata and/or other parameters corresponding to the intended ultimate recipient. Such metadata and/or other parameters could be known of in a number of ways. For instance, such metadata and/or other parameters might be provided by the node's user and/or retrieved from its table. Further, the node could act to set the sixth entry to list its own metadata, and/or set the seventh entry to carry the appropriate payload data.

In the case where the user's node had found that it knew of one or more nodes that could provide access to the intended ultimate recipient node, the first entry could be set by the user's node so as to specify delivery to the appropriate such node. Accordingly, the first entry could be set to contain data retrieved from the appropriate table entry. It is noted that, in view of the above-described functionality, the appropriate node capable of providing access to the intended ultimate recipient node could be expected to be directly-accessible.

As alluded to above, in various embodiments the appropriate table entry could indicate a unique identifier corresponding to access. For such embodiments, the created dispatch message could include the unique identifier. Such an unique identifier could, in various embodiments, be included as another entry of the sort noted above. For instance, there could exist a further such entry including a unique identifier corresponding to the appropriate access, the entry perhaps being labeled "access identifier".

In the case where the user's node had found that it did not know of any nodes that could provide access to the specified node, the first entry could be set, as alluded to above, to allow for delivery to one or more directly-accessible nodes.

The operations performed by a node upon receiving a dispatch message will now be described. Such a node could, perhaps in a manner analogous to that discussed above, receive a dispatch message from either the node that originated it, or from another node that had previously received it.

After receipt of a dispatch message at a recipient node, the recipient could first examine the originator and immediate node fields to see if the two differed. If the two differed, the recipient node could, perhaps in a manner analogous to that described above, act to create or update a table entry corresponding to the originator node. Next, the recipient node could act to increment the hops field of the received message in a manner analogous to that discussed above. As a next step, the recipient node could act to consult the target field to determine if it were the intended ultimate recipient of the message. In the case where the recipient node found that it was the intended ultimate recipient, the could act to make use of the message. For instance, where the message carried instant messaging data, that data could be presented to the user.

In the case where the recipient node found that it was not the intended ultimate recipient, the node could first act, in a manner analogous to that discussed above, to see if the intended ultimate recipient was directly accessible. The node might make such a determination, for example, by consulting its table and/or via device discovery, port monitoring, port broadcast, and/or the like. In the case where the intended ultimate recipient was found to be directly accessible, the recipient node could act to modify the message and forward it to the ultimate recipient. It is noted that, in various embodiments, the recipient node might instead act to dispatch only the payload of the dispatch message to the ultimate recipient, perhaps using a technique known in the art.

In the case where the recipient node found that the ultimate recipient was not directly accessible, the recipient node could check its table to see if it knew of a one or more nodes capable of providing access to the ultimate recipient node. In the case where more than one such node were discovered, the recipient node could, in various embodiments, act to choose one in a manner analogous to that discussed above. For instance, a received unique identifier corresponding to entity access could be employed in the selection. The recipient node could then act to modify the message and forward it to the appropriate node capable of providing access to the ultimate recipient node. In the case where the recipient node found that it did not know of any nodes capable of providing access to the ultimate recipient node, it could act to modify the message and send it to one or more directly accessible nodes.

In various embodiments the recipient node could, as a next step, act to cache the payload data carried by the dispatch message. In certain embodiments, such action might only take place under certain circumstances. For instance, such action might take place where the payload corresponded to a shared media item, program file, and/or the like, but not where the payload corresponded to an instant message or chat data.

In caching the data, the recipient node could act to create and/or update a table entry corresponding to the cached data, the entry including any metadata and/or other parameters included with the payload. For instance, where the payload corresponded to a media item, a table entry holding the media item data and associated metadata and/or other parameters could be created and/or updated.

It is noted that, in various embodiments, similar functionality might take place, but with the updated and/or table entry including an indication of the node specified in the immediate node field of the dispatch message rather than the payload data. Accordingly, for example, a table entry corresponding to a media item or other entity could be created and updated, the entry containing the associated metadata and/or other parameters and an indication that the node specified in the immediate node field of the dispatch message could provide the entity.

In various embodiments of the present invention, caching might only occur at a node in the case where the node has sufficient storage space. In certain such embodiments, a node could, for example, be considered to have sufficient storage space in the case where there was enough space available to hold the data to be cached. In other embodiments, the determination of whether or not a node had sufficient storage space could, for example, be performed in accordance with one more specifications. For instance, it might be specified that caching should only take place if, after caching, at least a particular amount of storage space would remain. In some embodiments, for example, low frequency of usage of a specific cached item and/or a long time having passed since the last time a specific cached item was used could allow for the item to be overwritten with new items. Such specifications could, for example, be set by a software module creator and/or node manufacturer as a default, the node's user, a system administrator, and/or other individual. For instance, with respect to the above example, such could define and/or provide values corresponding to "low frequency of usage" and/or "long time having passed".

Having performed any caching and/or table entry operations as just described, the recipient node could act to modify the received item request message and dispatch it as discussed above. It is noted that, in embodiments where the hops field was updated as discussed above, the dispatched message would contain the updated version of that field. Further, it is noted that, in view of the functionality described herein, the node or nodes to which the message was to be dispatched could be expected to be directly-accessible.

As a first step in modifying the received item request message, the recipient node could act to set the intermediate node field to indicate itself. In various embodiments, the node might alternately or additionally add itself to a list of nodes corresponding to loop-back determination of the sort noted above. As a further step in modifying the message, the recipient node could set the to field so as to specify delivery in accordance with that described above. Accordingly, the "to" field might, for instance, be set to contain appropriate data from the recipient node's tables or data obtained via device discovery, port monitoring, port broadcast, and/or the like. Next, the node could act to have the updated item request message delivered to the appropriate node or nodes. A node, upon receipt of the modified message, could act in a manner analogous to that just discussed with respect to operations performed by a node upon receipt of an dispatch message.

It is noted that, in various embodiments, an entity (e.g., a media item) to be sent via dispatch message could be sent via more than one dispatch message. For instance, a media item could be sent via multiple dispatch messages, each containing as its payload a portion of the media item. It is further noted that, in various embodiments where an entity is sent via multiple dispatch messages, nodes performing caching and/or table entry operations of the sort noted above may act to do so with respect to entity portions.

Accordingly, a node that has performed such caching and/or table entry operations with respect to an entity portion might, in various embodiments, act to respond to a search query message with a search reply message in a manner analogous to that discussed above, but indicating that it could provide access to only a portion or portions of a particular entity. The indication might, in various embodiments, also indicate the number of portions making up the entire entity and the portion numbers corresponding to the portion or portions to which the node can provide access. As a specific example, the node might dispatch a search reply message indicating that it could provide access to the third and fourth out of five portions of a particular entity.

In response to such a search reply message, a node that had originally dispatched the corresponding search query message might act to dispatch a search query message corresponding to each entity portion not able to be provided by the node that dispatched the search reply message. Accordingly, further to the above specific example, the node that had originally dispatched the corresponding search query message might dispatch a search query message corresponding to each of the first, second, and fifth portions of the particular entity. Each such query message could contain metadata and/or other parameters For various embodiments, the metadata and/or other parameters included in each such query message could, in a manner analogous to that discussed above, be the full set of such corresponding to the entity for which portions were being requested, and/or could be otherwise sufficient for a node receiving the item request message to know the entity for which portions were desired. It is noted that, in various such embodiments, included in the metadata and/or other parameters could be a unique identifier that, alone, could be sufficient for the node receiving the item request message to know the desired entity.

For various embodiments, the number and/or size of portions into which an entity could be divided for dispatch could be in accordance with a specification set, for instance, by a system administrator or other individual. For example, it could be specified that entities should be divided into as many portions as possible of a specified size, and that any data remaining after such division be padded with stuff data (e.g., zeroes) to reach the specified size. The specified size might, for instance, correspond to packet payload capacity, network link type, and/or the like. As a specific example, where the specified size was 500 bytes, and the entity was 5700 bytes in size, the entity could be dispatched as 11 portions each containing 500 bytes of entity data, and a twelfth portion containing 200 bytes of entity data and 300 bytes of padding data. In another example, the last portion could contain an indication of being the last portion and/or some other additional indication such as a message length field or an end-of-message field, and no padding data would be included.

As noted above, a user being presented with data corresponding to found entities might, in various embodiments, be presented with an option to have further searching performed. Such further searching functionality could be implemented in a number of ways. For example, a user's node could act to have such further searching performed by dispatching an additional search query message like that of a corresponding original search query message, but indicating that that the already-found entities be eliminated from consideration.

Accordingly, the additional search query message could contain metadata and/or other parameters correspond to each already-found entity. The included metadata and/or other parameters could, in a manner analogous to that discussed above, be the full set of metadata and/or other parameters corresponding to each such entity, and/or could be otherwise sufficient for a node receiving the item request message to know the entities that should be eliminated from consideration. As above, in various such embodiments, included in the metadata and/or other parameters could be a unique identifier that, alone, could be sufficient for a node receiving the item request message to know the entities that should be eliminated from consideration.

In various embodiments a node could be associated with one or more groups, and/or could have more than one network interface. Where such is the case, a node might maintain an entity reference table and/or entity reference table section with respect to each such group and/or interface.

It is noted that, according to various embodiments of the present invention, one or more nodes could act as "crosslinker" nodes which could, for example, allow for communication between nodes belonging to different networks, LANs, and/or the like. Such a node might, for instance, have two network interfaces, the interfaces perhaps being of different types. Such a crosslinker node could, for example, act to receive a message on a first interface and dispatch it to one or more nodes via its second interface.

As a specific example, such a crosslinker node might receive a message via a Bluetooth, 802.11b, or 802.11g interface and dispatch it, perhaps after performing one or more operations of the sort noted above, to one or more nodes reachable via a Ethernet interface. As another specific example, such a crosslinker node might, in a similar manner, receive a message via a first Ethernet interface connected to a first LAN and dispatch it, via a second Ethernet interface, to one or more nodes connected to a second LAN. As yet another specific example, such a crosslinker node might, in a similar manner, receive a message via a Bluetooth, 802.11b, or 802.11g interface and dispatch it to one or more nodes reachable via a UMTS interface.

In various embodiments of the present invention, multicast transmission may be used for the delivery of, for example, dispatch messages. A node might perform such an operation, for instance, where the node determines that several nodes reachable via multicast need to receive a particular message.

It is further noted that, in various embodiments, nodes can request retransmission of messages in the case where they are received incompletely, incorrectly, and/or the like. Such functionality could be implemented in a number of ways. For instance, a retransmission request message could be sent to the node specified in the intermediate node field of a message for which retransmission was being requested.

For various embodiments of the present invention, one or more software modules might operate on a node to control which connections with other nodes are kept open. Such decisions could be made based on a number of parameters. For example, such modules might keep track of connection patterns between various nodes. Such modules might then examine such patterns in order to make a guess as to whether a particular connection was to be used in the near future. In the case where a particular connection was guessed to be used in the near future, it could be kept open. Such functionality might have a number of benefits. For instance, reducing the number of connection establishment and/or takedown operations might result in processing and/or energy saving at one or more nodes. In various embodiments, multiplexing could be employed in connections where appropriate such that multiple messages and/or the like could sent between two nodes via a single communication pipe or the like associated with a link.

Operations so performed by such modules or the like could be, for instance, performed with the goal of keeping open an optimum number of connections between the node with which they are associated and other nodes. It is noted that, in embodiments where such software modules or the like are employed, it may only be where it is discovered that there are not enough existing connections to particular other nodes (e.g., nodes belonging to one or more particular groups) that further connections would be sought and/or established. Accordingly, in such embodiments, for example, it may not be necessary to perform operations which seek and/or establish new connections when performing various network operations described herein (e.g., operations related to joining groups, operations related to search, operations relating to sharing, operations relating to messaging, and operations relating to chat). Operations performed by such modules could, in various embodiments, have the effect of reducing wait time experienced by a user.

As alluded to above, various specifications (e.g., regarding usage of network interfaces) might, in various embodiments, be set via communication settings of user's node related to, for instance, such software modules. The communication settings might, for example, have been given to user's node as a default configuration file during initial sign-up, and/or as a later update, the update perhaps having been dispatched via network. Alternately or additionally, the communication settings might have been entered by the node's user, perhaps via an appropriate GUI. Or, as user can define such settings or do selections per a specific operation. Via such entry, the user might, in various embodiments, be able to specify communications settings with respect to specified and/or all network operations and/or the like, and/or on a per-operation basis.

The communication settings might, in various embodiments, cover the overall guidelines of usage of network links and node interfaces regarding communication with other nodes via appropriate software modules. It is further noted that the settings might, in various embodiments, be split to specific settings per an operation type. Accordingly, for example, there might be one setting regarding search requests and/or replies, and another setting for more bandwidth demanding operations, such as, for instance, upload and download of entities.

It is noted that, in various embodiments, there may be costs and/or bandwidths associated with various network operations (e.g., entity uploads, entity downloads, and/or message dispatches). Accordingly, a user could be informed, for instance via a GUI, of the costs she would incur and/or bandwidths she would enjoy in performing a particular network operation. Where multiple hops were involved in a particular network operation, the user could be presented with a total cost and/or minimum bandwidth. Alternately or additionally, the user could be present with a cost and/or bandwidth for each hop. Where multiple alternatives are available for performing a network operation (e.g., one path involving a single UMTS hop, and another involving several Bluetooth hops), the user could be presented with cost and/or bandwidth information for each alternative, the presentation perhaps being as just described.

It is noted that, in various embodiments, in displaying information to a user of the sort noted above, presentation could be in such a way that could highlight certain properties. For instance, where multiple alternatives are available to a user for performing a network operation, the user could, in addition to or as an alterative to presentation of the sort just described, be presented with indications as to, for instance, which alternative would cost the least money, which would provide the highest bandwidth, and/or the like.

In various embodiments of the present invention, network operations performed by a user could cause another user to incur costs such as, for example, network use costs. Such could be the case, for example, in certain cases where a user requests an entity that is dispatched via the nodes of one or more other users. Accordingly, functionality might, in various embodiments, be provided whereby a user could be informed of, for instance, the costs she would cause others to incur in performing a particular network operation. The user could be so informed, for instance, in a manner analogous to that just described.

It is further noted that, in various embodiments, such software modules might employ a bootstrap configuration to get name and/or registration server addresses. Moreover, it is noted that, in various embodiments, such modules might maintain a list of group memberships corresponding to the node upon which they run, and might further act to maintain a status for each group and/or a list of reachable peers with respect to each group. The list of reachable peers might, for instance, contain unique identifiers of nodes, specify direct connections with potential network addresses, and/or specify likely connections via other peers. Such a list might, as a specific example, indicate, nodes that are typically always on-line. In maintaining such a list the modules might, in various embodiments, get updates from other nodes, a peer register provided by a central server, a peer register implemented as a distributed register, and/or the like.

Moreover, it is noted that, in various embodiments, such modules might act to have entity reference tables updated regarding changes of status with regard to connections. Further, the modules, in various embodiments, might act to support connectivity in a multitude of network environments, to adapt to dynamic network conditions (e.g., via aging and updating entity reference table entries and/or via active connection management), and/or to support the mobility of the node upon which they run (e.g., by offering routing based on active learning and updating of routing status to different resources). Moreover, in various embodiments the modules might operate so as to optimize connectivity in terms of, for instance, bandwidth, transmission cost, availability, and/or the like. Further, it is noted that, in various embodiments, the modules could act to as to allow for group level connections to be maintained as background process, to be readily available when the user of the node upon which the modules operate activates the particular software modules (e.g., modules relating to messaging handling and/or service provision), and/or to be activated only when the user performs an activity in a group that requires network connections.

It is noted that, in various embodiments, one or more techniques may be employed in the maintenance of the above-noted entry reference tables. For example, a node may periodically attempt to reach nodes specified in its entity reference table to be directly reachable. In the case where such an attempt found that such a node was no longer reachable, the table could be altered to reflect this fact. In various embodiments, corresponding data might be removed from the table. As an alternative, such corresponding data might be marked for potential removal. The node could then attempt connection an additional specified number of times, and only perform removal of the data in the case where the additional connection attempts also prove unsuccessful. As still another example, a node might act to remove table data correspond to node connections after a specified period of time has elapsed since the data's entry into the table.

As still another example, a node might perform such operations with respect to nodes that were not directly reachable. Accordingly, the node could, for instance, attempt to send a dispatch message with the target field of the message specifying a node in question. In the case where, for instance, an error message or the like was returned by one or more nodes that were understood to provide access to the node in question, corresponding table data could be removed. As another example, such removal might take place in the case where the dispatch message indicated that the ultimate recipient node respond with a second dispatch message, but such a message was not received within a particular period of time. In a manner analogous to that discussed above, in various such embodiments, data might be marked for potential removal instead of being immediately deleted.

As yet another example, in various embodiments nodes may send updates to other nodes employable by those other nodes in updating their entity reference tables. As a specific example, such an update might be sent in the case where a particular node is resigned with respect to a group, and nodes receiving the update could update their entity reference tables with respect to the group so as to delete entries regarding the resigned node.

It is noted that various of the foregoing examples note that certain periods of time, internals of time, and/or the like may be employed. In appropriate embodiments, such values could, for instance, be chosen by a network administrator or the like.

Moreover, although it is described in various portions herein that a user may manipulate various settings, in various embodiments a user may not need to manipulate such settings. For instance, it is noted that in various embodiments a user may be provided with a set of default settings for her node providing acceptable operation such that, if the user was not interested in manipulating settings, she still could enjoy the functionality provided by her node described herein. Such default settings might, for example, be provided to her node at time of manufacture and/or initial sign-up. It is further noted that, in various embodiments, a user may be able to place settings, for example when taking possession of her node for the first time, and then update those settings periodically and/or by her own volition.

Additionally, it is noted that, in various embodiments, a user need not wait for various network operations described herein (e.g., operations related to joining groups, operations related to search, operations relating to sharing, operations relating to messaging, and operations relating to chat) to complete before doing something else with her node. Accordingly, a user could, in various embodiments, act to perform other operations described herein (e.g., by moving to another part of the specific application software providing such operations), to move to another application running on her node, to have another network operation performed, and/or the like while one or more network operations described herein are done, for instance, as a background process or the like. The user might, in various embodiments, receive and/or request status for and/or notification of completion of such one or more network operations, for instance, acting as background processes. Such status and/or notification might, for instance, be presented in a non-disturbing manner (e.g., via presentation of small icons, the icons perhaps being associated with a status bar or the like).

Group Join Operations

According to various embodiments of the present invention, a user wishing to join groups and/or make use of various available services may first act to sign-up. For example, such a user might, in various embodiments, visit a kiosk, customer service location, or the like. As another example, such a user might, in various embodiments, direct her node to a web portal or the like. The user could be prompted by a customer representative at a kiosk or the like, or by a web portal or the like, to provide necessary billing information, personal information, and or the like. The customer representative could ask for some metadata to be associated with the user's node. For example, the representative could verbally ask for such data, the user could reply verbally, and the representative could enter the data into a PC or the like. As another example, the representative could have the user answer a series of questions presented using a PC or the like. In various embodiments, the metadata could be checked by one or more service providers.

It is noted that, in various embodiments, the representative may act to have authentication performed with respect to the user and/or her node. Further, it is noted that, in various embodiments, the user may be requested to agree to behave in a legal manner, and/or according to one or more established behavior policies.

As a next step, appropriate software modules or the like could be placed on the user's node, if not being already pre-installed (e.g., by the manufacturer of the node). The appropriate modules might, for instance, include modules corresponding to an application for the user's node, initial default configurations, and/or information regarding service providers and/or nodes corresponding to one or more peerto-peer environments. The initial default configurations, might, for instance, correspond to initial settings regarding user's node. The information regarding nodes could include, for instance, information regarding public groups and/or a listing of nodes providing name-to-address mapping.

Placing of software modules might, for instance occur via network download via the web portal or via the action of the customer representative. Accordingly, the customer representative might, as a specific example, act to have the software modules delivered to the node via OBEX Object Push Profile (OPP), perhaps over Bluetooth, IrDA, 802.11b, 802.111g, GPRS, EDGE, UMTS, or the like. When the appropriate software modules are activated for the first time, secret keys and/or public keys could, in various embodiments, be created in user's node, perhaps via various techniques known in the art.

In various embodiments, further to the software modules, one or more certificates could be delivered to the node. For instance, a "general access certificate" could be presented, and/or the user could be considered a member of a "general group". The general access certificate could, for instance, give user the rights to use services offered in the general group. The user rights could include, for example, rights to search metadata information for public groups. As another example, the user rights could include rights to search metadata information regarding general group members and/or their nodes.

As a next step, metadata might, in various embodiments, be associated with the user's node. Such functionality could be implemented in a number of ways. For example, the user's node could query the user for such information via a GUI (Graphical User Interface) or other interface. In response, the user could supply the requested information via a GUI or other interface and have it dispatched to the node.

As another example, the customer representative could ask for such information and have it dispatched to the node. For example, the representative could verbally ask for such data, the user could reply verbally, and the representative could enter the data into a PC or the like. As another example, the representative could have the user answer a series of questions presented using a PC or the like. In either case, the representative could then act to have the metadata dispatched from the PC or the like to user's node in a manner analogous to that discussed above.

As a next step, the user might act to employ the software modules to learn of one or more groups that she could join. The software modules delivered to the user's node during initial download could, for instance, contain initial information of nodes to be contacted in dispatching an information request regarding groups that the user could potentially join. Accordingly the user might act to have her node learn of nodes capable of providing such information. It is noted that, in various embodiments, dedicated nodes could exist for providing such information about groups. Alternately or additionally, such information could be provided by nodes that also served other functions. For instance, in various embodiments such information might be provided by various nodes associated with users.

For example, in various embodiments, the user could act to have her node make use of service discovery to learn of such nodes. The service discovery could be, for instance, Bluetooth service discovery or DNS-SD (Domain Name Server Service Discovery). It is noted that mDNS (multicast Domain Name Server) might be employed, for instance, in embodiments employing DNS-SD. As another example, the node might act to broadcast on established and/or well-known ports, and/or listen on established and/or well-known ports.

As yet another example, in various embodiments, the user could act to have her node dispatch a query to learn of nodes that provided such information. Such a dispatched query might, for instance, take the form of a search query message of the sort described above. In various embodiments, such a search query message could include metadata and/or other parameters indicating that the entities to be found via the search were nodes that provided information about groups joinable by the user.

In various embodiments, the user might be able to indicate to her node via a GUI or other interface a desire to find such nodes providing information about groups. In response to the request, the user's node could, for instance, perform such device discovery and/or dispatch one or more queries of the sort just noted, the queries containing the appropriate metadata and/or other parameters.

Figure 8:
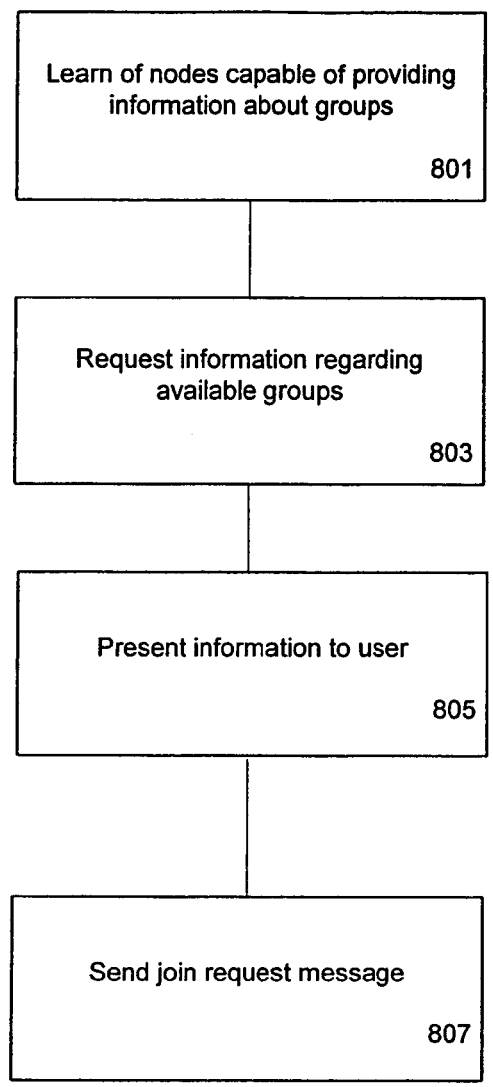
FIG. 8 is a diagram depicting exemplary steps involved in finding nodes providing information about groups according to various embodiments of the present invention.

With respect to FIG. 8 it is noted that via, for instance, such query or service discovery, the user's node could learn of nodes capable of providing the desired information (step 801). For example, via such device discovery the user's node could learn of network addresses corresponding to the nodes capable of providing the information. As another example, where a query was sent, the user's node could receive one or more messages containing information regarding the nodes capable of providing the information. Such messages could, for example, be search reply messages of the sort described above. Included in each such message could, in various embodiments, be metadata and/or other parameters corresponding to the nodes capable of providing the desired information. In various embodiments, the metadata and/or other parameters corresponding to each node could include unique identifiers and/or be otherwise sufficient to identify that particular node. It is noted that, in various embodiments, unique identifiers could be associated with, for instance, groups, nodes, users, entities, and/or the like.

In response to learning of information regarding the nodes capable of providing group information, the user's node could, in various embodiments, act to present such information to its user via a GUI or other interface. The GUI or other interface could further act to allow the user to select from the presented nodes one or more nodes from which to receive group information. It is noted that, in various embodiments, a user could perform operations, including, for instance, group search operations, via a webpage. Such a webpage might be implemented, for example, via ASP (Active Server Pages), ASP+(Active Server Pages+), JSP (Java Server Pages), PHP (PHP: Hypertext Preprocessor), WebObjects, and/or the like.

The user's node could next, in compliance with any user specification of the sort just described, request from one or more of the appropriate nodes information regarding available groups (step 803). In various embodiments, the user might, perhaps via a GUI or the like, employ her node to indicate that she was only interested in receiving information regarding groups matching indicated metadata. Where the user supplied such metadata, the metadata could be included in the request. In accordance with embodiments of the present invention, a wide variety of metadata could be specifiable. To provide some specific, non-limiting, examples, it is noted that among specifiable metadata could be a subject of a group, a name of a group, a creator of a group, and/or the like. In various embodiments, a user could be able to enter text mode keywords describing a group. The keywords could, for instance, contain textual information that the user considered relevant in finding a group. Such keywords could perhaps be text describing the subject of the group, name of the group, and/or the like.

Request functionality could be implemented in a number of ways. For example, in various embodiments, the user's node could employ email, MMS (Multimedia Messaging Service) messaging, SMS (Short Message Service) messaging, OBEX OPP (Object Push Profile), and/or the like to request such information. Such action might, for example, be directed to a network address, unique identifier, or the like obtained by the user's node via its above-described actions to receive information regarding nodes capable of providing information regarding available groups. In certain embodiments, multicast could be employed.

As another example, one or more dispatch messages of the sort noted above could be sent. For instance, a dispatch message could be sent to each selected node. Included in the target field of each such message could, in compliance with that discussed previously, be sufficient received metadata and/or other parameters corresponding to the appropriate selected node.

In response to receiving a request from information regarding available groups, a node capable of providing such information could act to comply with the request. Accordingly, such a node could act to return a message to the user's node containing the appropriate information. With respect to each group, among the appropriate information could be, for instance, metadata corresponding to the group. Among the metadata could be, for example, the name of the group, a description of the group, indication of group membership criteria, and/or contact information regarding certain individuals associated with the group. The individuals could, for instance, be the managers of those groups and/or be individuals capable of granting access to the group where application was required.

Where metadata was supplied by the user, the node could act to provide information regarding only groups whose associated metadata matched the supplied metadata. It is noted that, in various embodiments, the metadata corresponding to a group could include membership criteria and/or an information relating to a group application to be completed in order to request group membership. As a specific example, there might be three types of group applications (e.g., short, normal, and long), and the metadata could impart which of these was to be employed. Group applications will be discussed in greater detail below. It is noted that, in various embodiments, in acting to provide information regarding only appropriate groups, the node might perform operations involving, for instance, metadata analysis, text analysis, and/or the mapping of, for example, keywords against certain metadata fields. The certain metadata fields might, for instance, be those determined and/or indicated to be most relevant. Such indication might, for example, be done by a system administrator or the like.

Messages responding to requests for information regarding available groups could be sent in a number of ways. For example, such a message could be sent via email, MMS messaging, SMS messaging, OBEX OPP, and/or the like. Such action could be directed to a network address or the like of the user's node. Such a network address or the like might, for example, have been received via the request for group information. As another example, such a message could be a dispatch message of the sort described above directed to the user's node. Accordingly, the target field of the dispatch message could be set to the value contained in the originator field of a received dispatch message created by the user's node requesting group information.

It is noted that, in various embodiments, such a message containing group information could be received by a user's node without the node making a corresponding request. For example, a member of a group and/or the group's manager might act to have such information sent without there being a specific request. Such action might be performed, for instance, with the goal of increasing group membership. Such a message could, in various embodiments, contain an invitation to a group, the invitation perhaps including software modules and/or descriptions activating appropriate software modules or the like in user's node without requiring user to do any specific actions. The user's joining a group might be complemented by the user accepting the sent invitation, perhaps via an interface provided by her node. As a specific, non-limiting example, an invitation could be a gaming invitation shown by a gaming application, with the user perhaps accepting the invitation via an interface associated with the gaming application.

In various embodiments, one type of group could be a group of a user's own nodes that is used to enable sharing, uploading, searching and/or downloading files between those terminals. In this kind of group, a user's node might, for instance, do comparisons of group membership metadata of other users' nodes. Based on this comparison, a list might be formed of those groups to which certain of the user's nodes belonged, but the other did not. This list might be used, for instance, to synchronize group memberships among the user's terminals, the user's confirmation perhaps being requested in order to initiate further group application requests. Another way to manage group memberships of a particular user's nodes could involve that user applying delegate manager rights with to one node such that the node could then further grant group memberships to other nodes of the user.

After receiving group information, the user's node could, in various embodiment, act to present such information to its user via a GUI or other interface (step 805). The GUI or other interface could act to allow the user to indicate a desire to join one or more of the groups for which information is presented. In response to its user making such a selection, the user's node could act to send a join request message to an appropriate target (step 807). The appropriate target could be, for example, as specified in received contact information regarding the selected group. In various embodiments, included in a join request message could be unique one or more identifiers corresponding to the user, and/or one or more unique identifiers corresponding to the one or more groups.

In a manner analogous to that discussed above, the join request message could be sent, for example, via email, MMS messaging, SMS messaging, OBEX OPP, and/or the like, directed according to the corresponding received contact information. As another example, the join request could be sent via a dispatch message of the sort described above. The target field of such a dispatch could, for instance, be populated according to the corresponding received contact information.

Upon receipt of the join request message at the appropriate node, the appropriate node might, in various embodiments, access an associated metadata directory, store, and/or the like to consult group rules. Such group rules could, in various embodiments, be established by a group manager and/or the like. In various embodiments, a service provider may act as a group manager for one or more groups. In such embodiments, software modules operating one or more nodes associated with the service provider might allow the service provider to limit membership in those groups to its own customers. In consulting the group rules, the node might first act to see if the join request could possibly be answered affirmatively. As specific examples, the group rules could be consulted to see if there were room for any more members in the group.

Further handling of the join request could happen via automatically, perhaps via software modules of the appropriate node. Another case is that the appropriate node notifies the group manager or the like having rights to grant group membership, perhaps via the node's GUI, of the received join request.

The appropriate node or the group manager may also consult some external database or registers to see if the user corresponding to the join request was potentially eligible for membership, and/or the like. Such eligibility might, for example, involve the user's being associated with a certain region, indicating a proof of a membership in a hobby group, club, and/or the like, and/or being able to share a common secret used as a group membership criteria. This consulting could, in various embodiments, happen based on the user's join request and/or later based on user data received in a membership application.

In the case where it was determined that the user could not potentially be granted membership, a rejection message could be dispatched to the user's node. In a manner analogous to that discussed above, the message could be sent, for example, via email, MMS messaging, SMS messaging, OBEX OPP, a dispatch message, and/or the like. Where it was found that the user could potentially be granted membership, the group rules could be further consulted to see if a user needed to complete a group application in order to request membership.

In the case where no such application was required, the user could be granted membership. Accordingly, a message indicating that membership had been granted. In a manner analogous to that discussed above, the message could be sent, for example, via email, MMS messaging, SMS messaging, OBEX OPP, a dispatch message, and/or the like. In various embodiments, included in the message is a certificate corresponding to group membership.

In the case where an application was required, data corresponding to the application could be sent to the node of the user seeking membership. In a manner analogous to that discussed above, the message could be sent, for example, as a join-request-rejected message sent via email, via MMS messaging, via SMS messaging, via OBEX OPP, via a dispatch message, and/or the like. It is noted that, in various embodiments, the application could ask for billing information (e.g., credit card information).

The data corresponding to the application could take a number of forms. For example, the data could take the form of a hyperlink to a secure website that could present the application and forward the results to the node that dispatched the message including data corresponding to the application. The secure website might, for example, employ SSL (Secure Socket Layer) or TLS (Transport Layer Security). As another example, the data could take the form of an Java or Net application that, when run at the recipient's node, could present the application and forward the results to the node that dispatched the message including data corresponding to the application. In either case, forwarding of the results could, for example, in a manner analogous to that described above, employ email, MMS messaging, SMS messaging, OBEX OPP, a dispatch message, and/or the like. As an alternative, SOAP (Simple Object Access Protocol), RMI (Remote Method Invocation), JMS (Java Messaging Service), and/or the like might be employed.

Upon receipt of the forwarded results, the recipient node could act to see if the results were in accordance with those needed for grant of group membership. Such determination could, for example, involve comparing the results with the above-noted group rules. Alternately or additionally, such determination could involve commutation with one or more servers or the like in order to confirm billing data or the like requested by the application. Such one or more severs might, for example, be servers operated by a bank, credit card company, or the like. Where it was determined that membership could not be granted to the user, a rejection message could be dispatched as discussed above. Where it was determined that membership could be granted, a message indicating that membership had been granted could be dispatched as discussed above.

It is noted that, in various embodiments, corresponding to a user could be metadata of the sort discussed above as being collected, for example, by a customer representative, and/or metadata relating to that user's membership in a group. In various embodiments, the former sort of metadata could be shared among all subscriber nodes, and perhaps not be alterable by the user, while the later sort of metadata might only be shared if specified by the user.

Search Operations

Figure 9:
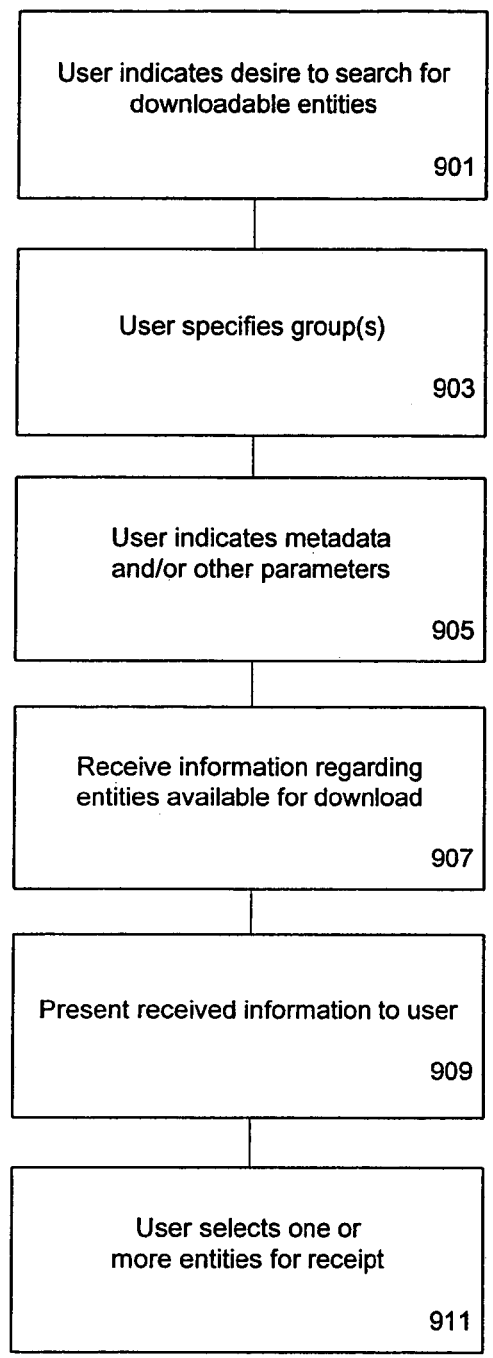
FIG. 9 is a diagram depicting exemplary steps involved in search according to various embodiments of the present invention.

With respect to FIG. 9 it is noted that a node user wishing to search for information regarding groups, other group members, downloadable entities such as a files, media items, program, and/or the like could, according to various embodiments of the present invention, indicate a desire to do so via a GUI or other interface provided by her node (step 901). In various embodiments, the user could additionally specify one or more of her node's network interfaces as employable in the searching for and/or downloading entities.

Further there may, in various embodiments, be specifications seeking to optimize and/or minimize the use of particular network interfaces and/or link types. As a specific example, it might be specified that the node should act to minimize the use of cellular telephone links such as, for example, GPRS or UMTS links and maximize the use of short-range radio communication links such as, for example, Bluetooth links. The node might, in various embodiments, query the user for such specifications via a GUI or other interface. Such specification regarding usage of network interfaces might, in various embodiments, have been done via communication settings of user's node related to, for instance, appropriate software modules.

In response, the node could present its user with a listing of the groups of which she is a member, and request that she indicates with respect to which of these groups the search should be performed. The user could make the choice via the GUI or other interface (step 903). As a next step, the user could, in various embodiments of the present invention, choose to indicate to her node metadata, keywords, and/or other parameters corresponding to the entities that should be found (step 905). In accordance with certain embodiments of the present invention, a wide variety of metadata could be specifiable. To provide some specific, non-limiting examples, it is noted that among specifiable metadata could be metadata related to groups and group services like chat, metadata related to searched entities like name, size, genre, artist, album, media type, date of creation, date of availability for the group, and/or the like. In certain embodiments, the user could be able to specify that the search be performed periodically. The frequency for such might be selected by the node, and/or could be specifiable by the user. Further, in certain embodiments of the present invention, a user could specify a time and date at which searching should commence. Also, in various embodiments, operations related to a search could be specified to execute on a node at times a user is not interacting with the node. As another example, in various embodiments, a search operation could be specified to be always active.

Operations related to such searches could, for instance, execute as a background process, perhaps such that appropriate user interface software modules are not active and the user is not actively doing any effort.

Next, the user's node could, in various embodiments, act to send via already established communication channels one or more messages containing information of downloadable entities corresponding to one of more nodes belonging to selected groups.

Next, the user's node could act to determine the entities available for download with respect to the chosen group or groups and any specification of metadata and/or other parameters. Such functionality could be implemented in a number of ways.

For example, the user's node could then act to send via already established communication channels one or more messages requesting about information of downloadable entities regarding the one or more nodes belonging to selected groups. If the user's node notices that there are no sufficient communication channels to reach enough nodes in the selected groups, the node could employ service discovery, perhaps of the sort noted above, to learn of nodes associated with the specified groups. Accordingly, the user's node could, via such service discovery, learn of network addresses or the like correspond to those nodes. The user's node could then act to send one or more messages requesting from one or more of those nodes information regarding entities available for download. Included in the request could be any user specification of metadata and/or other parameters. In a manner analogous to that discussed above, each such message could be sent, for example, via email, MMS messaging, SMS messaging, OBEX OPP and/or the like.

As another example, one or more search query messages of the sort described above could be dispatched. In various embodiments, included the search data field of such search query messages could be any metadata and/or other parameters specified by the user.

As a next step, the user's node could receive information regarding entities available for download (step 907). Such information could include, in various embodiments, related unique identifiers, network addresses, and/or the like. Such information could arrive in a number of ways. For example, the information could arrive via messages sent via email, MMS messaging, SMS messaging, OBEX OPP, and/or the like in a manner analogous to that discussed above. As another example, one or more search reply messages of the sort described above could be received. Included in the received information could be, for instance, metadata and/or other parameters corresponding to the entities available for download. Also included could be, for instance, indications of numbers of network hops, types of networks hops, network use cost information, and/or the like corresponding to receipt of the entities at the user's node.

Next, the node could present to its user, perhaps via a GUI or other interface, all or some of the received information regarding entities available for download (step 909). In various embodiments where the user had provided specifications regarding link and/or interface use, the presentation could be in accordance with the specifications. As a specific example, where the user or settings in the user's node had indicated a desire to minimize the use of cellular links such as, for example, GPRS or UMTS links and maximize the use of short-range radio communication links such as, for example, Bluetooth links, the node might act to only present information regarding entities that could be retrieved in compliance with those specifications. It is noted that, as alluded to above, in various embodiments a further search results could be requested. For such embodiments, the GUI or other interface could present the user with the option to request such further searching. In the case where the user requested such further searching, the user's node could act as discussed above to comply with the request. Upon receipt of the results of the further searching, the user's node could act, perhaps in a manner analogous to that just described, to present all or some of the received data, and perhaps to again present the option for further searching. The first phase search result presentation might contain surrogates related to content items like thumbnails of images, samples of video clips, document summaries, and/or the like. In certain embodiments it is possible that the search results show the metadata and other descriptions of the found items with the identity of the node holding the entity, with an additional notice that the items themselves are not available since the node is not active or cannot be reached at the moment.

The GUI or other interface could, in various embodiments, further act to allow the user to select from the presented entities one or more entities for receipt (step 911). The user's node could act to request receipt of such selected entities in a number of ways. For example, the user's node could dispatch one or more such requests via email, MMS messaging, SMS messaging, OBEX OPP, and/or the like. The requests could be directed toward unique identifiers, network addresses, and/or the like corresponding to the nodes offering the desired entities. The unique identifiers, network addresses, and/or the like might be known, for example, by examination of messages received via email, MMS messaging, SMS messaging, OBEX OPP and/or the like regarding available entities.

As another example, the user's node could dispatch one or more item request messages of the sort noted above. In various embodiments the user's node could, in accordance with that discussed above, include in the requested entity data field of each such item request metadata and/or other parameters sufficient for a node receiving the item request message to know the desired entity message. As noted above, in various embodiments a unique identifier could be included in the metadata and/or other parameters.

As a next step, the user's node could receive the requested entities. The requested entities could be dispatched to the user's node in a number of ways. For example, the entities could be dispatched as discussed above via dispatch messages. As another example, the entities could be dispatched by the nodes possessing them via email, MMS messaging, SMS messaging, OBEX OPP, and/or the like. In various embodiments, in selecting entities for download, the user could specify a desire to perform a conditional download. For instance, the user might be able to specify that a particular entity only be downloaded when her node is capable of directly contacting the node holding the entity (e.g., via direct Bluetooth communication).

The user's node could act to comply with such a request in a number of ways. For example, where the user's node knew the identity of the node holding the entity, the user's node could periodically perform device discovery in an attempt to find the node holding the entity, and act to have the entity received upon the node holding the entity being so found. As another example, where the search results did not indicate that the entity could be received from a node by a single network hop, the user's node could periodically repeat the search until such a result was found, and then perform operations to receive the entity via the found single hop source. As a specific example, the user's node might perform such searching to discover a source for the entity that involved a single Bluetooth hop. In another alternative embodiment, the entity downloading might be activated once there was a Bluetooth connection from user's node available to other nodes providing access to this node holding the entity.

According to various embodiments, in selecting an entity for download, a user and/or a user's node could specify that different parts of the entity be received in different ways. For example, where the node indicated to the user that a particular entity could be received in two ways, one involving only Bluetooth hops and a second involving only UMTS hops, the user could specify, perhaps via a GUI or other interface, that a first portion of the entity should be receive via the UMTS hops and the remainder of the entity should be received via the Bluetooth hops. In various embodiments, the user and/or the user's node could further specify portion sizes. Accordingly, the user and/or the user's node might be able to specify that the first portion be of a specified size in bytes and/or be a specified fraction of the whole. The first portion might, for instance, be significantly smaller than the remaining portion. The user and/or the user's node might make such specifications, for example, believing Bluetooth to be slower but less expensive, and UMTS to be faster but more expensive, and adopting the point of view that she was willing to incur the expense to get the first part (e.g., so that she could begin making use of the entity), but was willing to wait longer to receive the rest.

As a specific example, the portion sizes might be chosen such that by the time the user had made use of the first portion of the entity, the other portions would have already arrived. It is noted that entities such as, for example, media items like sounds, films, and/or the like could offer functionality whereby one could view a portion of the entity without possessing the whole.

As discussed above, in various embodiments retransmission of an entity not wholly received (e.g., due to network errors) could be such that correctly-received portions of the entity are not present.

In the case where the user's node, rather than the user, specifies that different parts of an entity should be received in different ways such functionality might, perhaps, be in accordance with guidelines for operation. The guidelines might, for example, be based on preferences set by the node's user (e.g., via a GUI) and/or be based upon default settings. The default settings might, for example, be loaded upon the node during initial set-up and/or placed thereupon at a later time (e.g., via network transfer of appropriate data). In various embodiments, the default settings might be provided by a service provider, system administrator, and/or the like.

The functionality whereby a node specifies that different parts of an entity be received in different ways might, in various embodiments, be performed by one or more software modules operating on the node. It is further noted that such functionality might be part of an overall functionality implemented by that node with the goal of achieving efficient communications. It is further noted that a node might, perhaps, act in a manner that is tolerant of breaks in connections and/or in availability of various types of links, perhaps being able to easily resume network operations upon a connection being re-created, and/or one or more link types becoming available once again.

Sharing Operations

Figure 10:
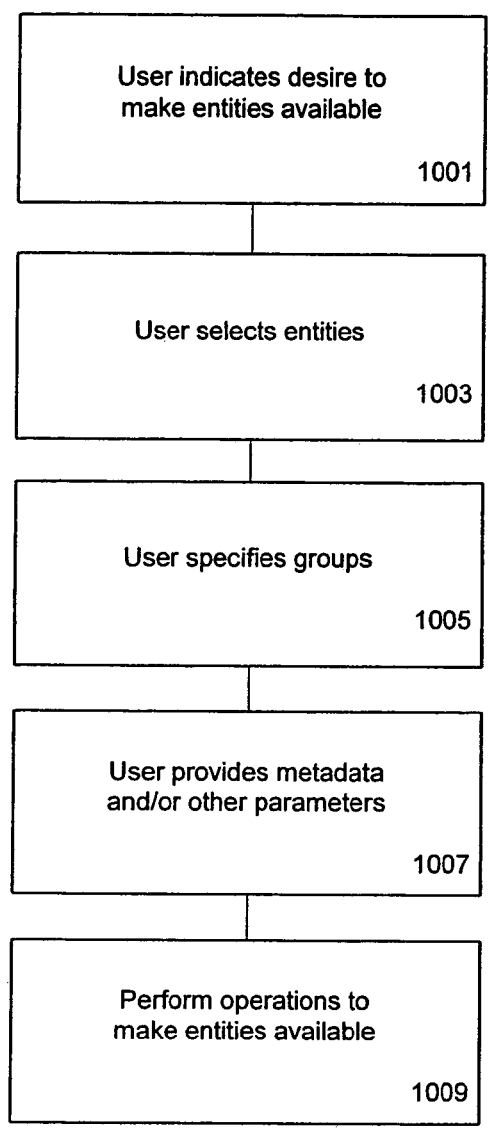
FIG. 10 is a diagram depicting exemplary steps involved in making entities available according to various embodiments of the present invention.

With respect to FIG. 10 it is noted that a user wishing to make entities such as files, media items, program, folders, and/or the like available from her node for receipt by other nodes could, according to various embodiments of the present invention, first indicate a desire to do so to her node via a GUI or other interface (step 1001). In response, her node could allow the user to select one or more entities to be made available. Such functionality could be provided in a number of ways. For instance, the user could be allowed to navigate through the node's file system via a GUI or other interface and to select those entities to be shared (step 1003).

Next, for each selected entity, the node could, in various embodiments, query the user as to which groups the entity should be made available for download. For example, the node could provide for each entity a GUI checkbox or the like corresponding to each group allowing for downloads of which the user was a member (step 1005). Further for each selected entity, the node could, in various embodiments, prompt the user for corresponding metadata and/or other parameters (step 1007). In certain embodiments, the node might not perform such an operation in the case where it determined that metadata and/or other parameters were already associated with an item. As alluded to above, in various embodiments metadata and/or other parameters associated with an entity could include a unique identifier. Accordingly, the node might next act to create a unique identifier corresponding to each selected entity and to append it to the entity's metadata. Unique identifier creation could, for instance, be performed in a manner analogous to that discussed above.

In various embodiments, the node might, in various embodiments, next act to copy the selected entities to one or more appropriate folders on the node associated with file sharing. In another embodiment, instead of the selected entity itself being copied, a link to the entity (e.g., file), and/or perhaps corresponding metadata and/or other information, could be copied. For instance, the node might maintain such a folder with respect to each group for which its user is a member and is making entities available for download. As a next step, the node could perform operations to make the selected entities available for download (step 1009). Such functionality could be implanted in a number of ways.

For example, in various embodiments the node could act, in accordance with that discussed above, to create and/or update a table entry for each entity. Included in each such created and/or updated entry could be corresponding metadata and/or other parameters, and/or an indication that the entity existed on the node. In embodiments where a table is maintained for each group of which the user is a member, the operations could be performed with respect to each such appropriate table.

Further, the node could, in various embodiments, perform appropriate operations so as to, in accordance with that discussed above, properly response to search query messages. In various embodiments the node could perform appropriate operations to allow service discovery operations of the sort described above to find it to be providing items for download. Further, the node could perform appropriate operations to prepare itself to respond, perhaps in accordance with that discussed above, to messages requesting information regarding entities available for download.

It is noted that, as discussed above, in various embodiments a node could act to receive an entity or entity portion for the purpose of passing it on to another node, and that such entities or entity portions could be cached with a unique identifier and made available for further downloads by other nodes belonging to any of the peer-to-peer groups. It is further noted that, as discussed above, a node could act to decide whether or not to perform such caching based, for example, on specifications regarding available storage space. It is additionally noted that, as discussed above, in various embodiments entities or entity portions could be provided via multicast in cases where such functionality is appropriate.

Additionally, it is noted that, in various embodiments, a user could act to deny search request and/or item receipt requests arriving at her node. The user might be able to make such specification, for instance, via a GUI or other interface provided by her node. Various forms of such functionality could be provided to users. For example a user might be able to specify that all search and/or item requests should be denied. As another example, a user might be able to specify that all search and/or item requests matching specified parameters be denied. As yet another example, a user might be able to specify that she be informed by her node of each incoming search and/or item request and be provided with the option of allowing or denying it. In various embodiments, differing amounts and types of information could be presented to the user by her node in the process of so informing her of an incoming request.

In various embodiments it might be possible to define, perhaps via an interface of a user's node, how entity sharing will happen once an entity is marked to be shared. For example, a user wanting to avoid extra costs, and/or excess processor use, power use, bandwidth use, and/or the like related to usage of her node's access link might specify that uploading of files and/or metadata describing those files should be minimized. Different combinations of optimization techniques can be utilized.

As a specific example, where an entity is marked to be shared, replicas of the entity's metadata and/or the entity itself could, in various embodiments, be transferred to other nodes belonging to the appropriate group. Those nodes could, for instance, be other users nodes or nodes of a service provider. Such operation could have benefits such as, for example, improving availability of shared entities and/or information regarding shared entities in, for instance, the case of users nodes and/or appropriate software modules not being always active and/or reachable. As another example, such operation could have the benefit of enabling sharing in cases the user does not allow searches and/or download request to be satisfied by her node. In various embodiments, the transferring of replicas of the entity's metadata and/or the entity itself to other nodes may take into consideration also cost and bandwidth issues relating to the sharing of data. These issues may be taken into consideration, for example, by sending the data between nodes through a short-range radio link (e.g., wherein the nodes are positioned in close proximity to each other).

In another example, once a node receives a search request, then the node could, in various embodiments, act to determine whether it possesses the requested entity and/or any other entities corresponding to, or with a close match to, the requested entity. Thereafter, in various embodiments, the node could dispatch the search reply and add descriptive metadata describing the entity to the reply. The metadata or part of it, including for example the unique identifier and/or network address of the node, and/or the unique identifier of the entity itself, might, in various embodiments, be copied to caches of intermediate nodes transporting the search reply to the requesting node. The actual search reply delivered to the requesting node might, perhaps, contain only a subset of uploaded metadata description. As a specific example, later on, when some other node sends a similar or corresponding query, it may happen that one or more intermediate nodes are able to provide the requested entity, so the query does not need to be routed to the node having the entity. Some of the intermediate nodes may be always on-line and/or possess large caches. However, if the metadata in the caches of intermediate nodes has been aged, the reply procedure may need to be repeated.

It is noted that, in various embodiments, the upload of an entity by a node to other nodes might happen only when the node receives a first request regarding that specific item. In such embodiments, in the case of a first request, the entity could be uploaded, and perhaps copied to caches of other nodes and/or linked with the already uploaded metadata. It is noted that, in such embodiments, in the case where no upload request was ever received, the entity might never be moved over the access link.

Messaging Operations

Figure 11:
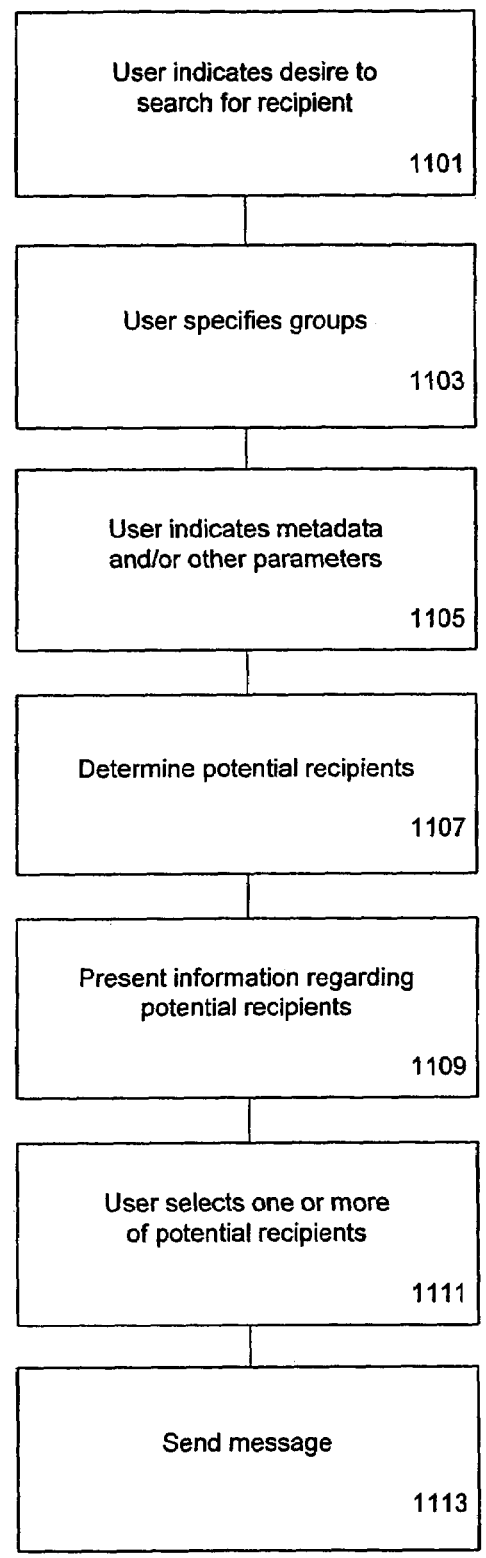
FIG. 11 is a diagram depicting exemplary steps involved in messaging according to various embodiments of the present invention.

With respect to FIG. 11 it is noted that a node user wishing to send an instant message could, according to various embodiments of the present invention, indicate a desire to search for a corresponding recipient via a GUI or other interface provided by her node (step 1101). In various embodiments, the user could additionally specify one or more of its node's interfaces as employable in the searching for instant messaging recipients and/or sending instant messages.

In response, the node could present its user with a listing of the groups of which she is a member, and request that she indicate of which one or more of these groups the recipient of her instant message should be a member. The user could make the choice via the GUI or other interface (step 1103). As a next step, the user could, in various embodiments of the present invention, choose to indicate to her node metadata and/or other parameters corresponding to potential recipients that should be found (step 1105). Next, the user's node could act to determine potential recipients with respect to the chosen group or groups and any specification of metadata and/or other parameters. Such functionality could be implemented in a number of ways (step 1107).

For example, the node could employ service discovery, perhaps of the sort described above, to learn of potential recipients associated with the specified groups. Accordingly, the user's node could, via such service discovery, learn of unique identifiers, network addresses, and/or the like corresponding to the nodes of those potential recipients. In various embodiments, through such discovery the user's node could learn of metadata and/or other parameters corresponding to potential recipients, and only consider those potential recipients whose metadata and/or other parameters matched any such indicated by its user. As another example, one or more search query messages of the sort described above could be dispatched. In various embodiments, included the search data field of such search query messages could be any metadata and/or other parameters specified by the user. In response to such search query messages, the user's node could receive one or more search reply messages of the sort described above. Included with the search reply messages could be metadata and/or other parameters corresponding to the potential recipients. Next, the node could present to its user, perhaps via a GUI or other interface, all or some of the received information regarding potential recipients (step 1109).

It is noted that, as alluded to above, in various embodiments a further search results could be requested by the user. For such embodiments, the user's node could operate in a manner analogous to that discussed above with respect to search for entities such as content items. It is further noted that, in various such embodiments, the user's node might automatically act to receive further search results, perhaps in an attempt to learn of all relevant potential recipients.

The GUI or other interface presenting potential recipients to the user could further act to allow the user to select one or more of the potential recipients as instant message recipients (step 1111). In response to such a selection, the node might first allow the user to compose a corresponding instant message. For instance, the node could present its user with a GUI window or the like into which text could be entered and/or files (e.g., multimedia files or program files) could be dragged.

Next, the user's node could act to send the created message (step 913). Such functionality could be implemented in a number of ways. For instance, the instant message could be dispatched, perhaps in a manner analogous to that discussed above, via email, MMS messaging, SMS messaging, OBEX OPP, a dispatch message, and/or the like.

It is noted that, in various embodiments, a user could specify an instant message recipient without having searching of the sort described above performed. For example, the user's node could present her with a listing of potential recipients that were already known to it. The node might know of such potential recipients by their unique identifiers, network addresses, and/or the like. Such information may be obtained, for example, via previous search operations, previous message send operations, an associated store, and/or the like. As another example, the user might provide its node with information sufficient to have a message sent to a particular user's node. Such sufficient information could include, for instance, a network address, a unique identifier, metadata associated with a unique identifiers, and/or the like.

In various embodiments, a user wanting to send a message to all currently active members of a peer group could do so without the need to specify recipients more exactly than via an appropriate common group identifier. In another example, a user wanting to send a message to all currently active members in a peer group could act to select the peer group as recipient, and the user's node could respond, for instance, by mapping the unique identifier of the group to the message.

In accordance with various embodiments of the present invention, the node of a user wishing to receive instant messages might act to perform one or more preparatory steps. For example, the node could perform appropriate operations to allow service discovery operations of the sort described above to find it and/or its user as potential recipients. As another example, the node could, perhaps in accordance with that discussed above, perform appropriate operations so that search query messages of the sort described above would result one or more search reply messages indicating the node and/or its user to be potential recipients.

Chat Operations

According to various embodiments of the present invention, a user wishing to search for joinable chat boards might indicate a desire to do so via a GUI or other interface provided by her node. In various embodiments, the user could additionally specify one or more of her node's interfaces as employable in the searching for instant messaging recipients and/or sending instant messages. In response, the node could present its user with a listing of the groups of which she is a member, and request that the user indicate with respect to which of these groups she wished to search for chat boards. The user could then comply.

As a next step, the user could, in various embodiments of the present invention, choose to indicate to her node metadata and/or other parameters to be taken into account in searching for joinable chat boards.

Next, the node could act, perhaps in accordance with any user indications of the sort noted above, to learn of one or more nodes handling chat board membership. Such functionality could be implemented in a number of ways. For instance, service discovery, perhaps of the sort described above, could be employed. Through such action, the node could learn of various available chat boards.

In another embodiment of the present invention, the user does not need to search for available chat boards, and the user's node is automatically informed of currently active chat boards in those peer groups where the user is a member and the user's node is online.

As a next step the node could act to present to its user received information regarding available chat boards. Next, the node could allow the user to indicate a desire to join one or more of the chat boards. With respect to each chat board so chosen by the user, the user's node could act to dispatch a message regarding its user's wish to join the board to the appropriate node. Such dispatch could be performed in a number of ways. For example, such dispatch could be via email, MMS messaging, SMS messaging, OBEX OPP, dispatch message, and/or the like. Included in the message could be metadata and/or other parameters corresponding to the user, the metadata perhaps including a unique identifier corresponding to the user.

In response, each recipient node could act to add some or all of the metadata and/or other parameters to a maintained store containing data corresponding to all members of the board. Next, each recipient node could act to dispatch to nodes of its current members messages including data corresponding to the user, the data being sufficient to allow the each such node to send messages to the user's node. After this, each recipient node could act to dispatch to the user's node one or more messages including data corresponding to all members of the board, the data being sufficient to allow the user's node to send messages to the nodes corresponding to those members. The recipient nodes could send the messages to the nodes of the current members and the node of the user in a number of ways. For instance, email, MMS messaging, SMS messaging, OBEX OPP, dispatch message, and/or the like could be employed.

Next, the user could employ her node to participate in a joined chat board. Accordingly, the node could, for example, employ a GUI or other interface to present to its user joined chat boards and to allow the user to select one or more of the chat boards for participation. For a joined chat board in which the user was participating, the user's node could allow her to, perhaps via the GUI or other interface, view messages or the like posted to the chat board and/or to post messages or the like to the chat board.

In the case where the user wished to post a message or the like to the chat board, the user could employ her node to compose the message. For instance, the user could enter appropriate text and/or drag appropriate files (e.g., multimedia files) into a GUI window. Upon completing composition of the message, user could further indicate to her node that the message be posted. The functionality for performing such posting could be implemented in a number of ways. For example, the user's node could dispatch the message in a manner analogous to that discussed above with respect to instant messaging, but with delivery being to the nodes of all members of the board in accordance with the received data corresponding to those nodes.

The nodes of other members of the chat board wishing to post messages could behave in a like manner. Accordingly, the user's node could be one of the multiple recipients of such a message, and could present it to the user, perhaps via the GUI or other interface noted above.

According to various embodiments of the present invention, a node's user might act to create a new chat board corresponding to a group of which she is a member. In certain embodiments, rules set by a system administrator or other individual could govern whether or a user was allowed to create a new chat board. A user wishing to so create a new chat board might first employ a GUI or other interface to indicate her desire to do so to her node.

In response, the node could, in various embodiments, query the user for metadata and/or other parameters corresponding to the chat board to be created. The node might further query the user for specification of a group with respect to which the chat board should be created. After receiving the user's responses, the node could, where necessary, perform service discovery, perhaps in a manner analogous to that discussed above, to learn of one or more nodes handling chat board membership. Where the node's user indicated a particular group for which the chat board should be created, the user's node could act in the service discovery to learn of one or more nodes handling chat board membership with respect to the indicated group.

Next, the user's node could dispatch to an appropriate node handling board membership a message indicating its user's desire to create a new chat board. Included in the message could be, for instance, metadata and/or other parameters corresponding to the user, metadata and/or other parameters provided by the user regarding the chat board to be created, and/or an indication of the group with respect to which the chat board is to be created. In various embodiments, included in the metadata and/or other parameters corresponding to the user could be a unique identifier or the like. The message could be dispatched, for example, via email, MMS messaging, SMS messaging, OBEX OPP, dispatch message, and/or the like.

Upon receipt of the message, the appropriate node could, in various embodiments, first act to see if the user was permitted to create a new chat board. Accordingly, the appropriate node might access an associated store, another node, and/or the like to consult any corresponding rules of the sort noted above. In the case where the appropriate node found that the user was not permitted to create a new chat board, it could dispatch a message containing an indication of such to the user's node. The message might be dispatched, for example, via email, MMS messaging, SMS messaging, OBEX OPP, dispatch message, and/or the like. Where the appropriate node determined that the user was permitted to create a new chat board, and/or in embodiments where no such determination was performed, the appropriate node could act to establish the new chat board. Accordingly the appropriate node might, for example, perform appropriate operations to allow service discovery operations of the sort described above to result in learning about the newly-created chat board. Alternately or additionally, the appropriate node might, for instance, automatically inform online nodes of other group members of the availability of the new chat board, and/or perform appropriate operations so that it could, perhaps in a manner analogous to that discussed above, respond to received messages regarding a user's wish to join the newly-created chart board.

In another example, when a user indicates a desire to create a new chat board via a GUI or the like, software in the user's node could check from metadata describing the user's profile whether the user is entitled to establish a new chat board or not.

Game Operations

As discussed above, various of the functionality described herein may be applied, for example, to chat, sharing, and messaging. It is noted that such functionality is applicable to many other uses as well. An exemplary such additional use will now be described.

According to various embodiments of the present invention, there may exist functionality relating to various sorts of gaming. Such functionality could, for instance, allow for multi-player gaming among group members. In various embodiments, all users interested in playing games may belong to general group corresponding to gaming, and/or each might possess a corresponding certificate. Such a gaming general group and/or corresponding certificate could operate in a manner analogous to the general group and corresponding certificate discussed above. In various embodiments, a user belonging to such a gaming general group could search for and/or join various groups corresponding to joinable game instances in progress and/or starting at a later time. For instance, a particular such group might correspond to a game in which members of the group were competing in a virtual motorcycle race. It is noted that, in various embodiments, there might be no gaming general group. For such embodiments, users interested in playing games might be able to search for and/or join groups corresponding to joinable games by way of membership in a general group of the sort noted above.

Accordingly, a user wishing to join in a multiplayer game could act to have a search for groups corresponding to appropriate game instances performed. Such a search for groups could operate in a manner analogous to that discussed above. Thus the user could, perhaps via appropriate GUI elements, supply metadata and/or other information (e.g., freely written text based keywords, other types of information, and/or the like) describing the sort of game she was interested in joining. For example, the user could supply the name of a game she was interested in as title metadata, and perhaps further supply qualifying data as subject field metadata. Alternately or additionally, the user could supply such information via freely written text based keywords, other types of information, and/ or the like.

In response, the user's node could act to process the user's entry. In various embodiments, the user's node might act, perhaps in a manner analogous to that discussed above, to associate freely written text based keywords, other types of information, and/or the like could with appropriate metadata values, fields, and/or the like. Next, the user's node could act to perform appropriate operations so as to have search performed for groups in accordance with the user's entries. Such operations could, for example, be performed in a manner analogous to that discussed above. It is noted that, in various embodiments, the user's node might add parameters to a message or the like sent in carrying out the appropriate operations. Such parameters might, for instance relate to node type, a node identifier, and/or the user (e.g., user alias name). It is further noted that, in performing the operations, the node might, in various embodiments, make use of already-open connections to other nodes. Such connections might, for instance, involve messaging via a network formed of nodes. Messaging via the network of nodes might be via peer-to-peer and perhaps, when available, direct links. The connections could, in various embodiments, involve the use of different types of transmission links.

In response to the appropriate operations performed by the node in response to its user's request to search for groups corresponding to joinable games, various information could be received. For instance, various metadata and/or other information relating to the groups could be received. Among the information received could be descriptions, invitations, challenges, and/or the like. Such could be presented to the user, for instance, via appropriate GUI elements or the like. Received, for example, with respect to a group could be a challenge directed towards players interested in joining an in progress virtual motorcycle race. As another example, received with respect to a group could be a challenge directed towards players interested in joining a virtual motorcycle race set to start at an indicated time.

The user could next indicate a desire to join one of the groups corresponding to joinable games, and her node could act to comply with her request. Such functionality could operate, for instance, in a manner analogous to that discussed above. In various embodiments, in the case where the user's node did not possess appropriate program modules and/or the like corresponding to the game to be played, operations might be performed so that the node could receive the appropriate modules and/or the like. For instance, such appropriate modules and/or the like might be delivered by messaging via a network formed of nodes. Messaging via the network of nodes might be via peer-to-peer and perhaps, when available, direct links.

As noted above, in various embodiments of the present invention a message containing group information could be dispatched to other users without those users requesting such information. As further noted above, such a message might be dispatched, for instance, by action of a corresponding group manager, group member, and/or the like, perhaps with a particular goal in mind (e.g., increasing group membership).

It is noted that, according to various embodiments of the present invention, analogous messages could be sent out with respect to groups corresponding to game instances. Accordingly, for instance, such might be dispatched with respect to a particular group corresponding to a game instance by action of a group manager, group member, and/or the like that, for example, wished to draw other users to the corresponding game instance. The group manager, group member, and/or the like might act to have such a message sent, for example, via an interface provided by, for instance, one or more program modules employable for playing the game associated with the group.

It is further noted that such a group manager, group member, and/or the like might specify additional information relating to the sort of users sought. Such information could include, for instance, properties, traits, and/or the like. As a specific example, such information might specify that only users that had earned at least a specified score in a specified game and/or with respect to a specified game type were sought.

The message could be sent out in a manner analogous to that discussed above. Accordingly, for instance, the message might be sent out by way of email, MMS messaging, SMS messaging, OBEX OPP, sending a dispatch message via a network formed of nodes, and/or the like. Messaging via the network of nodes might be via peer-to-peer and perhaps, when available, direct links.

The message could, in various embodiments, be routed via nodes to those nodes belonging to the group. In various embodiments, inside each such node, the message could be routed via, for instance, one or more appropriate software modules. Such one or more appropriate software modules might, for instance, correspond to a group router handling game messages for the group. The one or more appropriate software modules could act to route the message to the node's own gaming application and/or to one or more other nodes that the node knew to belong to the group. It is noted that, in various embodiments, receipt of such a message at a node could, perhaps in accordance with the node's settings, activate one or more program modules employable for playing the game associated with the group. In various embodiments, the one or more modules employable for playing the game might act to decide wither or not the node's user should be notified of the message.

Group Creation Operations

According to various embodiments of the present invention, a user may request that a new group be created. With the request, the user might be able to ask to be a group manager for the new group. The user could make such a request, for instance, via a GUI or other interface provided by her node.

In response to the request, the user's node could, in various embodiments, query the user for metadata and/or other parameters corresponding to the group to be created. Included in the metadata could be, for instance, a group name and/or a group description. In various embodiments, the node could act to create a unique identifier or the like and associate it with the supplied metadata and/or other parameters. Creation of the unique identifier or the like could, for instance, be performed in a manner analogous to that discussed above.

Next, the node could, in various embodiments, query the user as to whether completion of a membership application would be required to attempt to join the new group. Where the user indicated that such an application would be required, the node could request that the user create the application. Accordingly the node could, for instance, present the user with a GUI or other interface whereby the user could indicate the questions to be asked of and/or information to be gathered from a group applicant. As alluded to above, among the information gatherable by such an application could be billing data. Such functionality might be employed, for example, in the provision of groups for which subscription was required.

As a next step, the node could, in various embodiments, query the user for group rules corresponding to the group to be created. Such functionality could be implemented in a number of ways. Among the group rule information sought by the node could, where a membership application was to be employed, be acceptable responses to questions asked by and/or information gathered by the membership application. Accordingly, the user could, via a GUI or other interface, provide the node with specified appropriate responses, ranges of appropriate responses, and/or the like.

Additional group rules sought by the node could be, for example, an expiration date for the group, a maximum number of members, and/or whether or not the group should be findable by searching operations. In various embodiments, the user may be able to specify preferred values for such, perhaps in accordance with ranges established, for instance, by a service provider, software, and/or the like. Further sought could be information regarding the services to be provided for the group, and perhaps specifics corresponding to the provision of those services. For instance, it might be possible for the user to specify which one or more of sharing, instant messaging, and chat services should be provided with respect to the group. Specifics that could be indicated by the user with respect to such services might include, for example, rules regarding sharable entities. In various embodiments, the node could query the user as to what users should be group managers for the group. The query could ask the user if she wished to be a group manager in the case where she had not already indicated such a desire.

Next, the node could send a message to a service provider node or the like containing the collected information regarding the group to be created. Further included in the message could be data corresponding to the user. The message could, for example, be sent via email, MMS messaging, SMS messaging, OBEX OPP, dispatch message, and/or the like. After receiving the message, the service provider node or the like might act to determine if the user was entitled to create a new group. Accordingly, the service provider node or the like could, for instance, act to consult one or more appropriate rules. The rules might, for example, be provided by a system administrator and/or the like.

Next, the service provider node or the like might, in various embodiments, act to perform any necessary charging or billing operations regarding the user's request. Accordingly the service provider node or the like might act to bill the user for the creation of the group. Billing could be in accordance with one or more established rules, the rules perhaps provided by a system administrator or the like.

Where the service provider node or the like determined that the user was not entitled to create a group, and/or where billing operations produced an unsatisfactory result, the service provider node or the like could act to send a message to the user informing her of such. The message could be sent, for instance, via email, MMS messaging, SMS messaging, OBEX OPP, dispatch message, and/or the like.

Next, after performing any necessary checks regarding the user's being permitted to create a group and any necessary billing operations, the service provider node could act to create the group. In various embodiments, the service provider's node could act to create a unique identifier or the like for the group, and associate it with the user-supplied metadata and/or other parameters. Creation of the unique identifier could, for instance, be performed in a manner analogous to that discussed above.

Accordingly, the service provider node or the like could, where the user requested to be a group manager for the new group, act to establish the user as such and to perform appropriate operations so that the user's node could act, in accordance with that discussed above, to respond to requests to join the new group. Included in such operations could be, for example, providing one or more appropriate certificates to the user's node. As one specific example, the certificate could be a group management certificate. Further, the service provider node or the like could perform appropriate operations so that one or more nodes could act as discussed above to present the new group as a joinable group.

Still further the service provider node or the like could, in various embodiments, act to allow for membership application functionality of the sort described above. Accordingly, the service provider node or the like could, for example, act to have a Java application or the like of the sort described above created and/or to have a secure server of the sort described above established. The service provider node or the like could do such in a number of ways. For example, the service provider node or the like could create the Java application or the like could using automatic code generation techniques known in the art. As another example, the service provider node or the like could act to communicate with a secure server or the like to have the above-described functionality implemented. Alternately, the service provider node or the like might act to inform one or more individuals of a need to have such tasks performed.

It is noted that, in various embodiments, service providers could act to control group creation. For instance, service providers could act to accept or reject group rules, and/or to preset the selection of acceptable and/or default values into an interface or the like employed by a user in defining group rules.

It is noted that various sorts of groups could be created in accordance with various embodiments of the present invention. For example, groups requiring a membership application to be completed might include groups created by families, businesses, or groups of friends. As another example, groups for which subscription was required might include groups created by service providers, content owners, software companies, and/or the like.

As noted above, an expiration data could, in various embodiments, be set for a group. By appropriately choosing an expiration date, a group which could be thought of as a "temporary group" could be created. Such a temporary group could be employed for a number of purposes including, for example, gatherings and special occasions.

Additional examples of groups include, for instance, groups related to clubs, groups related to hobbies, business-to-business (B2B) groups and business-to-consumer groups (B2C).

It is further noted that, in various embodiments, operations allowing for the merging of groups could be performed. For example, system administrators, group managers, and/or others might be able to specify that one or more groups be merged to create a new group, the new group perhaps being specified to replace the one or more groups. In performance of the merging, various operations could be performed. For instance, operations could take place such that members of the one or more groups would be considered to be members of the new group. Further, group metadata might be combined, perhaps in accordance with semantic mappings and/or the like, and the merged group metadata could be updated to nodes of members of the new group. The mappings might, for instance, be provided by a system administrator, software, and/or the like. The group metadata in this context could, in various embodiments, mean both metadata describing the group, metadata listing members of the group, and/or the like, and/or group-specific metadata related to, for instance, media items and content.

Further, operations might take place so that downloadable entities and/or the like that were made available with respect to the one or more groups would be made available with respect to the new group. Such operations might, for instance, involve directory-level actions. It is noted that in various embodiments, for such a merging to take place, permission might need to be received from the managers associated with each of the one or more groups.

Additional Operations

According to various embodiments of the present invention, operation may be such that use of services, such as entity sharing and the other services described above, would not be anonymous. For example, as will be discussed in greater detail, a user might be required to present a certificate in order to make use of a service, wherein the certificate contains information identifying the user.

It is further noted that, in various embodiments, one or more identifiers could be associated with shared entities. Such an identifier might, for example, serve to identify the user that initially made the entity available for sharing. As another example, such an identifier might serve to identify a producer and/or owner of the content corresponding to the entity. As a specific example, for a music media file entity, such an identifier might indicate the copyright holder.

Such identifiers could, in various embodiments, be associated with a shared entity in such a way that it could not be easily changed by unauthorized users. For instance, the identifiers could be digitally signed. It is further noted that, in various embodiments, shared entities could be digitally signed and/or encrypted. Further, various embodiments could allow for the purchase of entities. Such functionality could, for instance, involve performance of associated billing operations such as interface with credit card and/or banking systems, perhaps via use of one or more techniques known in the art.

Moreover, in various embodiments of the present invention, an event log could be maintained regarding entities received by users. The event log could, for instance, be employed as a deterrent for illegal entity sharing and/or as a tool to track down users that performed illegal entity sharing. It is noted that, in various embodiments, groups and/or users could eliminated in the case of improper behavior, illegal activity, and/or the like.

Event log functionality could be implanted in a number of ways. For example, each node could be configured to maintain a log of the entities it received and the entities it provides to other nodes, and to periodically transmit the log to a central server or the like. The central server or the like could act to compile the received logs into one or more master logs.

In various embodiments of the present invention, a user could specify a node to act as a proxy for her node in performing various operations. The user could perform such specification, for example, via a GUI or other interface provided by her node. For example, a user could, according to various embodiments, be able to specify a proxy for her node with respect to receiving entities. Accordingly, a request for receipt of an item of the sort noted above could include an indication that the entity should be delivered to the proxy. For instance, included in the email, MMS message, SMS message, OBEX OPP transmission, item request message, and/or the like could be a network address, a unique identifier with associated metadata, and/or the like sufficient for the entity to be directed towards the proxy node.

For certain embodiments, the user could be able to specify that all entities be delivered to the proxy. Alternately or additionally, the user could be able to specify rules according to which it would be decided wither an entity would be delivered to the user's node or to the corresponding proxy. As a specific example the user could be able to specify, perhaps via a GUI or other interface provided by her node, that only entities meeting certain specified size and/or type criteria be delivered to the proxy, and that all others be delivered to her node.

In an analogous manner, a user could, in various embodiments, be able to specify a proxy for her node with respect to providing entities to other nodes. Accordingly, a search reply message or other messages of the sort noted above regarding available entities might indicate that the proxy would perform the necessary operations. The indication, for example, might, as above be a network address, a unique identifier with associated metadata, and/or the like sufficient for the necessary operations to occur with respect to the proxy. In embodiments where such is appropriate, a proxy node specified for entity provision operations might also be employed in related search operations.

It is noted that in various embodiments a user might be able to, perhaps in a manner analogous to that discussed above with respect to receiving entities, specify rules relating to when the proxy should be employed. It is further noted that proxy functionality could be applicable under a number of circumstances. For instance, a user might employ such functionality in the case where her node lacked adequate processing power, energy resources, storage space, network connectivity, and/or the like to receive and or dispatch entities in a manner satisfactory to the user.

Additionally, it is noted that in various embodiments multiple service providers can arrange service interoperability for roaming users. For example, each such service providers could act to advertise each other's groups (e.g., public groups). As another example, such service providers could act to allow for interoperability of associated public keys. As still another example, such service providers could act to distribute each other's public keys. As an additional example, such service providers could act to agree upon the ports to be established for use in various operations discussed herein. Further, service providers can, in various embodiments, notify each other's users about certificate management related statuses (e.g., by providing certificate blacklists identifying users that have acted improperly and/or nodes corresponding to those users).

Certificates and Fees

As noted above, various embodiments of the present invention employ certificates. For example, as noted above a certificate corresponding to a group could be given to a user upon her becoming a member of that group. As another example, as noted a general access certificate could be given to a user. As yet another example, in various embodiments it could be required that for dispatch of messages of the sort noted above with respect to a particular group, a certificate proving membership in that group be presented.

As alluded to above, certain message dispatches could, in various embodiments, be performed without relation to a particular group. For instance, in certain embodiments message dispatches corresponding to joining a group could be performed without respect to a particular group. Accordingly, in various such embodiments it could be required, for example, that the above-noted general access certificate be shown for such message dispatches.

Various requirements could be implemented regarding the way in which certificates needed to be shown. For example, in certain embodiments it could be required that an appropriate certificate be shown for each message dispatch. As another example, requirements might be such that the appropriate certificate need only be shown when establishing a connection or the like, and that multiple messages could be dispatched over a connection or the like so established without it being required that the certificate be shown for each message dispatch. This type of connection between nodes might, for example, further be used for transporting messages that are related to the groups in common between the nodes. This type of connection could thus serve connectivity between more than one common group and, in various embodiments, if the settings of the nodes so allow, it could also enable by-passing of generated traffic described herein not limited to common groups. As a specific example, a connection between two peer nodes verified with generic access certificates and/or specific group membership certificates, and secret and public keys corresponding to the nodes could be used to transport in a multiplexed way traffic of specific groups.

Figure 12:
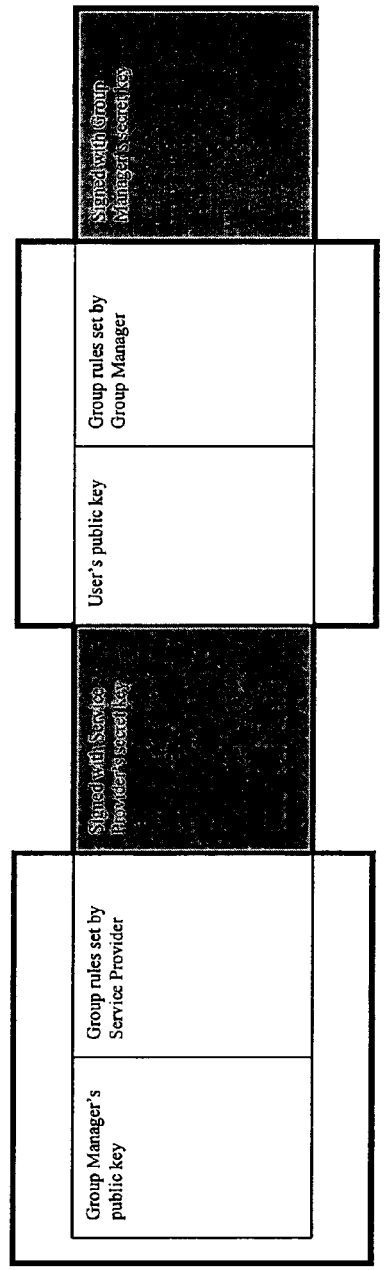
FIG. 12 shows an exemplary group membership certificate according to various embodiments of the present invention.

A certificate corresponding to a particular group could, for example, include sections signed with a secret key possessed by a service provider and/or the like, and/or could include sections digitally signed with a secret key possessed by a group manager associated with the group. Shown in FIG. 12 is an exemplary group membership certificate wherein a section containing a group manger's public key and group rules set by a service provider is signed with the service provider's secret key, while a section containing a public key of a user to which the certificate is given and group rules set by the group manager is signed by the group manager's secret key.

It is noted that a certificate could contain information corresponding to the identity of a user an/or could serve as evidence of the identity of a user. In various embodiments, such certificates could be employed so that users would not be anonymous in one or more of their actions. It is further noted that secret keys and/or public keys could be created, for example, via various techniques known in the art. It is further noted that the above-described functionality wherein a certificate is shown could be implemented, for instance, using various authentication, certificate challenge, and/or verification techniques. Certificates, secret keys, and public keys are thus, in various embodiments, used together to prove identity and membership in a group.

Figure 13:
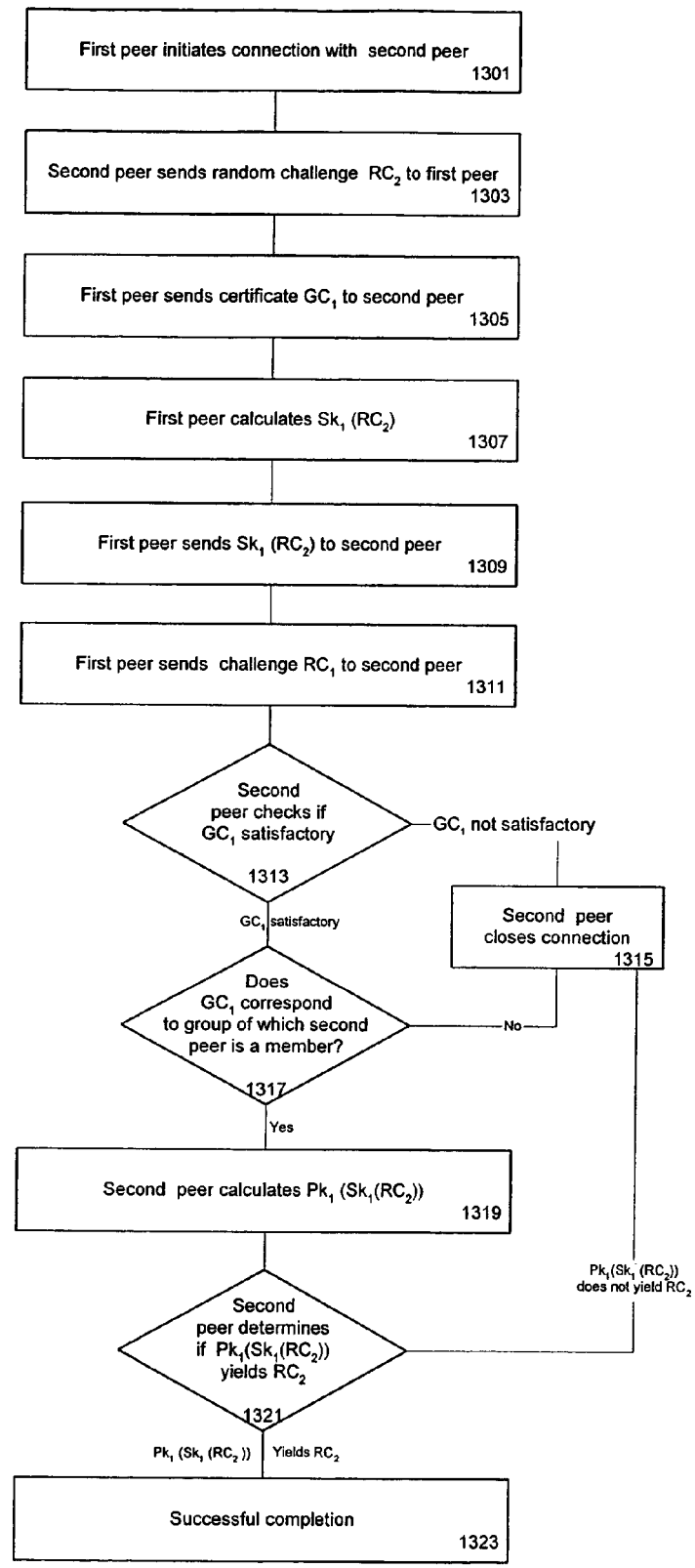
FIG. 13 is a diagram depicting exemplary steps involved authentication according to various embodiments of the present invention.
Figure 14:
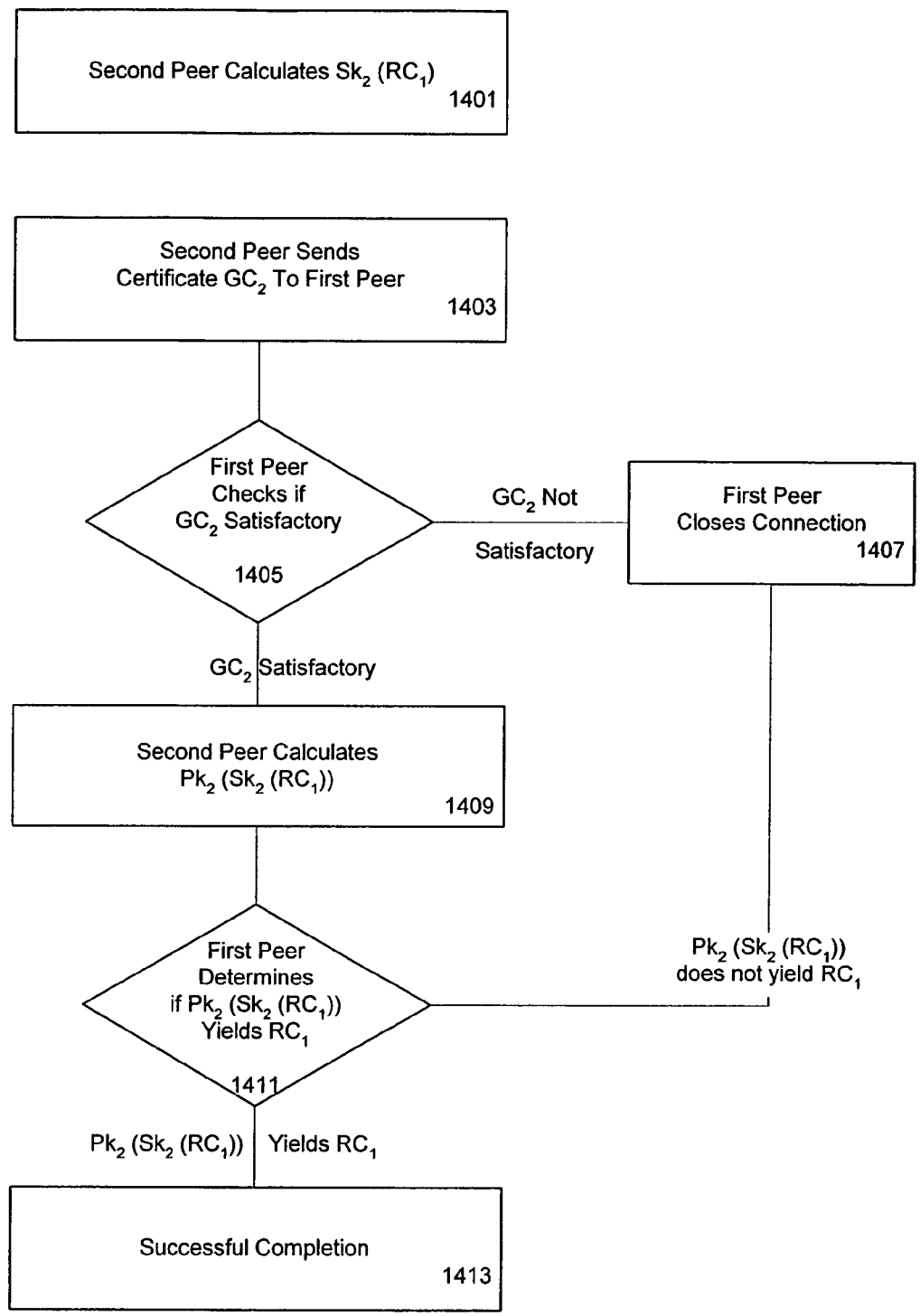
FIG. 14 is a diagram depicting further exemplary steps involved authentication according to various embodiments of the present invention.

Shown in FIG. 13 is an exemplary authentication procedure employable in various embodiments of the present invention wherein a second peer node acts to authenticate a first peer node, and shown in FIG. 14 is an exemplary authentication procedure employable in various embodiments of the present invention wherein the first peer acts to authenticate the second peer. An authentication procedure such as that shown in FIG. 14 could, for instance, take place after an authentication procedure such as that shown in FIG. 13 has successfully completed.

Turning to the exemplary authentication procedure of FIG. 13, the first peer first initiates a connection with the second peer (step 1301). Next, the second peer sends a random challenge $RC_2$ to the first peer (step 1303). In response, the first peer sends an appropriate group membership certificate $GC_1$ to the second peer (step 1305). Next, the first peer uses its secret key $Sk_1$ to encrypt the challenge $RC_2$ sent by the second peer (i.e., the first peer calculates $Sk_1(RC_2)$) (step 1307). Next, The first peer sends the encrypted challenge $Sk_1(RC_2)$ to the second peer (step 1309). Next, the first peer sends a challenge $RC_1$ to the second peer (step 1311). As a next step, the second peer checks the group membership certificate $GC_1$ received from the first peer (step 1313). In the case where the check finds $GC_1$ to be unsatisfactory, the second peer acts to close the connection (step 1315). In the case where the check finds $GC_1$ to be satisfactory, a determination is made as to whether or not $GC_1$ corresponds to a group of which the second peer is also a member (step 1317). From one point of view, this might be thought of as a determination of whether or not the first peer and the second peer both belong to the group to which $GC_1$ corresponds. In the case where the determination yields a negative result, the second peer acts to close the connection (step 1315). In the case where the determination yields a positive result, the second peer acts to decrypt the encrypted challenge with the first peer's public key (i.e., the second peer calculates $Pk_1(Sk_1(RC_2))$) (step 1319). Next, the second peer determines if the calculation of $Pk_1(Sk_1(RC_2))$ properly yielded the challenge $RC_2$ that it sent to the first peer (step 1321). In the case where the determination yields a negative result, the second peer acts to close the connection (step 1315). In the case where the determination yields a positive result, the procedure of FIG. 13 is considered to have completed successfully (step 1323).

As noted above, the authentication procedure such as that shown in FIG. 14 may take place after successful completion of an authentication procedure such as that shown in FIG. 13. Turning now to FIG. 14, the second peer uses its secret key $Sk_2$ to encrypt the challenge $RC_1$ sent by the first peer (i.e., the second peer calculates $Sk_2(RC_1)$) (step 1401). Next, the second peer sends its group membership certificate $GC_2$, corresponding to the same group to which $GC_1$ corresponds, to the first peer (step 1403). Next, the first peer checks the group membership certificate $GC_2$ received from the second peer (step 1405). In the case where the check finds $GC_2$ to be unsatisfactory, the first peer acts to close the connection (step 1407). In the case where the check finds $GC_2$ to be satisfactory, the first peer acts to decrypt the encrypted challenge with the second peer's public key (i.e., the first peer calculates $Pk_2(Sk_2(RC_1))$) (step 1409). Next, the first peer determines if the calculation of $Pk_2(Sk_2(RC_1))$ properly yielded the challenge $RC_1$ that it sent to the second peer (step 1411). In the case where the determination yields a negative result, the first peer acts to close the connection (step 1407). In the case where the determination yields a positive result, the procedure of FIG. 14 is considered to have completed successfully (step 1413).

Performing calculations of the sort noted above can, in various embodiments, prove energy, processor, and/or resource intensive for a node. With regard to the exemplary authentication procedures of FIGS. 13 and 14, it is noted that the second peer does not perform any calculations (e.g., the calculation of step 1319) until it is determined that $GC_1$ is satisfactory and corresponds to a group of which the second peer is also a member. It is further noted that the second peer can break the connection if those determinations do not yield positive results. On the other hand, the first peer must perform calculations early on (e.g., the calculation of step 1307). Such behavior might be beneficial, for instance, in the case where the first peer is a hostile peer, as the second peer would not need to perform the calculations while the first, hostile peer would.

With further regard to the exemplary authentication procedures of FIGS. 13 and 14, it is noted that the challenges allow each node to confirm that the other is the node indicated by the provided certificate.

It is noted that, in various embodiments, certificate chaining might be performed. For example, a group manager could provide chained group management certificates to delegate group managers or the like that entitled those delegate group members to grant group membership certificates to other users. In certain embodiments, all members of a group could posses such chained group management certificates, and thus all members could be entitled to grant new membership certificates. In certain embodiments, entitlement to grant new membership could be subject to one or more limitations. The limitations might, for instance, be set by the group manager providing the chained group management certificates.

Such limitations might, as a specific example, stipulate that individuals possessing the chained certificate could only grant membership to others in the case where the group manager was not reachable. In such an embodiment, a user might request from a group manager and/or service provider the chained certificate for later use, for example, in the case where the group manager came to be not reachable. Alternately or additionally, such a chained certificate might be provided to the user and/or her node by a group manager and/or service provider for later use should the group manager come to be not reachable.

It is noted that, in embodiments where there are multiple service providers, there may be a need to distribute the public keys of all relevant service providers to user nodes. Such might occur, for example, by distribution via a general group.

According to various embodiments of the present invention, fees could be charged with respect to various operations. For example, fees could be charged for operations such as joining groups, creating groups, joining chat boards, creating chat boards, sending instant messages, receiving instant messages, making entities available for receipt, and/or receiving entities. Alternately or additionally, fees could be charged, for example, for a user's receipt of above-described modules, group certificates, and/or the above-described general access certificate.

For example, a service provider might collect fees for granting group manager rights with a group manager certificate. The size of the fee could depend, for instance, on group rules described in certificate (e.g., operations allowed in group (e.g., sharing and/or chat), visibility (e.g., public or private) of a group, amount of members, etc). In various embodiments, a service provider might be able to set and/or control the limits of how many groups a user can be a member of simultaneously. It is noted that, in certain embodiments, software modules on a user's node might need to be upgraded in order to enhance the number of possible groups. Such might, for instance, be bundled to a service provider service package, or be a separate transaction. Group manager software modules might, in various embodiments, act to collect information of actions like joining and resigning a groups, and execute charging on its own and/or via a service provider (e.g., by transmitting charging events to service provider).

Additional Message Handling Operations

As discussed above, according to various embodiments of the present invention, a number of operations may be performed with respect to message handling. Further such operations will now be discussed.

As a first example, it is noted that, in various embodiments, multiplexing could be employed in connections, and a group membership certificate might not be included for each message and/or the like dispatched via a single multiplexed connection. Instead, for example, a single group management certificate could be provided with respect to a particular multiplexed connection, and the single certificate could apply to all messages and/or the like sent with respect to that connection. In such embodiments, the single certificate might, for example, be exchanged by way of a "group certificate message" containing an appropriate group certificate for both nodes in a mutual authentication and authorization procedure relating to connection establishment.

It is noted that, in various of such embodiments, a node could act to decide what to do with a received message and/or the like for which no common groups with corresponding certificate (e.g., a single group management certificate provided with respect to a particular multiplexed connection) exists or has been exchanged. For example, such a node might choose to ignore such a message and/or the like. As another example, such a node might act to pass such a message or the like to other nodes as appropriate. It is further noted that, in various embodiments, a node could act to determine how to handle a message and/or the like sent by another node in the case where the two nodes do not share any common group memberships or the messages are specific to a non-common group.

As another example of operations performable with respect to message handling, various operations relating to unique identifiers described herein could be performed. It is noted that such a unique identifier might, as specific example, be a 128-bit (16-byte) integer generated using date, time, MAC address, and/or other means so as to form a virtually global unique identifier as described in "DEC/HP Network Computing Architecture Remote Procedure Call Runtime Extension Specification Version OSD TX1.0.11", incorporated herein by reference. It is noted that such a unique identifier might, in various embodiments, be considered to add too much overhead to network communications, and that such might particularly be considered to be the case in embodiments where low-bandwidth communications were employed. According to various embodiments of the present invention, there could be several unique identifier types. Such functionality could, for example, provide the benefit of reducing such overhead.

For example a first unique identifier type could correspond to the above-noted 16-byte unique identifier. A unique identifier of that type might, for example, be called a "class-16" unique identifier. Such unique identifier type might, for instance, be employed where the functionality for producing such a unique identifier is available (e.g., the appropriate software modules exist at the node or the like where the identifier is to be created), where overhead is not a concern, and/or the like.

Another example of a unique identifier type could correspond to a 1-byte unique identifier. A unique identifier of that type might, for example, be called a "class-1" unique identifier. Such a unique identifier type might, for instance, be employed where the functionality for producing a class-16 unique identifier is not available, where overhead is a concern, and/or the like. In various embodiments such a class-1 unique identifier might be employed, for instance, in various sharing operations. Such a class-1 unique identifier might, for example, be employed in embodiments (e.g., sharing) where unique identifiers are well known. It is further noted that such a unique identifier might, for instance, be assigned by a system administrator, service provider, software module developer, and/or the like.

In various embodiments of the present invention, various addresses, unique identifiers, and/or the like (e.g., group identifiers, sender addresses, receiver addresses, and/or the like) might be sent periodically over a single connection as part of communication. Such might lead, in various embodiments, to increased transmission overhead, as a specific example, in the case were 128-bit integers of the sort noted above are employed. With further respect to unique identifiers it is noted that, in various embodiments, one or more dictionaries or the like could be employed. Such functionality could, for instance, have the effect of reducing such overhead. According to various embodiments employing such functionality a sending node could, for example, provide an alias, nickname, identifier, or the like for a sent unique identifier, the alias, nickname, identifier, or the like being of a shorter wordlength than its corresponding unique identifier.

A recipient node could add to a dictionary or the like an entry correlating the alias, nickname, identifier, or the like with the unique identifier. In the case where the unique identifier was to be sent again, the sending node could instead provide only the alias, nickname, identifier, or the like, and the recipient node could access the corresponding unique identifier via the dictionary. It is noted that, in various embodiments such functionality might, for instance, be implemented at socket data binding. It is further noted that, in various embodiments, dictionary correlations could be maintained at both nodes.

As an example of such dictionary functionality, a recipient node could inform a sending node of a size to be used for aliases, nicknames, identifiers, or the like. In response, the sending node could create a dictionary in accordance with the specified size. Next, the recipient node could create a dictionary in accordance with the specified size. As a next step, the sending node could send a unique identifier and a corresponding alias, nickname, identifier, or the like. The sending node could further add to its dictionary or the like an entry correlating the alias, nickname, identifier, or the like with the unique identifier. In response, the recipient node could add to its dictionary or the like an entry correlating the alias, nickname, identifier, or the like with the unique identifier. In the case where the unique identifier was to be sent again, the sending node might instead provide only the alias, nickname, identifier, or the like, and the recipient node could access the corresponding unique identifier via the dictionary. The sending node could know if a unique identifier had been previously sent, for instance, by consulting its dictionary.

In various such embodiments, in the case where a node, about to add to its dictionary a new entry correlating an alias, nickname, identifier, or the like with a unique identifier, found its dictionary to be full, the node could act to replace an existing dictionary entry with the new one. In various embodiments, in determining which entry to replace, the node could, for instance, employ size of alias, nickname, identifier, or the like, reference count, indications of the last time entries were employed, indications of how often entries were employed, and/or the like in making the determination.

As yet another example of operations performable with respect to message handling, in various embodiments of the present invention application layer flows may be employed whereby several messages could be sent via a single established application layer flow. Such functionality might, for instance, be employed in where it is desired to send large amounts of data to one or several recipients in an efficient manner. For instance, application layer flows could be employed in the case where there is a need to send several messages via a single route or the like.

It is noted that, in various embodiments of the present invention, it can be necessary for a node to analyze several fields of a message's header in order to perform routing of that message (e.g., passing the message to one or more other nodes). However, where an application layer flow is employed, a node might only need to perform such analysis of the first header fields when an application layer flow is established. Subsequent messages could then be sent in conjunction with the established flow. The subsequent messages might, in various embodiments, need not contain all typical header information. For instance, header information of a subsequent message might only indicate a flow identifier or the like.

Thus, a node receiving such a subsequent message corresponding to a established flow might need only consider a flow identifier indicated in the message's header rather than needing to perform a more intensive header analysis of the sort noted above. Accordingly, for instance, savings in processing power, energy use, and/or the like might be achieved. Further, bandwidth could be saved as subsequent messages could, in various embodiments, include a smaller header (e.g., specify only a flow identifier). It is noted that, in various embodiments, an established flow could be unidirectional (e.g., a download flow or an upload flow).

According to various embodiments where application layer flows are employable, multiple application layer flows could be sent via a single link, connection, or the like. In various such embodiments, the number of bytes selected for flow identifiers could correlate to the number of application layer flows that could be sent via a single link, connection, or the like. As one example, flow identifiers could be selected to be one byte long. As another example, flow identifiers could be selected to be two bytes long. One byte long flow identifiers might, for instance, allow for 224 or 256 simultaneous flows. two byte long flow identifiers might, for instance, allow for 65503 or 65536 simultaneous flows.

Selecting a longer word length for flow identifiers could allow for more application layer flows to be sent via a single link, connection, or the like, but with resultant larger header sizes for messages sent via one of those flows. Accordingly, in various embodiments, the word length for flow identifiers could be selected so as to achieve a balance between header size and number of possible flows over a single link, connection, or the like. Such selection might, for instance, take into account the bandwidth of the link, connection, or the like. For example, it might be determined that a one byte wordlength was sufficient for a low-bandwidth link if it were determined that the number of flows allowable by a one byte wordlength would not be less than the number of flows supportable by the low-bandwidth link, and that using a longer wordlength would only make for larger message headers.

Figure 15:
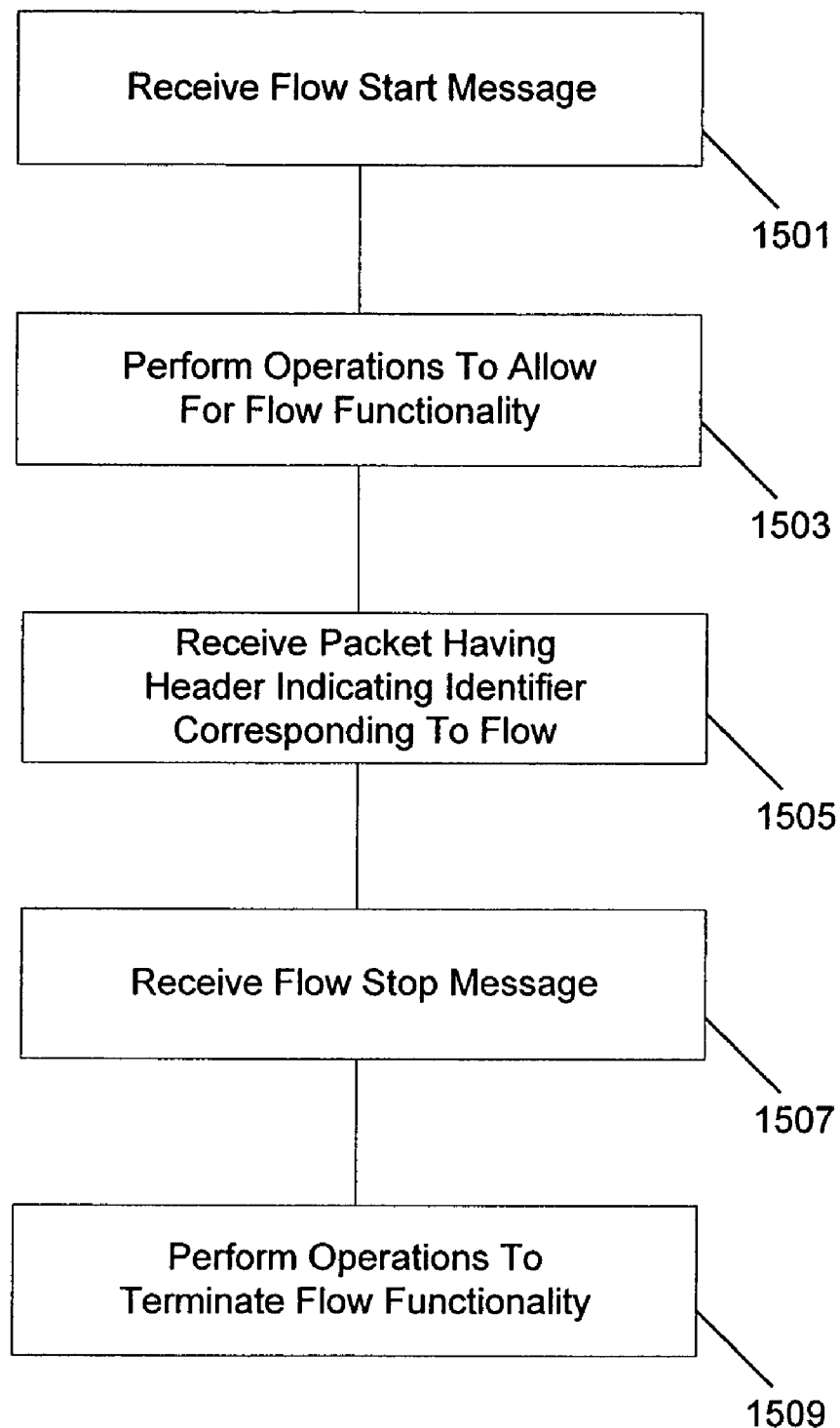
FIG. 15 is a diagram depicting exemplary steps involved application layer flows according to various embodiments of the present invention.

With respect to FIG. 15 it is noted that, according to various embodiments where application layer flows are employed, an application layer flow may be established by the dispatch of a flow start message. Indicated in the message could be the flow identifier corresponding to the flow, and perhaps an indication of the wordlength to be employed for flow identifiers. Upon receiving a flow start message (step 1501), a node could, in various embodiments, perform various appropriate operations to allow for application layer flow functionality in accordance with the specified flow identifier (step 1503). Further, in various embodiments the node might take steps to allocate a flow context.

In various embodiments, such a flow start message might be sent to a single peer or multiple peers. It is further noted that, in various embodiments, such a flow start message might be sent via multicast. Moreover, it is noted that in various embodiments a flow identifier could, for example, be unique in one socket connection in one direction. Further, by way of explanation via example, it is noted that in various embodiments, if messages corresponding to a flow are passed from a first node to a second node to a third node, there might, perhaps, be one flow number for communications between the first and second node, and a second flow number for communications between the second and third node.

As alluded to above, a message sent subsequent to establishment of an application layer flow could include, in addition to corresponding data payload, a header perhaps including only a flow identifier corresponding to the established flow (step 1505). In order to terminate a flow, in various embodiments a flow stop message could be sent. Included in the flow stop message could be an indication of the flow identifier corresponding to the flow to be stopped. The flow stop message could, in various embodiments, be sent to all nodes that had received the corresponding flow start message. Upon receiving a flow stop message (step 1507), a node could, in various embodiments, perform various appropriate operations to terminate application layer flow functionality with respect to the specified flow identifier (step 1509). It is further noted that, in various embodiments, an allocated flow context could be deallocated.

As still another example of operations performable with respect to message handling, it is noted that in various embodiments of the present invention, operations regarding data formats could be employed so as to cut down on bandwidth use, processor use, energy use, and/or the like. Such embodiments might, for example, be ones wherein portable nodes are employed. As a specific example of such data format employment, in various embodiments binary formats might be employed instead of formats such as XML (extensible Markup Language) or the like, thus avoiding the need to perform conversions, parsing, and/or the like. It is further noted that, in embodiments where it was desired to make use of a format such as XML or the like rather than a binary format, but it was also desired to cut down on bandwidth use, processor use, energy use, and/or the like, various compression techniques known in the art might be employed.

As another example of operations performable with respect to message handling, it is noted that in various embodiments of the present invention, various operations relating to optimization may be performed by an intermediate node (e.g., a node that acts to receive a message or the like from a first one or more nodes and pass it to a second one or more nodes). For example, such a node performing such passing might act to cache entities and/or entity fragments. As another example, such a node might act to employ several sources in receiving a message, entity, and/or the like. As a further example, such a node might be able to resume reception of a message, entity, and/or the like. As another example, such a node might act to employ multiplexing in performing such passing.

As an additional example of operations performable with respect to message handling, it is noted that in various embodiments sending and/or receiving nodes may act to perform various filtering operations. Such functionality could, for instance, be provided by one or more software modules operating on nodes.

According to various such embodiments, a node may maintain a filtering policy. Such a policy might, for instance, be set by a node's user, a system administrator, and/or the like. Alternately or additionally, such a policy might be loaded onto a node at time of manufacture, initial setup, and/or at one or more later points in time. Alternately or additionally, software operating on the node could form a policy and/or from alter an existing policy during operation. To provide explanation by way of example, it is noted that, in such embodiments, a first node about to receive from a second node could transmit its policy to the second node. The second node could then act to not transmit various packets, messages, and/or the like in accordance with the policy. Further, in various embodiments, the first node might act to terminate its connection with the second node in the case where the second node failed to adhere to the policy in transmitting packets, messages, and/or the like. It is also noted that, in various embodiments, the first node might act to drop received packets, messages, and/or the like in accordance with the policy.

The functionality whereby a sending node transmits in accordance with a receiving node's policy might be viewed as being more useful than standard firewall functionality, for instance, in the case where a receiving node makes use of a network link that charges for use (e.g., a UMTS link). Such a view might be held, for example, because such a receiving node employing a standard firewall would have to pay for packets, messages, and/or the like that it dropped. In contrast, via the above-described functionality, such packets, messages, and/or the like would not be transmitted to the receiving node, and thus the receiving node would not have to pay a corresponding network use fee.

Metadata

Various embodiments of the present invention described herein have been discussed as employing metadata. Various aspects of, for example, metadata will now be discussed.

In various embodiments, there may be one or more defined sets and/or schemas of acceptable metadata values, fields, and/or the like. Further, in various embodiments a user may enter metadata for various purposes (e.g., search). Such entry might, for instance, be via appropriate GUI elements and/or the like. Accordingly, for example, a user might be able to enter metadata corresponding to defined sets and/or schemas (e.g., subject, title, format, creator, member name, and/or the like).

It is further noted that, in various embodiments, a user may be able to enter freely written text based keywords, other types of information (e.g., audio), and/or the like. Such entry might, for instance, involve appropriate GUI elements. In various operations (e.g., search), such freely written text based keywords, other types of information, and/or the like could, for instance, be considered in light of one or more defined sets and/or schemas of acceptable metadata values, fields, and/or the like.

In various embodiments, operations could be performed to associate freely written text based keywords, other types of information, and/or the like could with appropriate metadata values, fields, and/or the like from the sets and/or schemas. Such appropriate metadata values, fields, and/or the like from the sets and/or schemas could, for instance, be ones determined to correlate best with the freely written text based keywords, other types of information, and/or the like. Such determination of associations could, for instance, take into account metadata analysis, text analysis, mapping of keywords against most likely metadata values fields, and/or the like. It is noted that in various embodiments it might be preferred and/or suggested that a user enter metadata corresponding to one or more defined sets and/or schemas of acceptable metadata values, fields, and/or for operations such as, for instance, search.

Once a user has provided criteria (e.g., search criteria) as metadata, and/or freely written text based keywords, other types of information, and/or the like, the user's node might, for instance, act to dispatch an appropriate message or the like (e.g., a query message or the like). It is noted that, in various embodiments, the user's node might add parameters to the query or the like describing, for instance, the node's capabilities relating to handling of various content formats. It is further noted that, in various embodiments, the user's node may act to associate freely written text based keywords, other types of information, and/or the like with appropriate metadata values, fields, and/or the like from the sets and/or schemas. Accordingly, the node could include in the message or the like metadata and/or other data relating to the associations. Alternately or additionally, the user's node might include in the appropriate message or the like entered freely written text based keywords, other types of information, and/or the, and the recipient node could act to perform such association.

Moreover, in various embodiments a group may have it's own defined practices and/or group-specific metadata sets and/or schemas. Such might, for instance, be defined by a group manager, a member, and/or a member with a specific role in a group. In certain embodiments, a group-specific metadata set and/or schema could be a subset of a set and/or schema, for instance, made available to all groups and/or by a system administrator, service provider, and/or the like. For example, a group might have a set and/or schema relating to music sharing that is a subset of a file sharing set and/or schema made available to all groups and/or the like, the music sharing set and/or schema containing only metadata values, fields, and/or the like appropriate for music sharing.

As another example, a group-specific metadata set and/or schema might be an extension of a set and/or schema made available, for example, to all groups and/or the like. Such a group-specific metadata set and/or schema might, for instance, contain added metadata values, fields, and/or the like relating to particulars of the group. As specific examples, a group corresponding to music might add metadata values, fields, and/or the like relating to music genres, a group corresponding to photography might add metadata values, fields, and/or the like relating to photographic quality information and/or camera settings, and a group corresponding to amateur radio might add metadata values, fields, and/or the like relating to DX radio codes.

In various embodiments, group-specific metadata sets and/or schemas could be distributed, updated and/or maintained, perhaps by exchanging updates between nodes belonging to the corresponding group. In various embodiments, a node might receive the latest version of a corresponding group-specific set and/or schema when joining a group. Further, in various embodiments, a node associated with a group might act to receive, perhaps via the action of one or more appropriate software modules, updates to group-specific sets and/or schemas corresponding to joined groups. Such might, for instance, occur periodically.

Hardware and Software

Certain operations and the like described herein may be executed by and/or with the help of computers. Further, the nodes described herein may be and/or may incorporate computers. The phrases "computer", "general purpose computer", and the like, as used herein, refer but are not limited to a processor card smart card, a media device, a personal computer, an engineering workstation, a PC, a Macintosh, a PDA, a computerized watch, a node, a wired or wireless terminal, a server, a network access point, a network multicast point, or the like, perhaps running an operating system such as OS X, Linux, Darwin, Windows CE, Windows XP, Windows Server 2003, Palm OS, Symbian OS, or the like, perhaps employing the Series 60 Platform, and perhaps having support for Java and/or Net.

Figure 16:
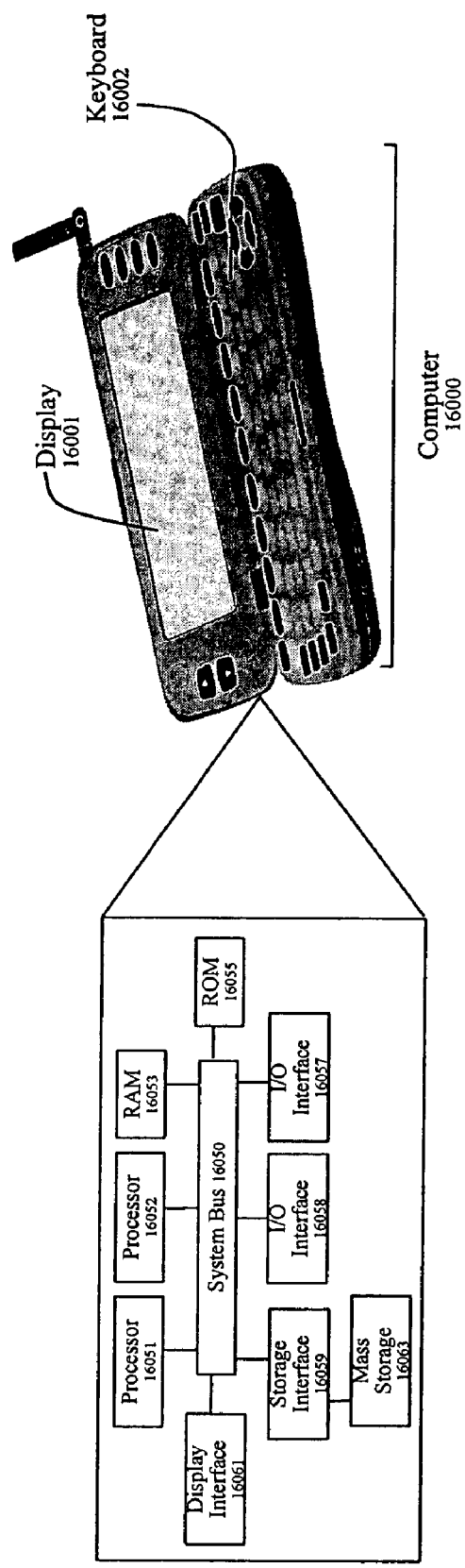
FIG. 16 shows an exemplary general purpose computer employable in various embodiments of the present invention.

The phrases "general purpose computer", "computer", and the like also refer, but are not limited to, one or more processors operatively connected to one or more memory or storage units, wherein the memory or storage may contain data, algorithms, and/or program code, and the processor or processors may execute the program code and/or manipulate the program code, data, and/or algorithms. Accordingly, exemplary computer 16000 as shown in FIG. 16 includes system bus 14050 which operatively connects two processors 16051 and 16052, random access memory 16053, read-only memory 16055, input output (I/O) interfaces 16057 and 16058, storage interface 16059, and display interface 16061. Storage interface 16059 in turn connects to mass storage 16063. Each of I/O interfaces 16057 and 16058 may be an Ethernet, IEEE 1394, IEEE 1394b, IEEE 802.11a, IEEE 802.11b, IEEE 802.11g, IEEE 802.16a, IEEE 802.20, Bluetooth, terrestrial digital video broadcast (DVB-T), satellite digital video broadcast (DVB-S), digital audio broadcast (DAB), general packet radio service (GPRS), Universal Mobile Telecommunications Service (UMTS), DVB-X, IrDA (Infrared Data Association), or other interface known in the art.

Mass storage 16063 may be a hard drive, optical drive, or the like. Processors 16057 and 16058 may each be a commonly known processor such as an IBM or Motorola PowerPC, an AMD Athlon, an AMD Opteron, an Intel ARM, an Intel XScale, a Transmeta Crusoe, an Intel Xenon, or an Intel Pentium. Computer 16000 as shown in this example also includes a touch screen 16001 and a keyboard 16002. In various embodiments, a mouse, keypad, and/or interface might alternately or additionally be employed. Computer 16000 may additionally include or be attached to card readers, DVD drives, floppy disk drives, and/or the like whereby media containing program code may be inserted for the purpose of loading the code onto the computer.

In accordance with the present invention, a computer may run one or more software modules designed to perform one or more of the above-described operations. Such modules might, for example, be programmed using languages such as Java, Objective C, C, C#, and/or C++ according to methods known in the art. Corresponding program code might be placed on media such as, for example, DVD, CD-ROM, and/or floppy disk. It is noted that any described division of operations among particular software modules is for purposes of illustration, and that alternate divisions of operation may be employed. Accordingly, any operations discussed as being performed by one software module might instead be performed by a plurality of software modules. Similarly, any operations discussed as being performed by a plurality of modules might instead be performed by a single module. It is noted that operations disclosed as being performed by a particular computer might instead be performed by a plurality of computers. It is further noted that, in various embodiments, grid computing techniques may be employed.

Figure 17:
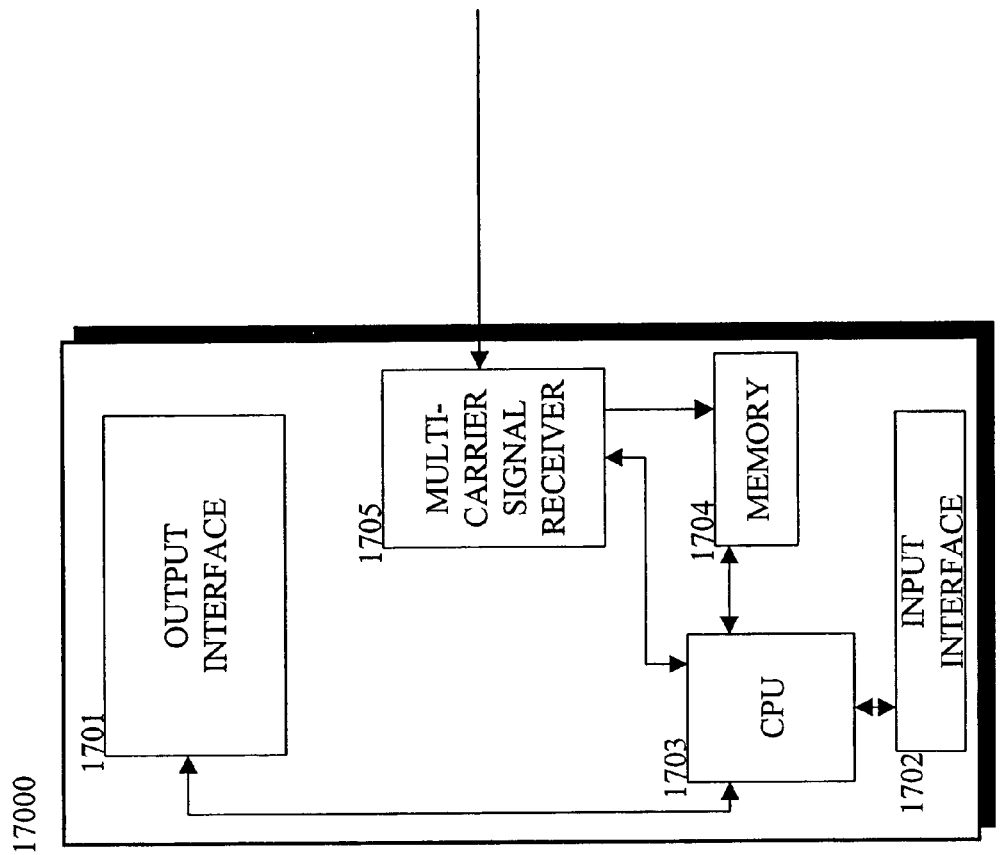
FIG. 17 shows a functional block diagram of an exemplary node employable in various embodiments of the present invention.

Shown in FIG. 17 is a functional block diagram of an exemplary terminal employable in various embodiments of the present invention. The terminal of FIG. 17 has been discussed in the foregoing. In the following, corresponding reference signs have been applied to corresponding parts. Terminal 17000 of FIG. 17 may be used in any/all of the embodiments described herein. The terminal 17000 comprises a processing unit CPU 1703, a multi-carrier signal terminal part 1705 and a user interface (1701, 1702). The multi-carrier signal terminal part 1705 and the user interface (1701, 1702) are coupled with the processing unit CPU 1703. One or more direct memory access (DMA) channels may exist between multi-carrier signal terminal part 1705 and memory 1704. The user interface (1701, 1702) comprises a display and a keyboard to enable a user to use the terminal 17000. In addition, the user interface (1701, 1702) comprises a microphone and a speaker for receiving and producing audio signals. The user interface (1701, 1702) may also comprise voice recognition (not shown).

The processing unit CPU 1703 comprises a microprocessor (not shown), memory 1704 and possibly software. The software can be stored in the memory 1704. The microprocessor controls, on the basis of the software, the operation of the terminal 17000, such as the receiving of the data stream, the tolerance of the impulse burst noise in the data reception, displaying output in the user interface and the reading of inputs received from the user interface. The operations are described above. The hardware contains circuitry for detecting the signal, circuitry for demodulation, circuitry for detecting the impulse, circuitry for blanking those samples of the symbol where significant amount of impulse noise is present, circuitry for calculating estimates, and circuitry for performing the corrections of the corrupted data.

Still referring to FIG. 17, alternatively, middleware or software implementation can be applied. The terminal 17000 can be a hand-held device which the user can comfortably carry. Advantageously, the terminal 17000 can be a cellular mobile phone which comprises the multi-carrier signal terminal part 1705 for receiving the multicast transmission stream. Therefore, the terminal 17000 may possibly interact with the service providers.

Ramifications and Scope

Although the description above contains many specifics, these are merely provided to illustrate the invention and should not be construed as limitations of the invention's scope. Thus it will be apparent to those skilled in the art that various modifications and variations can be made in the system and processes of the present invention without departing from the spirit or scope of the invention.

What is claimed is:

1. A method, comprising:
   determining to monitor, at an apparatus, for an event of association of one or more messages with one or more specified criteria, wherein the messages are received, at the apparatus, from a first node separate from the apparatus to be passed through to a second node separate from the apparatus;
   determining to monitor, at the apparatus, for an event of one or more nodes, corresponding to holdings in an address book maintained by the apparatus, coming nearby;

determining to provide, at the apparatus to said user, a non-moving display of one or more notifications corresponding to one or more of the events wherein each of said notifications describes one or more of said events, and wherein the notifications had previously been moving while a user interface of said apparatus displayed a screensaver; and determining to enable, at the apparatus, said user to select, via the non-moving display, one or more of the notifications for activating corresponding operations.

2. The method of claim 1, wherein said notifications scroll.

3. The method of claim 2, wherein scrolling is three-dimensional.

4. The method of claim 1, wherein said one or more of said events relate to software accessible by said apparatus.

5. The method of claim 1, wherein one or more of said messages correspond to one or more entities.

6. The method of claim 1, wherein one or more of said messages correspond to chat.

7. The method of claim 1, wherein two or more of said notifications are displayed simultaneously to said user.

8. The method of claim 1, wherein one or more of said notifications are textual notifications.

9. The method of claim 1, wherein one or more of said notifications are graphical notifications.

10. The method of claim 1, wherein said criteria are provided by said user.

11. The method of claim 1, wherein said criteria are provided by a system administrator.

12. The method of claim 1, wherein one or more of said criteria are metadata.

13. The method of claim 1, wherein software corresponding to a selected notification is activated.

14. The method of claim 1, further comprising determining to provide a tactile indication to said user.

15. A method, comprising:
determining to maintain, at an apparatus, a number of authenticated connections to at least a first node and a second node, wherein the first node and the second node are nodes in a peer-to-peer environment, and wherein the first node and the second node are separate from the apparatus;

receiving, at the apparatus from the first node, via one or more of said authenticated connections, one or more messages to be passed through to the second node;

determining to monitor, at the apparatus, for an event of association of one or more of the messages with one or more specified criteria;

determining to monitor, at the apparatus, for an event of one or more nodes, corresponding to holdings in an address book maintained by the apparatus, coming nearby; and determining to provide, at the apparatus, to said user a non-moving display of one or more notifications corresponding to one or more of the events, wherein each of said notifications describes one or more of said events, and wherein the notifications had previously been moving while a user interface of said apparatus displayed a screensaver, wherein determining to maintain and receiving were performed while the user interface of said apparatus displayed the screensaver.

16. The method of claim 15, wherein said notifications scroll.

17. The method of claim 16, wherein scrolling is three-dimensional.

18. The method of claim 15, further comprising:

determining to enable said user to select, via the non-moving display, one or more of the notifications for activating corresponding operations.

19. The method of claim 18, wherein software corresponding to a selected notification is activated.

20. The method of claim 15, wherein one or more of the received messages to be passed through correspond to one or more entities.

21. The method of claim 15, wherein one or more of the received messages to be passed through correspond to chat.

22. The method of claim 15, wherein two or more of said notifications are displayed simultaneously to said user.

23. The method of claim 15, wherein displaying is via a screensaver.

24. The method of claim 15, wherein one or more of said notifications are textual notifications.

25. The method of claim 15, wherein one or more of said notifications are graphical notifications.

26. The method of claim 15, wherein said criteria are provided by said user.

27. The method of claim 15, wherein said criteria are provided by a system administrator.

28. The method of claim 15, wherein one or more of said criteria are metadata.

29. The method of claim 15, further comprising determining to provide a tactile indication to said user.

30. An apparatus, comprising:
at least one processor; and
at least one memory including computer program code, the at least one memory and the computer program code configured to, with the at least one processor, cause the apparatus at least to perform:

determine to monitor for an event of association of one or more messages with one or more specified criteria, wherein the messages are received, at the apparatus, from a first node separate from the apparatus to be passed through to a second node separate from the apparatus;

determine to monitor for an event of one or more nodes, corresponding to holdings in an address book maintained by the apparatus, coming nearby;

determine to provide to said user, a non-moving display of one or more notifications corresponding to one or more of the events, wherein each of said notifications describes one or more of said events, and wherein the notifications had previously been moving while a user interface of said apparatus displayed a screensaver; and determine to enable said user to select, via the non-moving display, one or more of the notifications for activating corresponding operations.

31. The apparatus of claim 30, wherein said notifications scroll.

32. The apparatus of claim 31, wherein scrolling is three-dimensional.

33. The apparatus of claim 30, wherein said one or more of said events relate to software accessible by said apparatus.

34. The apparatus of claim 30, wherein one or more of said messages correspond to one or more entities.

35. The apparatus of claim 30, wherein one or more of said messages correspond to chat.

36. The apparatus of claim 30, wherein two or more of said notifications are displayed simultaneously to said user.

37. The apparatus of claim 30, wherein one or more of said notifications are textual notifications.

38. The apparatus of claim 30, wherein one or more of said notifications are graphical notifications.

39. The apparatus of claim 30, wherein said criteria are provided by said user.

40. The apparatus of claim 30, wherein said criteria are provided by a system administrator.

41. The apparatus of claim 30, wherein one or more of said criteria are metadata.

42. The apparatus of claim 30, wherein software corresponding to a selected notification is activated.

43. The apparatus of claim 30, wherein the at least one memory and the computer program code are further configured to, with the at least one processor, cause the apparatus to determine to provide a tactile indication to said user.

44. An apparatus, comprising:
- at least one processor; and
- at least one memory including computer program code, the at least one memory and the computer program code configured to, with the at least one processor, cause the apparatus at least to perform:
- determine to maintain a number of authenticated connections to at least a first node and a second node, wherein the first node and the second node are nodes in a peer-to-peer environment, and wherein the first node and the second node are separate from the apparatus;
- receive from the first node, via one or more of said authenticated connections, one or more messages to be passed through to the second node;
- determine to monitor for an event of association of one or more of the messages with one or more specified criteria;
- determine to monitor for an event of one or more nodes, corresponding to holdings in an address book maintained by the apparatus, coming nearby; and
- determine to provide to said user a non-moving display of one or more notifications corresponding to one or more of the events, wherein each of said notifications describes one or more of said events, and wherein the notifications had previously been moving while a user interface of said apparatus displayed a screensaver, wherein determination to maintain and receipt were performed while the user interface of said apparatus displayed the screensaver.

45. The apparatus of claim 44, wherein said notifications scroll.

46. The apparatus of claim 45, wherein scrolling is three-dimensional.

47. The apparatus of claim 44, wherein one or more of the received messages to be passed through correspond to one or more entities.

48. The apparatus of claim 44, wherein one or more of the received messages to be passed through correspond to chat.

49. The apparatus of claim 44, wherein two or more of said notifications are displayed simultaneously to said user.

50. The apparatus of claim 44, wherein displaying is via a screensaver.

51. The apparatus of claim 44, wherein one or more of said notifications are textual notifications.

52. The apparatus of claim 44, wherein one or more of said notifications are graphical notifications.

53. The apparatus of claim 44, wherein said criteria are provided by said user.

54. The apparatus of claim 44, wherein said criteria are provided by a system administrator.

55. The apparatus of claim 44, wherein one or more of said criteria are metadata.

56. The apparatus of claim 44, wherein the at least one memory and the computer program code are further configured to, with the at least one processor, cause the apparatus to determine to enable said user to select, via the non-moving display, one or more of the notifications for activating corresponding operations.

57. The apparatus of claim 56, wherein software corresponding to a selected notification is activated.

58. The apparatus of claim 45, wherein the at least one memory and the computer program code are further configured to, with the at least one processor, cause the apparatus to determine to provide a tactile indication to said user.

* * * * *